(12) United States Patent
Shibuya

(10) Patent No.: US 12,052,785 B2
(45) Date of Patent: Jul. 30, 2024

(54) WIRELESS COMMUNICATION SYSTEM, WIRELESS COMMUNICATION DEVICE, AND WIRELESS COMMUNICATION METHOD

(71) Applicant: OLYMPUS CORPORATION, Hachioji (JP)

(72) Inventor: Kazuyuki Shibuya, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 352 days.

(21) Appl. No.: 17/684,564

(22) Filed: Mar. 2, 2022

(65) Prior Publication Data
US 2022/0191958 A1 Jun. 16, 2022

Related U.S. Application Data

(63) Continuation of application No. PCT/JP2019/049769, filed on Dec. 19, 2019.

(51) Int. Cl.
*H04W 76/15* (2018.01)
*H04W 84/12* (2009.01)
*H04W 88/06* (2009.01)

(52) U.S. Cl.
CPC ............ *H04W 76/15* (2018.02); *H04W 84/12* (2013.01); *H04W 88/06* (2013.01)

(58) Field of Classification Search
CPC ..... H04W 48/14; H04W 88/06; H04W 16/14; H04W 76/12

(Continued)

(56) References Cited

U.S. PATENT DOCUMENTS 6,226,681 B1 * 5/2001 Koga ................. H04Q 11/0478
709/236
6,639,981 B1 * 10/2003 Dunn, Jr. ............. H04Q 3/0025
379/221.13

(Continued)

FOREIGN PATENT DOCUMENTS

JP 2001-308850 A 11/2001
JP 2005-260286 A 9/2005

(Continued)

OTHER PUBLICATIONS

F. Ghavimi and H. -H. Chen, "M2M Communications in 3GPP LTE/LTE-A Networks: Architectures, Service Requirements, Challenges, and Applications," in IEEE Communications Surveys & Tutorials, vol. 17, No. 2, pp. 525-549, Secondquarter 2015, doi: 10.1109/COMST.2014.2361626. (Year: 2015).*

(Continued)

*Primary Examiner* — William D Cumming
(74) *Attorney, Agent, or Firm* — WHDA, LLP

(57) ABSTRACT

A wireless communication system includes two wireless communication devices. A first wireless communication device includes a first communicator and a second communicator. A second wireless communication device includes a third communicator and a fourth communicator. One of the two wireless communication devices includes a memory configured to store setting-related information. The second communicator or the fourth communicator is configured to transmit first setting-related information. Each time the first setting-related information is transmitted, a first processor is configured to generate the setting-related information different from the first setting-related information and the fourth communicator or the second communicator is configured to hold the setting-related information generated by the first processor as the first setting-related information.

10 Claims, 26 Drawing Sheets

(58) Field of Classification Search
USPC .... 455/41.3, 403, 560, 412.2; 370/252, 465, 370/352
See application file for complete search history.

(56) References Cited

U.S. PATENT DOCUMENTS

| | | | | |
|---|---|---|---|---|
| 6,751,212 | B1* | 6/2004 | Kaji | H04M 7/0069 370/352 |
| 7,164,904 | B2* | 1/2007 | Nagy | H04B 1/28 455/412.2 |
| 7,187,671 | B2* | 3/2007 | Moyano | H04L 65/104 370/465 |
| 7,260,088 | B2* | 8/2007 | Metzler | H04W 76/12 370/352 |
| 7,738,433 | B2* | 6/2010 | Tao | H04W 88/06 455/445 |
| 8,028,111 | B2* | 9/2011 | Takahashi | H04W 8/26 455/435.2 |
| 9,014,631 | B2* | 4/2015 | Dua | H04L 67/1068 369/53.37 |
| 9,038,129 | B2* | 5/2015 | Proctor, Jr. | G06Q 10/0875 705/16 |
| 9,301,326 | B2* | 3/2016 | Ogawara | H04W 12/06 |
| 9,319,177 | B2* | 4/2016 | Clevorn | H04W 72/56 |
| 10,193,591 | B2* | 1/2019 | Clevorn | H04W 72/56 |
| 2001/0037388 | A1 | 11/2001 | Suzuki | |
| 2002/0132584 | A1* | 9/2002 | Izumi | H04W 48/14 455/41.3 |
| 2003/0093503 | A1* | 5/2003 | Yamaki | G16Z 99/00 709/220 |
| 2003/0143973 | A1* | 7/2003 | Nagy | H04W 88/06 455/403 |
| 2004/0242271 | A1* | 12/2004 | Metzler | H04L 12/66 455/560 |
| 2005/0097191 | A1* | 5/2005 | Yamaki | G16H 40/63 709/219 |
| 2005/0201564 | A1 | 9/2005 | Kayashima et al. | |
| 2007/0070961 | A1* | 3/2007 | Tao | H04W 16/14 370/465 |
| 2007/0094402 | A1* | 4/2007 | Stevenson | H04L 69/08 709/229 |
| 2009/0119427 | A1* | 5/2009 | Takahashi | H04W 8/26 710/106 |
| 2011/0119733 | A1* | 5/2011 | Proctor, Jr. | G06Q 20/3224 726/1 |
| 2013/0029720 | A1* | 1/2013 | Clevorn | H04B 1/401 455/552.1 |
| 2013/0133087 | A1* | 5/2013 | Proctor, Jr. | H04L 63/20 726/28 |
| 2014/0162558 | A1* | 6/2014 | Dua | H04W 4/60 455/41.2 |
| 2016/0066253 | A1* | 3/2016 | Kollu | H04L 69/18 370/328 |
| 2016/0219433 | A1 | 7/2016 | Naruse | |
| 2017/0005692 | A1* | 1/2017 | Clevorn | H04L 1/0036 |
| 2022/0191436 | A1* | 6/2022 | Kawasaki | H04N 7/183 |
| 2022/0191958 | A1* | 6/2022 | Shibuya | H04W 76/15 |

FOREIGN PATENT DOCUMENTS

| | | |
|---|---|---|
| JP | 2016-111486 A | 6/2016 |
| JP | 2016-136704 A | 7/2016 |
| JP | 2017-112551 A | 6/2017 |
| JP | 2017-169158 A | 9/2017 |

OTHER PUBLICATIONS

Office Action dated Jun. 13, 2023, issued in counterpart JP Application No. 2021-565252, with English translation. (4 pages).

International Search Report dated Mar. 24, 2020, issued in counterpart application No. PCT/JP2019/049769, w/English translation (4 pages).

* cited by examiner

WIRELESS COMMUNICATION SYSTEM, WIRELESS COMMUNICATION DEVICE, AND WIRELESS COMMUNICATION METHOD

The present application is a continuation application based on International Patent Application No. PCT/JP2019/049769 filed on Dec. 19, 2019, the content of which is incorporated herein by reference.

BACKGROUND OF THE INVENTION

Field of the Invention

The present invention relates to a wireless communication system, a wireless communication device, and a wireless communication method.

Description of Related Art

In a wireless local area network (LAN), a communication device that is a slave device (station) connects to an access point that is a master device. Hereinafter, an access point is abbreviated as AP. Hereinafter, a station is abbreviated as STA. The communication device performs data communication with another communication device via an AP device having AP functions. For example, another communication device connects to the AP device via a wireless LAN or a wired LAN. Alternatively, another communication device connects to the AP device via a wide area network (WAN) regardless of whether the WAN is wireless or wired.

AP functions have been installed on various devices other than AP devices in recent years. In a case in which the AP functions are installed on any one of a communication device and another communication device, the communication devices can perform data communication directly with each other instead of performing the data communication via an AP device. Therefore, the load of a communication band can be reduced.

In situations in which the purpose for usage is limited, opportunities in which communication devices perform data communication directly with each other have been increasing. For example, in a certain situation, a video-recording communication device such as a camera records or captures a video and transmits the video to a video-reproducing communication device such as a television or a smartphone, and the video-reproducing communication device saves or reproduces the video. There is a case in which AP functions are installed on any one of the video-recording communication device and the video-reproducing communication device and these devices perform direct data communication. In such direct data communication, it is often assumed that a communication device and another communication device perform one-to-one connection. In other words, in an example in which the video-recording communication device and the video-reproducing communication device perform direct data communication, only one video-recording communication device and one video-reproducing communication device connect to each other in order to transmit quality videos in real time or at high speed.

For example, an AP offers a network (infrastructure network) as a wireless LAN in accordance with IEEE802.11. In order for a communication device to participate in the network, various kinds of information (connection-setting information) need to be set in the communication device. For example, the connection-setting information includes a network identifier (service set identifier (SSID)), information of an authentication method, information of an encryption method, and an encryption key. Inputting various kinds of information is necessary on a communication device when the connection-setting information is set. Since inputting such information is complicated, it is difficult for a user, in particular, who is not used to wireless LAN technologies to set the information.

In order to address this problem, a technique of completing setting of information without causing a user to input connection-setting information of a wireless LAN has been provided. Specifically, in addition to a wireless LAN, a different communication technique from the wireless LAN is applied to a communication device and an AP, and the connection-setting information is transmitted from the AP to the communication device by using the different communication technique from the wireless LAN. For example, a short-range wireless communication technique or a wired communication technique is available as the different communication technique from the wireless LAN. The short-range wireless communication technique includes near-field communication (NFC), radio-frequency identification (RFID), IEEE802.15.4, infrared communication, Bluetooth (registered trademark), and the like. The wired communication technique includes a universal serial bus (USB), IEEE802.3, and the like.

The AP repeats processing of transmitting the connection-setting information to each communication device. In this way, the AP can deliver the connection-setting information to a plurality of communication devices. A user may see connection-setting information through a user interface of the AP or a user interface of a communication device that receives the connection-setting information and may input the connection-setting information to another communication device. As a result, the plurality of communication devices can connect to the AP. When a communication device hopes to perform one-to-one connection between only the communication device and the AP and connects to the AP, there is a case in which another communication device has already connected to the AP. In such a case, the one-to-one connection is not realized.

In a technique disclosed in Japanese Unexamined Patent Application, First Publication No. 2016-111486, a printer to be an AP and a smartphone to be a slave device perform communication with each other. The smartphone generates connection-setting information of a wireless LAN to be set in the AP and writes the connection-setting information in a NFC-tag unit of the printer.

SUMMARY OF THE INVENTION

According to a first aspect of the present invention, a wireless communication system includes a first wireless communication device and a second wireless communication device. The first wireless communication device includes a first communicator and a second communicator. The first communicator is configured to perform wireless communication with a third communicator of the second wireless communication device in accordance with a first communication protocol of a wireless communication protocol and operate as an access point in accordance with connection-setting information. The second communicator is configured to perform communication with a fourth communicator of the second wireless communication device in accordance with a second communication protocol different from the first communication protocol. The second wireless communication device includes the third communicator and the fourth communicator. The third communicator is configured to perform wireless communication with the first communicator in accordance with the first communication protocol and connect to the access point in accordance with the connection-setting information as a station. The fourth communicator is configured to perform communication with the second communicator in accordance with the second communication protocol. One of the first wireless communication device and the second wireless communication device includes a memory and a first processor. The memory is configured to store setting-related information that is one of the connection-setting information and information used for generating the connection-setting information. The memory is configured to store the setting-related information as first setting-related information. In a case in which the second wireless communication device includes the memory and the first processor, the fourth communicator is configured to hold the first setting-related information and transmit the first setting-related information to the second communicator and the second communicator is configured to receive the first setting-related information. In a case in which the first wireless communication device includes the memory and the first processor, the second communicator is configured to hold the first setting-related information and transmit the first setting-related information to the fourth communicator and the fourth communicator is configured to receive the first setting-related information. Each time the first setting-related information is transmitted, the first processor is configured to generate the setting-related information different from the transmitted first setting-related information, the fourth communicator or the second communicator is configured to hold the setting-related information generated by the first processor as the first setting-related information as a replacement for the transmitted first setting-related information, and the memory is configured to store the setting-related information generated by the first processor as second setting-related information. After the first setting-related information is transmitted, the first communicator and the third communicator are configured to connect to each other in accordance with the connection-setting information related to the transmitted first setting-related information. The memory is configured to store the second setting-related information as the first setting-related information and store the setting-related information generated by the first processor as the second setting-related information each time the first processor generates the setting-related information after the first communicator and the third communicator connect to each other.

According to a second aspect of the present invention, in the first aspect, the second wireless communication device may include the memory and the first processor. Each time the first setting-related information is transmitted, the fourth communicator may be configured to hold the setting-related information generated by the first processor as the first setting-related information as a replacement for the transmitted first setting-related information. The first communicator may be configured to connect to the third communicator in accordance with the connection-setting information related to the first setting-related information received by the second communicator. The third communicator may be configured to connect to the first communicator in accordance with the connection-setting information related to the first setting-related information stored on the memory.

According to a third aspect of the present invention, in the second aspect, the first wireless communication device may further include a second processor. The first processor may be configured to determine whether or not the first setting-related information is to be set in the fourth communicator. The fourth communicator may be configured to hold the first setting-related information when the first processor determines that the first setting-related information is to be set in the fourth communicator. The fourth communicator may be configured not to hold the first setting-related information and may be configured not to transmit the first setting-related information to the second communicator when the first processor determines that the first setting-related information is not to be set in the fourth communicator. The second processor may be configured to generate the first setting-related information in a case in which the second communicator does not receive the first setting-related information. The first communicator may be configured to acquire the first setting-related information generated by the second processor from the second processor. The second communicator may be configured to transmit the first setting-related information generated by the second processor to the fourth communicator. The fourth communicator may be configured to receive the first setting-related information. The first communicator may be configured to connect to the third communicator in accordance with the connection-setting information related to the first setting-related information acquired from the second processor. The third communicator may be configured to connect to the first communicator in accordance with the connection-setting information related to the first setting-related information received by the fourth communicator.

According to a fourth aspect of the present invention, in the second aspect, the first wireless communication device may further include a second processor. The fourth communicator may be configured to transmit identification information of the second wireless communication device to the second communicator before the third communicator connects to the first communicator. The second communicator may be configured to receive the identification information. The third communicator may be configured to transmit the identification information to the first communicator when the third communicator connects to the first communicator. The first communicator may be configured to receive the identification information. The second processor may be configured to set the identification information received by the second communicator in the first communicator as identification information of a device of which connection is accepted by the first communicator. The first communicator may be configured to accept connection to the third communicator when the identification information received by the first communicator is the same as the identification information set in the first communicator.

According to a fifth aspect of the present invention, in the first aspect, the first wireless communication device may include the memory and the first processor. Each time the first setting-related information is transmitted, the second communicator may be configured to hold the setting-related information generated by the first processor as the first setting-related information as a replacement for the transmitted first setting-related information. The third communicator may be configured to connect to the first communicator in accordance with the connection-setting information related to the first setting-related information received by the fourth communicator. The first communicator may be configured to connect to the third communicator in accordance with the connection-setting information related to the first setting-related information stored on the memory.

According to a sixth aspect of the present invention, in the fifth aspect, the fourth communicator may be configured to transmit identification information of the second wireless communication device to the second communicator before the third communicator connects to the first communicator. The second communicator may be configured to receive the identification information. The third communicator may be configured to transmit the identification information to the first communicator when the third communicator connects to the first communicator. The first communicator may be configured to receive the identification information. The first processor may be configured to set the identification information received by the second communicator in the first communicator as identification information of a device of which connection is accepted by the first communicator. The first communicator may be configured to accept connection to the third communicator when the identification information received by the first communicator is the same as the identification information set in the first communicator.

According to a seventh aspect of the present invention, in any one of the first to sixth aspects, the second communication protocol may be a wireless communication protocol. A first distance may be longer than a second distance. The first distance may be a maximum distance between the first communicator and the third communicator when the first communicator and the third communicator perform wireless communication with each other. The second distance may be a maximum distance between the second communicator and the fourth communicator when the second communicator and the fourth communicator perform wireless communication with each other.

According to an eighth aspect of the present invention, a wireless communication device includes a third communicator, a fourth communicator, a memory, and a processor. The third communicator is configured to perform wireless communication with a first communicator that is an access point of an external wireless communication device in accordance with a first communication protocol of a wireless communication protocol and connect to the access point in accordance with connection-setting information as a station. The fourth communicator is configured to perform communication with a second communicator of the external wireless communication device in accordance with a second communication protocol different from the first communication protocol. The memory is configured to store setting-related information that is one of the connection-setting information and information used for generating the connection-setting information. The memory is configured to store the setting-related information as first setting-related information. The fourth communicator is configured to hold the first setting-related information and transmit the first setting-related information to the second communicator. Each time the first setting-related information is transmitted, the processor is configured to generate the setting-related information different from the transmitted first setting-related information, the fourth communicator is configured to hold the setting-related information generated by the processor as the first setting-related information as a replacement for the transmitted first setting-related information, and the memory is configured to store the setting-related information generated by the processor as second setting-related information. After the first setting-related information is transmitted, the third communicator is configured to connect to the first communicator in accordance with the connection-setting information related to the first setting-related information stored on the memory. The memory is configured to store the second setting-related information as the first setting-related information and store the setting-related information generated by the first processor as the second setting-related information each time the processor generates the setting-related information after the third communicator connects to the first communicator.

According to a ninth aspect of the present invention, a wireless communication device includes a first communicator, a second communicator, a memory, and a processor. The first communicator is configured to perform wireless communication with a third communicator of an external wireless communication device in accordance with a first communication protocol of a wireless communication protocol and operate as an access point in accordance with connection-setting information. The second communicator is configured to perform communication with a fourth communicator of the external wireless communication device in accordance with a second communication protocol different from the first communication protocol. The memory is configured to store setting-related information that is one of the connection-setting information and information used for generating the connection-setting information. The memory is configured to store the setting-related information as first setting-related information. The second communicator is configured to hold the first setting-related information and transmit the first setting-related information to the fourth communicator. Each time the first setting-related information is transmitted, the processor is configured to generate the setting-related information different from the transmitted first setting-related information, the second communicator is configured to hold the setting-related information generated by the processor as the first setting-related information as a replacement for the transmitted first setting-related information, and the memory is configured to store the setting-related information generated by the processor as second setting-related information. After the first setting-related information is transmitted, the first communicator is configured to connect to the third communicator in accordance with the connection-setting information related to the first setting-related information stored on the memory. The memory is configured to store the second setting-related information as the first setting-related information and store the setting-related information generated by the processor as the second setting-related information each time the processor generates the setting-related information after the first communicator connects to the third communicator.

According to a tenth aspect of the present invention, a wireless communication method executed by a first wireless communication device and a second wireless communication device is provided. The wireless communication method includes a first step, a second step, a third step, a fourth step, a fifth step, a sixth step, a seventh step, and an eighth step. The first wireless communication device includes a first communicator and a second communicator. The first communicator is configured to perform wireless communication with a third communicator of the second wireless communication device in accordance with a first communication protocol of a wireless communication protocol and operate as an access point in accordance with connection-setting information. The second communicator is configured to perform communication with a fourth communicator of the second wireless communication device in accordance with a second communication protocol different from the first communication protocol. The second wireless communication device includes the third communicator and the fourth communicator. The third communicator is configured to perform wireless communication with the first communicator in accordance with the first communication protocol and connect to the access point in accordance with the connection-setting information as a station. The fourth communicator is configured to perform communication with the second communicator in accordance with the second communication protocol. One of the first wireless communication device and the second wireless communication device includes a memory and a first processor. The memory is configured to store setting-related information that is one of the connection-setting information and information used for generating the connection-setting information. The memory is configured to store the setting-related information as first setting-related information. In a case in which the second wireless communication device includes the memory and the first processor, the fourth communicator holds the first setting-related information in the first step and transmits the first setting-related information to the second communicator in the second step and the second communicator receives the first setting-related information in the third step. In a case in which the first wireless communication device includes the memory and the first processor, the second communicator holds the first setting-related information in the first step and transmits the first setting-related information to the fourth communicator in the second step and the fourth communicator receives the first setting-related information in the third step. Each time the first setting-related information is transmitted, the first processor generates the setting-related information different from the transmitted first setting-related information in the fourth step, the fourth communicator or the second communicator holds the setting-related information generated by the first processor as the first setting-related information as a replacement for the transmitted first setting-related information in the fifth step, and the memory stores the setting-related information generated by the first processor as second setting-related information in the sixth step. After the first setting-related information is transmitted, the first communicator and the third communicator connect to each other in accordance with the connection-setting information related to the transmitted first setting-related information in the seventh step. The memory stores the second setting-related information as the first setting-related information and stores the setting-related information generated by the first processor as the second setting-related information in the eighth step each time the first processor generates the setting-related information after the first communicator and the third communicator connect to each other.

DETAILED DESCRIPTION OF THE INVENTION

Hereinafter, embodiments of the present invention will be described with reference to the drawings.

First Embodiment

Figure 1:
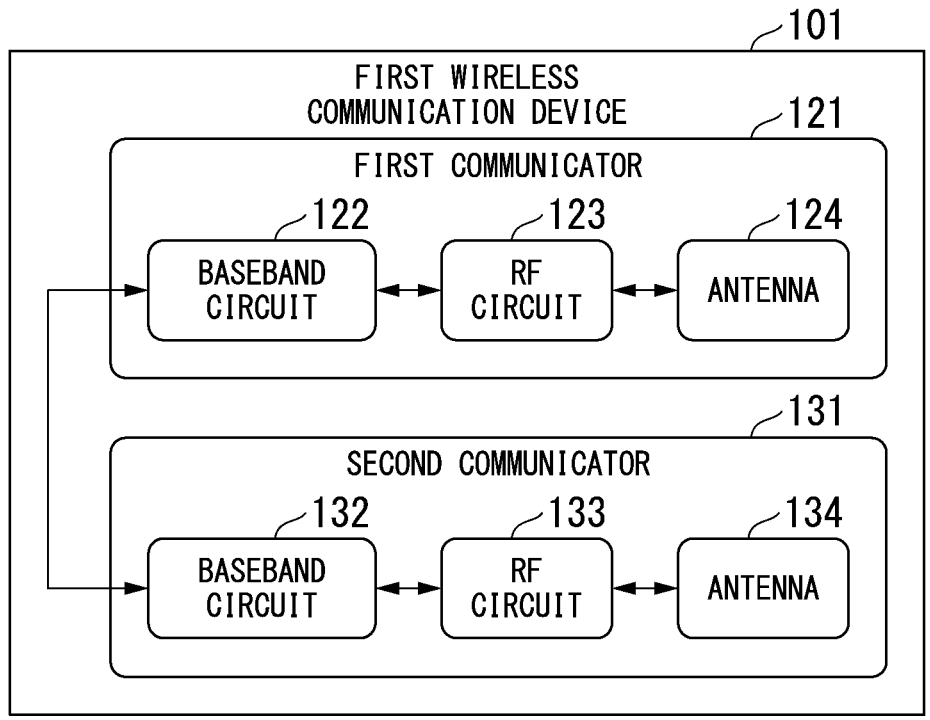
FIG. 1 is a block diagram showing a configuration of a first wireless communication device according to a first embodiment of the present invention.
Figure 2:
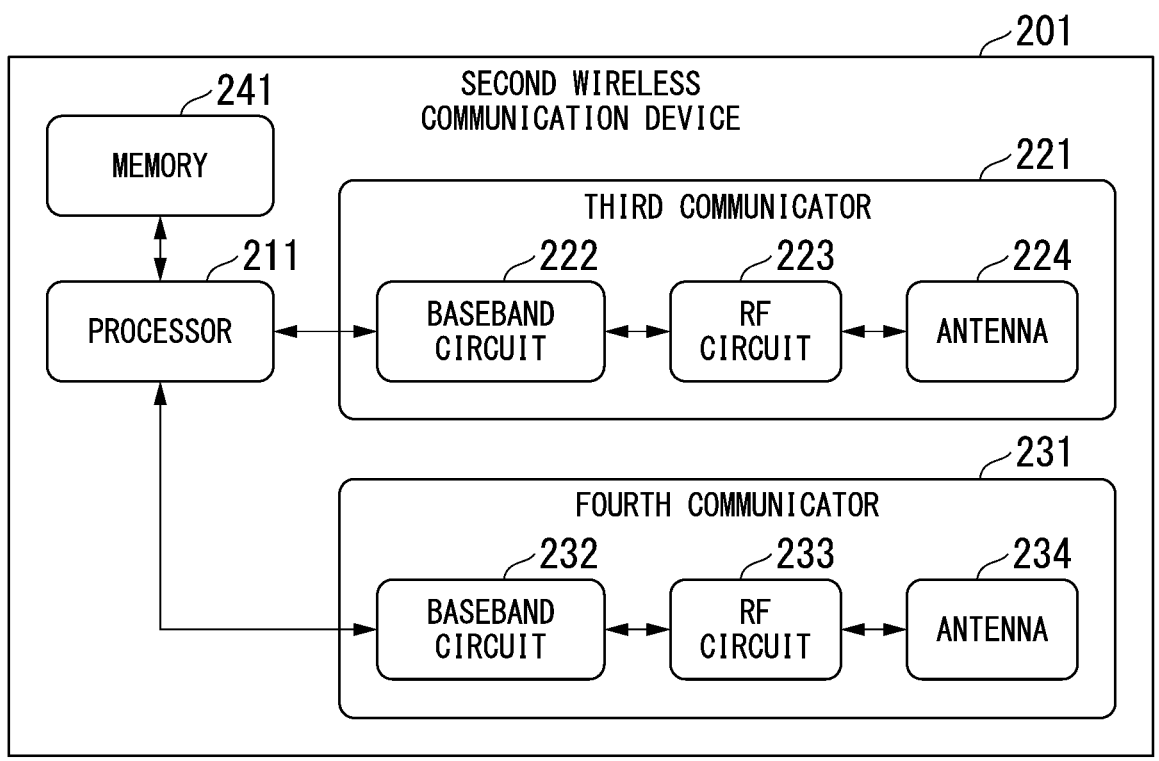
FIG. 2 is a block diagram showing a configuration of a second wireless communication device according to the first embodiment of the present invention.

FIG. 1 shows a configuration of a first wireless communication device 101 according to a first embodiment of the present invention. The first wireless communication device 101 shown in FIG. 1 includes a first communicator 121 and a second communicator 131. FIG. 2 shows a configuration of a second wireless communication device 201 according to the first embodiment. The second wireless communication device 201 shown in FIG. 2 includes a processor 211 (first processor), a third communicator 221, a fourth communicator 231, and a memory 241.

A schematic configuration of the first wireless communication device 101 and the second wireless communication device 201 will be described. The first communicator 121 performs wireless communication with the third communicator 221 in accordance with a first communication protocol of a wireless communication protocol and operates as an access point (AP) in accordance with connection-setting information. The second communicator 131 performs communication with the fourth communicator 231 in accordance with a second communication protocol different from the first communication protocol. The third communicator 221 performs wireless communication with the first communicator 121 in accordance with the first communication protocol and connects to the AP in accordance with the connection-setting information as a station (STA). The fourth communicator 231 performs communication with the second communicator 131 in accordance with the second communication protocol. The memory 241 stores setting-related information that is one of the connection-setting information and information used for generating the connection-setting information.

The memory 241 stores first setting-related information. The fourth communicator 231 holds the first setting-related information and transmits the first setting-related information to the second communicator 131. The second communicator 131 receives the first setting-related information. Each time the first setting-related information is transmitted, the processor 211 generates the setting-related information different from the transmitted first setting-related information and the fourth communicator 231 holds the setting-related information generated by the processor 211 as the first setting-related information as a replacement for the transmitted first setting-related information. Each time the first setting-related information is transmitted, the memory 241 stores the setting-related information generated by the processor 211 as second setting-related information. After the first setting-related information is transmitted, the first communicator 121 and the third communicator 221 connect to each other in accordance with connection-setting information related to the transmitted first setting-related information. The memory 241 stores the already stored second setting-related information as the first setting-related information and stores the setting-related information generated by the processor 211 as the second setting-related information each time the processor 211 generates the setting-related information after the first communicator 121 and the third communicator 221 connect to each other.

A detailed configuration of the first wireless communication device 101 will be described. The first communicator 121 is a wireless module that operates in accordance with the first communication protocol. For example, the first communication protocol is IEEE802.11, and the first communicator 121 operates as an AP of IEEE802.11. The first communicator 121 includes a baseband circuit 122, an RF circuit 123, and an antenna 124.

The baseband circuit 122 converts a digital signal into an analog signal through D/A conversion. The analog signal generated by the baseband circuit 122 is output to the RF circuit 123. In addition, the baseband circuit 122 converts an analog signal output from the RF circuit 123 into a digital signal through A/D conversion and processes the digital signal. The first wireless communication device 101 may include a processor. In a case in which the first wireless communication device 101 includes the processor, the processor may control part of the processing in the media access control (MAC) layer among processing performed on the digital signal by the baseband circuit 122. The MAC layer is included in the data link layer.

The RF circuit 123 modulates the analog signal output from the baseband circuit 122 into an analog signal of a frequency band of carrier waves. The analog signal modulated by the RF circuit 123 is output to the antenna 124. In addition, the RF circuit 123 demodulates the analog signal of the frequency band of carrier waves output from the antenna 124. The analog signal demodulated by the RF circuit 123 is output to the baseband circuit 122. The antenna 124 converts the analog signal output from the RF circuit 123 into radio waves and transmits the radio waves to the second wireless communication device 201. In addition, the antenna 124 receives radio waves transmitted from the second wireless communication device 201 and converts the received radio waves into an analog signal. The analog signal processed by the antenna 124 is output to the RF circuit 123.

In the example shown in FIG. 1, the antenna 124 is disposed inside the first communicator 121. The antenna 124 may be disposed outside the first communicator 121.

The second communicator 131 is a wireless or wired module that operates in accordance with the second communication protocol. For example, the second communication protocol is NFC provided in ISO/IEC14443 or ISO/IEC15693. The second communication protocol may be different from NFC. For example, in a case in which the second communication protocol is the short-range wireless communication technique, the second communication protocol may be NFC, RFID, IEEE802.15.4, infrared communication, Bluetooth (registered trademark), or the like. In a case in which the second communication protocol is the wired communication technique, the second communication protocol may be a USB, IEEE802.3, or the like.

In a case in which the second communication protocol is the short-range wireless communication protocol, a first distance is longer than a second distance. The first distance is the maximum distance between the first communicator 121 and the third communicator 221 when the first communicator 121 and the third communicator 221 perform wireless communication with each other. The second distance is the maximum distance between the second communicator 131 and the fourth communicator 231 when the second communicator 131 and the fourth communicator 231 perform wireless communication with each other. The distance in which communication using the first communication protocol is available is longer than that in which communication using the second communication protocol is available.

The second communicator 131 includes a baseband circuit 132, an RF circuit 133, and an antenna 134. The baseband circuit 132 converts a digital signal into an analog signal through D/A conversion. The analog signal generated by the baseband circuit 132 is output to the RF circuit 133. In addition, the baseband circuit 132 converts an analog signal output from the RF circuit 133 into a digital signal through A/D conversion and processes the digital signal. In a case in which the first wireless communication device 101 includes a processor, the processor may control part of the processing in the MAC layer among processing performed on the digital signal by the baseband circuit 132.

The RF circuit 133 modulates the analog signal output from the baseband circuit 132 into an analog signal of a frequency band of carrier waves. The analog signal modulated by the RF circuit 133 is output to the antenna 134. In addition, the RF circuit 133 demodulates the analog signal of the frequency band of carrier waves output from the antenna 134. The analog signal demodulated by the RF circuit 133 is output to the baseband circuit 132. The antenna 134 converts the analog signal output from the RF circuit 133 into radio waves and transmits the radio waves to the second wireless communication device 201. In addition, the antenna 134 receives radio waves transmitted from the second wireless communication device 201 and converts the received radio waves into an analog signal. The analog signal processed by the antenna 134 is output to the RF circuit 133.

In the example shown in FIG. 1, the antenna 134 is disposed inside the second communicator 131. The antenna 134 may be disposed outside the second communicator 131. In a case in which the first wireless communication device 101 includes a processor, the first communicator 121 and the second communicator 131 may be connected to each other via the processor.

A detailed configuration of the second wireless communication device 201 will be described. For example, the processor 211 is at least one of a central processing unit (CPU), a digital signal processor (DSP), and a graphics-processing unit (GPU). The second wireless communication device 201 may include one or a plurality of processors. The processor 211 may be at least one of a dedicated IC, an application-specific integrated circuit (ASIC), and a field-programmable gate array (FPGA).

The processor 211 may read a program and may execute the read program. The program includes commands defining the operations of the processor 211. In other words, the functions of the processor 211 may be realized by software. The program, for example, may be provided by using a "computer-readable recording medium" such as a flash memory. The program may be transmitted from a computer storing the program to the second wireless communication device 201 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

The third communicator 221 is a wireless module that operates in accordance with the first communication protocol. For example, the first communication protocol is IEEE802.11, and the third communicator 221 operates as an STA of IEEE802.11. The third communicator 221 includes a baseband circuit 222, an RF circuit 223, and an antenna 224.

The baseband circuit 222 converts a digital signal into an analog signal through D/A conversion. The analog signal generated by the baseband circuit 222 is output to the RF circuit 223. In addition, the baseband circuit 222 converts an analog signal output from the RF circuit 223 into a digital signal through A/D conversion and processes the digital signal. The processor 211 controls part of the processing in the MAC layer among processing performed on the digital signal by the baseband circuit 222.

The RF circuit 223 modulates the analog signal output from the baseband circuit 222 into an analog signal of a frequency band of carrier waves. The analog signal modulated by the RF circuit 223 is output to the antenna 224. In addition, the RF circuit 223 demodulates the analog signal of the frequency band of carrier waves output from the antenna 224. The analog signal demodulated by the RF circuit 223 is output to the baseband circuit 222. The antenna 224 converts the analog signal output from the RF circuit 223 into radio waves and transmits the radio waves to the first wireless communication device 101. In addition, the antenna 224 receives radio waves transmitted from the first wireless communication device 101 and converts the received radio waves into an analog signal. The analog signal processed by the antenna 224 is output to the RF circuit 223.

In the example shown in FIG. 2, the antenna 224 is disposed inside the third communicator 221. The antenna 224 may be disposed outside the third communicator 221.

The fourth communicator 231 is a wireless or wired module that operates in accordance with the second communication protocol. The fourth communicator 231 may include a rewritable built-in recording medium. The fourth communicator 231 includes a baseband circuit 232, an RF circuit 233, and an antenna 234.

The baseband circuit 232 converts a digital signal into an analog signal through D/A conversion. The analog signal generated by the baseband circuit 232 is output to the RF circuit 233. In addition, the baseband circuit 232 converts an analog signal output from the RF circuit 233 into a digital signal through A/D conversion and processes the digital signal. The processor 211 controls part of the processing in the MAC layer among processing performed on the digital signal by the baseband circuit 232.

The RF circuit 233 modulates the analog signal output from the baseband circuit 232 into an analog signal of a frequency band of carrier waves. The analog signal modulated by the RF circuit 233 is output to the antenna 234. In addition, the RF circuit 233 demodulates the analog signal of the frequency band of carrier waves output from the antenna 234. The analog signal demodulated by the RF circuit 233 is output to the baseband circuit 232. The antenna 234 converts the analog signal output from the RF circuit 233 into radio waves and transmits the radio waves to the first wireless communication device 101. In addition, the antenna 234 receives radio waves transmitted from the first wireless communication device 101 and converts the received radio waves into an analog signal. The analog signal processed by the antenna 234 is output to the RF circuit 233.

In the example shown in FIG. 2, the antenna 234 is disposed inside the fourth communicator 231. The antenna 234 may be disposed outside the fourth communicator 231.

The processor 211 is disposed outside the third communicator 221 and the fourth communicator 231 and controls the entire operations of the second wireless communication device 201. The processor 211 controls the baseband circuit 222, the baseband circuit 232, and the memory 241. In a case in which the second wireless communication device 201 includes a display unit, an operation unit, or the like not shown in FIG. 2, the processor 211 controls the display unit, the operation unit, or the like. A processor disposed inside the third communicator 221 may control the baseband circuit 222 in place of the processor 211. In such a case, the processor 211 controls the processor inside the third communicator 221. A processor disposed inside the fourth communicator 231 may control the baseband circuit 232 in place of the processor 211. In such a case, the processor 211 controls the processor inside the fourth communicator 231.

The processor 211 transmits data or information to the first wireless communication device 101 by using the third communicator 221 or the fourth communicator 231. Specifically, the processor 211 controls the third communicator 221 or the fourth communicator 231 such that data or information is transmitted to the first wireless communication device 101. In other words, the processor 211 causes the third communicator 221 or the fourth communicator 231 to transmit data or information for the first wireless communication device 101. In this way, the third communicator 221 or the fourth communicator 231 transmits data or information to the first wireless communication device 101. The processor 211 receives data or information from the first wireless communication device 101 by using the third communicator 221 or the fourth communicator 231. Specifically, the processor 211 controls the third communicator 221 or the fourth communicator 231 such that data or information is received from the first wireless communication device 101. In other words, the processor 211 causes the third communicator 221 or the fourth communicator 231 to receive data or information from the first wireless communication device 101. In this way, the third communicator 221 or the fourth communicator 231 receives data or information from the first wireless communication device 101.

The memory 241 is a volatile or nonvolatile storage medium. For example, the memory 241 is at least one of a random-access memory (RAM), a dynamic random-access memory (DRAM), a static random-access memory (SRAM), an electrically erasable programmable read-only memory (EEPROM), a ferroelectric random-access memory (FRAM), and a flash memory.

Figure 3:
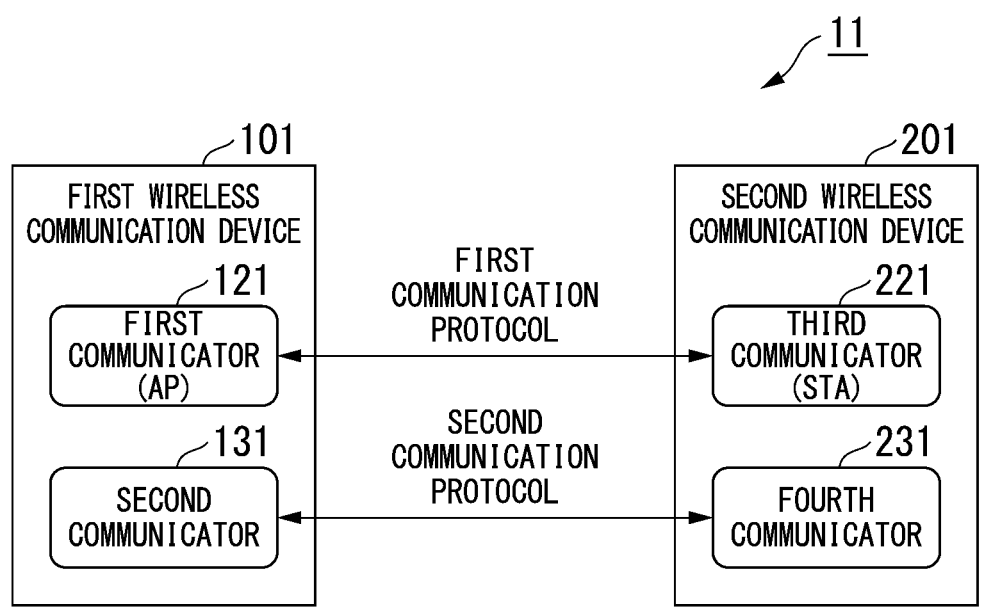
FIG. 3 is a block diagram showing a configuration of a wireless communication system according to the first embodiment of the present invention.

FIG. 3 shows a configuration of a wireless communication system 11 including the first wireless communication device 101 and the second wireless communication device 201. The first communicator 121 (AP) of the first wireless communication device 101 and the third communicator 221 (STA) of the second wireless communication device 201 perform wireless communication in accordance with the first communication protocol. The second communicator 131 of the first wireless communication device 101 and the fourth communicator 231 of the second wireless communication device 201 perform wireless or wired communication in accordance with the second communication protocol.

A similar relationship between a master device and a slave device of the second communication protocol to that between a master device and a slave device of the first communication protocol may be defined. Alternatively, the relationship between the master device and the slave device of the second communication protocol does not need to be defined. In a case in which the relationship between the master device and the slave device of the second communication protocol is defined, either the second communicator 131 or the fourth communicator 231 may be the master device and either the second communicator 131 or the fourth communicator 231 may be the slave device.

The connection-setting information and the setting-related information will be described. The setting-related information may be connection-setting information itself set in an AP or may be information used for generating the connection-setting information. The connection-setting information includes a network identifier (SSID) and includes one of a passphrase and a pre-shared key (PSK). The SSID is used for connection. The passphrase and the PSK are used for authentication. In a case in which the passphrase is used, the SSID is used for the connection and the authentication. The AP and the STA use the connection-setting information in the connection and the authentication. In a case in which the setting-related information is connection-setting information itself, the setting-related information includes at least the SSID and includes one of the passphrase and the PSK. In a case in which the authentication is unnecessary, the setting-related information may include only the SSID.

In a case in which the setting-related information is configured to be information used for generating the connection-setting information, each of the first wireless communication device 101 and the second wireless communication device 201 includes an information generation unit for generating the connection-setting information from the setting-related information. The information generation unit, for example, performs predetermined calculation on the setting-related information. The information generation unit included in the first wireless communication device 101 and the information generation unit included in the second wireless communication device 201 are the same. The two same information generation units generate the same SSIDs on the basis of the same setting-related information and generate the same passphrases or PSKs.

A means for generating the connection-setting information may be stored in the first wireless communication device 101 and the second wireless communication device 201 as a program in advance. The program may be input into the first wireless communication device 101 and the second wireless communication device 201 through operations by a user for operation units not shown in the drawing. The first wireless communication device 101 may receive the program from the second wireless communication device 201 or another communication device by using the first communicator 121 or the second communicator 131. The second wireless communication device 201 may receive the program from the first wireless communication device 101 or another communication device by using the third communicator 221 or the fourth communicator 231.

Each of the first wireless communication device 101 and the second wireless communication device 201 may receive the program from another communication device by performing communication using a communicator not shown in the drawing. A recording medium on which the program is recorded may be connected to the first wireless communication device 101, and the first wireless communication device 101 may read the program from the recording medium. A recording medium on which the program is recorded may be connected to the second wireless communication device 201, and the second wireless communication device 201 may read the program from the recording medium.

Figure 4:
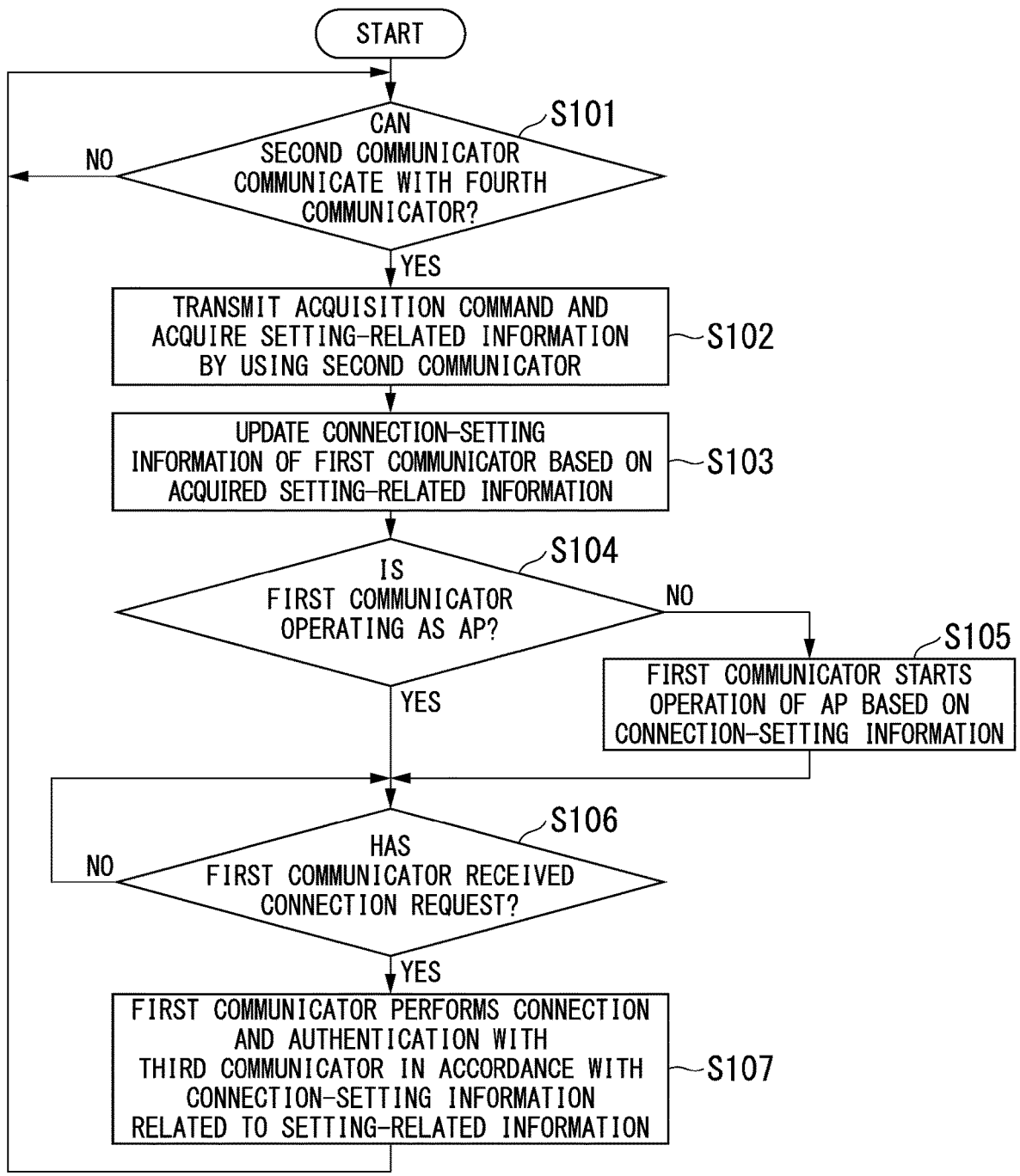
FIG. 4 is a flow chart showing a procedure of an operation of the first wireless communication device according to the first embodiment of the present invention.

An operation of the first wireless communication device 101 will be described. FIG. 4 shows a procedure of the operation of the first wireless communication device 101.

(Step S101)

The second communicator 131 determines whether or not the second communicator 131 can communicate with the fourth communicator 231. For example, in a case in which the second communicator 131 has executed scanning and has received a response from the fourth communicator 231, the second communicator 131 determines that the second communicator 131 can communicate with the fourth communicator 231. Alternatively, in a case in which the fourth communicator 231 has executed scanning, the second communicator 131 determines that the second communicator 131 can communicate with the fourth communicator 231. Alternatively, in a case in which the second communicator 131 has received a signal indicating the presence of the fourth communicator 231 from the fourth communicator 231, the second communicator 131 determines that the second communicator 131 can communicate with the fourth communicator 231.

In a case in which a protocol through which scanning is not executed or a protocol through which a signal indicating the presence of a device is not transmitted is used, the second communicator 131 may determine as follows. When the second communicator 131 has succeeded in transmitting some data to the fourth communicator 231 or has succeeded in receiving some data from the fourth communicator 231, the second communicator 131 may determine that the second communicator 131 can communicate with the fourth communicator 231. In a case in which the protocol through which scanning is not executed or the protocol through which the signal indicating the presence of a device is not transmitted is used, Step S101 may be omitted.

When the second communicator 131 determines that the second communicator 131 cannot communicate with the fourth communicator 231, Step S101 is executed. In other words, the second communicator 131 repeats determination until the second communicator 131 succeeds in communicating with the fourth communicator 231. When the second communicator 131 determines that the second communicator 131 can communicate with the fourth communicator 231, Step S102 is executed.

(Step S102)

The second communicator 131 transmits an acquisition command to the fourth communicator 231. The acquisition command may be a command for acquiring the setting-related information. The acquisition command may be a command for causing transmission data set in the fourth communicator 231 to be transmitted. The acquisition command may be a command for acquiring the setting-related information stored on the memory 241 via the fourth communicator 231. The second communicator 131 receives the setting-related information from the fourth communicator 231. The second communicator 131 reports the received setting-related information to the first communicator 121.

In a case in which the first communicator 121 has already performed the connection and the authentication with the third communicator 221, the first communicator 121 may perform disconnection in Step S102. For example, the first communicator 121 may cut off connection to the third communicator 221 by transmitting a deauthentication or a disassociation to the third communicator 221.

(Step S103)

After Step S102, the first communicator 121 updates the connection-setting information set in the first communicator 121 on the basis of the setting-related information reported from the second communicator 131. In this way, the first communicator 121 holds the connection-setting information related to the setting-related information.

In a case in which the first wireless communication device 101 includes a processor, the second communicator 131 may report the received setting-related information to the processor and the processor may output the setting-related information to the first communicator 121. In a case in which the setting-related information is configured to be information used for generating the connection-setting information, the first communicator 121 holds the connection-setting information generated by the information generation unit in Step S103.

In a case in which the first communicator 121 has already started the operation of the AP in Step S103, the first communicator 121 may update the connection-setting information while the first communicator 121 continues the operation of the AP and may immediately apply the setting. In this case, before updating the connection-setting information, the first communicator 121 may cut off connection to a communication device with which the connection and the authentication have been performed. The first communicator 121 may update the connection-setting information after completing the operation of the AP. In this case, before completing the operation of the AP, the first communicator 121 may cut off connection to a communication device with which the connection and the authentication have been performed.

(Step S104)

After Step S103, the state of the first communicator 121 is determined. When the first communicator 121 is not operating as the AP, Step S105 is executed. When the first communicator 121 is operating as the AP, Step S106 is executed.

(Step S105)

The first communicator 121 starts the operation of the AP on the basis of the connection-setting information. After Step S105, Step S106 is executed.

In a case in which the first wireless communication device 101 includes a processor, the processor may determine whether or not the first communicator 121 is operating as the AP in Step S104. When the first communicator 121 is not operating as the AP, the processor may output an AP-operation start instruction for starting the operation of the AP to the first communicator 121.

The processor may check the state of the AP operation of the first communicator 121 by inquiring the first communicator 121 about state of the AP operation of the first communicator 121 in Step S104. After the power source of the first communicator 121 is turned on, a start of the AP operation may be reported from the first communicator 121 to the processor. In a case in which a stoppage of the AP operation is not reported from the first communicator 121 to the processor after the start of the AP operation is reported to the processor, the processor may determine that the first communicator 121 is operating as the AP.

A series of processing shown in FIG. 4 is repeatedly executed. When it is determined that the first communicator 121 is operating as the AP in Step S104, or when the first communicator 121 starts the operation of the AP in Step S105, the first communicator 121 is operating as the AP. In this case, Step S106 may be executed without checking an actual state of the AP operation of the first communicator 121 in Step S104 until the first communicator 121 stops the operation of the AP.

(Step S106)

The first communicator 121 waits for reception of a connection request. When the connection request including the SSID in the connection-setting information set in the first communicator 121 is transmitted from the third communicator 221, the first communicator 121 receives the connection request. For example, the connection request is an association request.

(Step S107)

When the connection request is received, the first communicator 121 transmits an association response as a connection response to the third communicator 221. In this way, connection for data communication is completed, and the first communicator 121 and the third communicator 221 are connected to each other. The first communicator 121 executes authentication processing with the third communicator 221 on the basis of, for example, WPA2-PSK by using the passphrase or the PSK set in the first communicator 121. After authentication is completed, the first communicator 121 and the third communicator 221 may perform the data communication. After Step S107, Step S101 is executed.

In a case in which the authentication is unnecessary, the first communicator 121 does not need to execute the authentication processing in Step S107. The first communicator 121 may start the operation of the AP at an arbitrary timing before starting the operation of the AP in Step S105. Before Step S103 is first executed, some connection-setting information may be applied to the first communicator 121.

Figure 5:
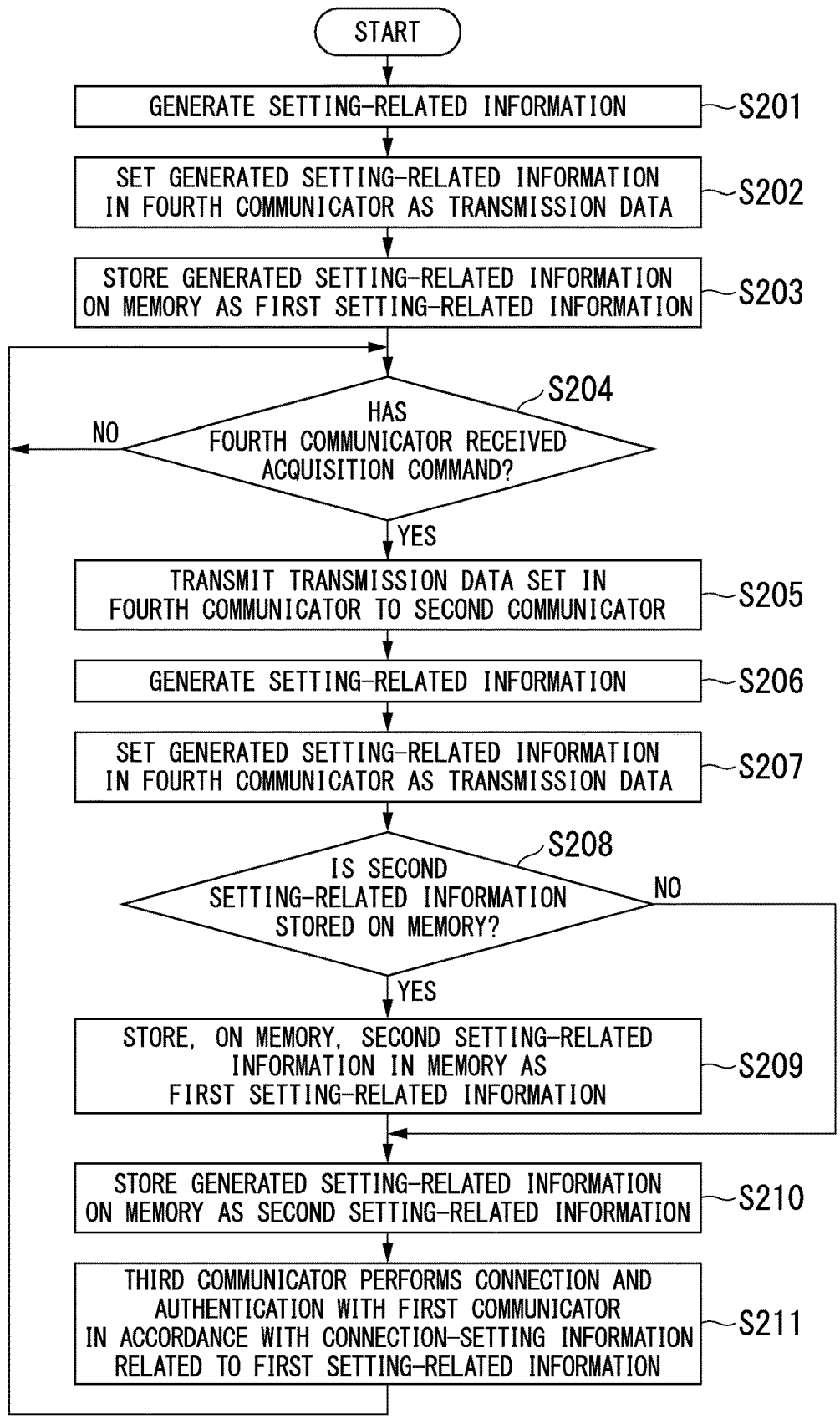
FIG. 5 is a flow chart showing a procedure of an operation of the second wireless communication device according to the first embodiment of the present invention.

An operation of the second wireless communication device 201 will be described. FIG. 5 shows a procedure of the operation of the second wireless communication device 201.

(Step S201)

The processor 211 generates the setting-related information. The setting-related information may be input into the second wireless communication device 201 through an operation performed by a user of an operation unit not shown in the drawing. The second wireless communication device 201 may receive the setting-related information from a communication device other than the first wireless communication device 101 by using the third communicator 221 or the fourth communicator 231. The second wireless communication device 201 may receive the setting-related information from a communication device other than the first wireless communication device 101 by performing communication using a communicator not shown in the drawing. A recording medium on which the setting-related information is recorded may be connected to the second wireless communication device 201, and the second wireless communication device 201 may read the setting-related information from the recording medium.

In a case in which the setting-related information is the connection-setting information, the processor 211 may directly generate the connection-setting information. Alternatively, the processor 211 may generate information used for generating the connection-setting information and may generate the connection-setting information on the basis of the generated information. In a case in which the setting-related information is configured to be information used for generating the connection-setting information, the processor 211 may directly generate the information.

In a case in which the setting-related information is configured to be information used for generating the connection-setting information, the processor 211 may generate the connection-setting information and may generate the setting-related information on the basis of the connection-setting information. For example, the processor 211 generates the setting-related information by performing predetermined calculation on the connection-setting information. In a case in which the processor 211 generates the connection-setting information on the basis of the setting-related information, the processor 211 generates the connection-setting information by performing reverse calculation to that described above.

(Step S202)

After Step S201, the processor 211 sets the setting-related information generated in Step S201 in the fourth communicator 231 as transmission data. The fourth communicator 231 holds the setting-related information.

(Step S203)

After Step S202, the processor 211 stores the setting-related information generated in Step S201 on the memory 241 as the first setting-related information.

The order in which Step S202 and Step S203 are executed may be different from that shown in FIG. 5. After Step S201 is executed, Step S203 may be executed and then Step S202 may be executed.

(Step S204)

When the acquisition command is transmitted from the second communicator 131, the fourth communicator 231 receives the acquisition command. The processor 211 monitors the fourth communicator 231 and determines whether or not the acquisition command has been received. When the processor 211 determines that the acquisition command has not been received, Step S204 is executed. In other words, the processor 211 repeats the determination until the acquisition command is received. When the processor 211 determines that the acquisition command has been received, Step S205 is executed.

(Step S205)

The fourth communicator 231 transmits the setting-related information set as the transmission data to the second communicator 131 and reports transmission of the setting-related information to the processor 211. The processor 211 may cause the fourth communicator 231 to transmit the transmission data.

In a case in which the acquisition command is configured to be a command for acquiring the setting-related information stored on the memory 241 via the fourth communicator 231, the processor 211 acquires the first setting-related information from the memory 241 and outputs the first setting-related information to the fourth communicator 231. The fourth communicator 231 transmits the setting-related information acquired from the memory 241 to the second communicator 131.

(Step S206)

After Step S205, the processor 211 generates different setting-related information from that generated in Step S201. The generated setting-related information is different from any of the first setting-related information stored on the memory 241 and the setting-related information set in the fourth communicator 231.

(Step S207)

After Step S206, the processor 211 sets the setting-related information generated in Step S206 in the fourth communicator 231 as the transmission data. The fourth communicator 231 holds the setting-related information. For example, the setting-related information set in the fourth communicator 231 before Step S207 is executed is deleted.

(Step S208)

After Step S207, the processor 211 determines whether or not the second setting-related information is stored on the memory 241. When the processor 211 determines that the second setting-related information is stored on the memory 241, Step S209 is executed. When the processor 211 determines that the second setting-related information is not stored on the memory 241, Step S210 is executed.

(Step S209)

The processor 211 outputs, to the memory 241, an instruction for causing the memory 241 to store the second setting-related information stored on the memory 241 as the first setting-related information. The memory 241 stores the second setting-related information stored on the memory 241 as the first setting-related information.

Old first setting-related information is stored on the memory 241 before the second setting-related information is stored on the memory 241 as new first setting-related information in Step S209. The old first setting-related information may be deleted from the memory 241. Alternatively, the old first setting-related information does not need to be deleted, and only the latest first setting-related information may be used as the first setting-related information.

(Step S210)

After Step S209, the processor 211 stores the setting-related information generated in Step S206 on the memory 241 as the second setting-related information.

There is a case in which old second setting-related information is stored on the memory 241 before another piece of the second setting-related information is stored on the memory 241 in Step S210. The old second setting-related information may be deleted from the memory 241. Alternatively, the old second setting-related information does not need to be deleted, and only the latest second setting-related information may be used as the second setting-related information.

(Step S211)

After Step S210, the processor 211 acquires the first setting-related information from the memory 241 and sets the first setting-related information in the third communicator 221. The third communicator 221 holds the connection-setting information related to the first setting-related information. The third communicator 221 connects to the first communicator 121 on the basis of the connection-setting information. Specifically, the third communicator 221 transmits a connection request including the SSID in the connection-setting information held in the third communicator 221 to the first communicator 121 and receives an association response as a connection response from the first communicator 121. In this way, connection for data communication is completed, and the first communicator 121 and the third communicator 221 are connected to each other. The third communicator 221 executes the authentication processing with the first communicator 121 on the basis of, for example, the WPA2-PSK by using the passphrase or the PSK set in the third communicator 221. After authentication is completed, the first communicator 121 and the third communicator 221 may perform the data communication. After Step S211, Step S204 is executed.

In a case in which the first setting-related information is the connection-setting information, the third communicator 221 performs the connection and the authentication by using the connection-setting information. In a case in which the first setting-related information is configured to be information used for generating the connection-setting information, the third communicator 221 performs the connection and the authentication by using the connection-setting information generated on the basis of the first setting-related information by the information generation unit.

The third communicator 221 may output an acquisition request for acquiring the first setting-related information from the memory 241 to the processor 211. When the acquisition request is output from the third communicator 221, the processor 211 may acquire the first setting-related information from the memory 241 and may output the first setting-related information to the third communicator 221. Alternatively, following Step S210, the processor 211 may acquire the first setting-related information from the memory 241 and may output the first setting-related information to the third communicator 221.

In a case in which Step S211 is executed in a state in which the third communicator 221 has already connected to the first communicator 121, the third communicator 221 cuts off connection to the first communicator 121. After the connection to the first communicator 121 is cut off, the third communicator 221 connects to the first communicator 121. The third communicator 221 does not simultaneously maintain multiple connections with the first communicator 121.

In a case in which the authentication is unnecessary, the third communicator 221 does not need to execute the authentication processing in Step S211.

After Step S211 is executed, the third communicator 221 waits for reception of a next acquisition command. When the third communicator 221 receives the acquisition command, Steps S205 to S211 are executed again. After the processor 211 generates the setting-related information in Step S206, the memory 241 stores the already stored second setting-related information as the first setting-related information. After the processor 211 generates the setting-related information in Step S206, the memory 241 stores the generated setting-related information as the second setting-related information.

The following processing may be executed regarding Step S202, Step S207, and Step S205. The transmission data do not need to be set in the fourth communicator 231, and the processor 211 may store the transmission data on the memory 241 in Step S202 and Step S207. When the acquisition command is received in Step S204, the fourth communicator 231 may report reception of the acquisition command to the processor 211 in Step S205 and the processor 211 may acquire the transmission data stored on the memory 241 and may transmit the transmission data to the second communicator 131 by using the fourth communicator 231.

The timings at which Step S202 and Step S207 are executed are not limited to those shown in FIG. 5. As long as Step S202 is executed before Step S205 is executed, Step S202 may be executed at an arbitrary timing. As long as Step S207 is executed after Step S205 is executed and before Step S205 is next executed, Step S207 may be executed at an arbitrary timing.

In a case in which the third communicator 221 has already performed the connection and the authentication with the first communicator 121, the third communicator 221 may perform disconnection. Specifically, the third communicator 221 may perform the disconnection at an arbitrary timing between the timing at which the acquisition command is received in Step S204 and the timing at which Step S211 is executed.

In a case in which the first setting-related information is configured to be information used for generating the connection-setting information, the information generation unit generates the connection-setting information on the basis of the first setting-related information and the third communicator 221 performs the connection and the authentication by using the connection-setting information in Step S211. Instead of this, the following processing may be executed. The information generation unit may generate the connection-setting information on the basis of the setting-related information generated in Step S201. The processor 211 may set the connection-setting information in the fourth communicator 231 in Step S202 and may store the connection-setting information on the memory 241 in Step S203. The information generation unit may generate the connection-setting information on the basis of the setting-related information generated in Step S206, and the processor 211 may store the connection-setting information on the memory 241 in Step S210.

In a case in which the second setting-related information stored on the memory 241 is configured to be information used for generating the connection-setting information, the information generation unit may generate the connection-setting information on the basis of the second setting-related information and the memory 241 may store the connection-setting information as the first setting-related information.

Transmission of the acquisition command is unnecessary. For example, the fourth communicator 231 may transmit the setting-related information to the second communicator 131 at a timing set in advance. The fourth communicator 231 may transmit the setting-related information to the second communicator 131 on a regular basis.

Figure 6:
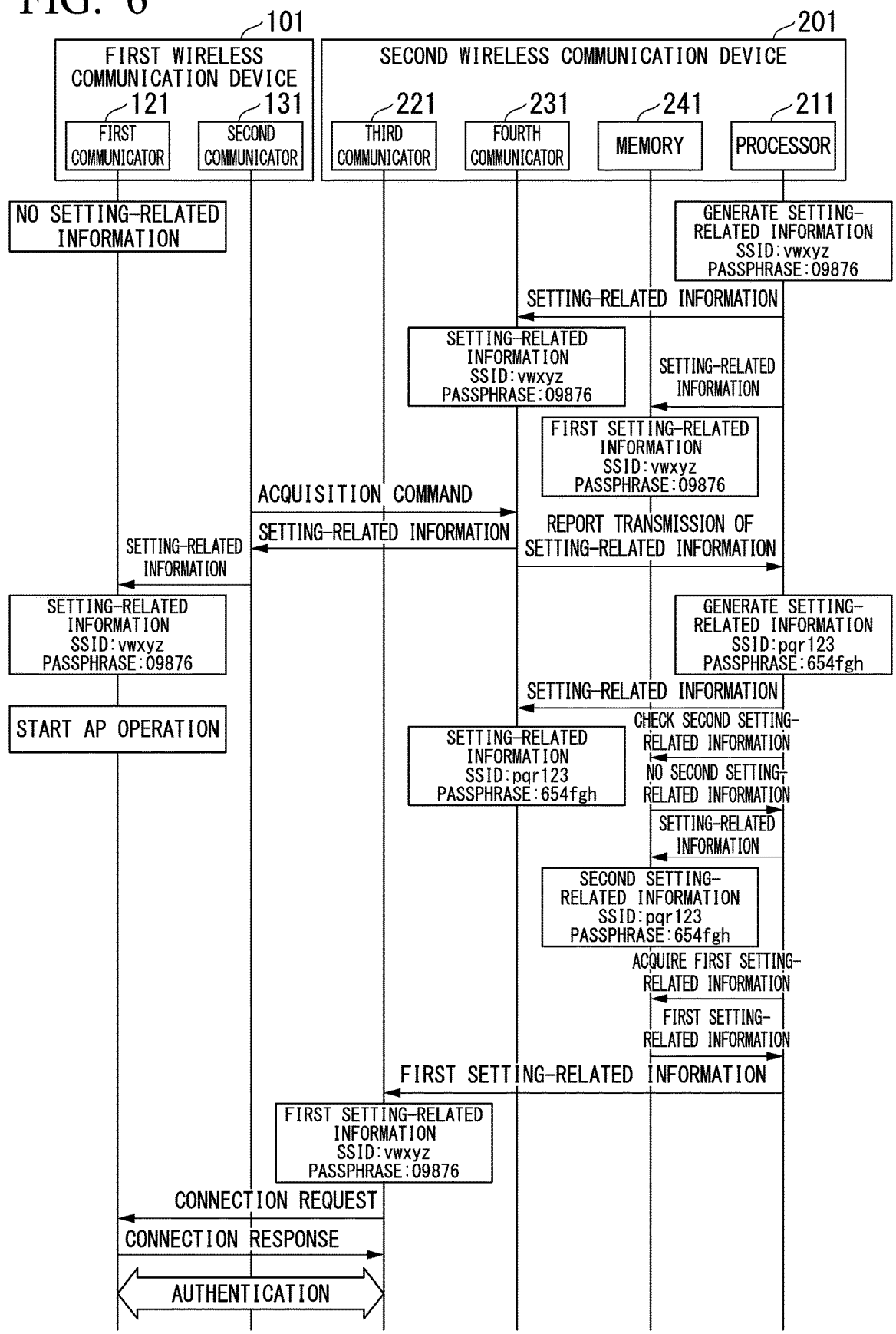
FIG. 6 is a sequence chart showing a procedure of communication in the first embodiment of the present invention.
Figure 7:
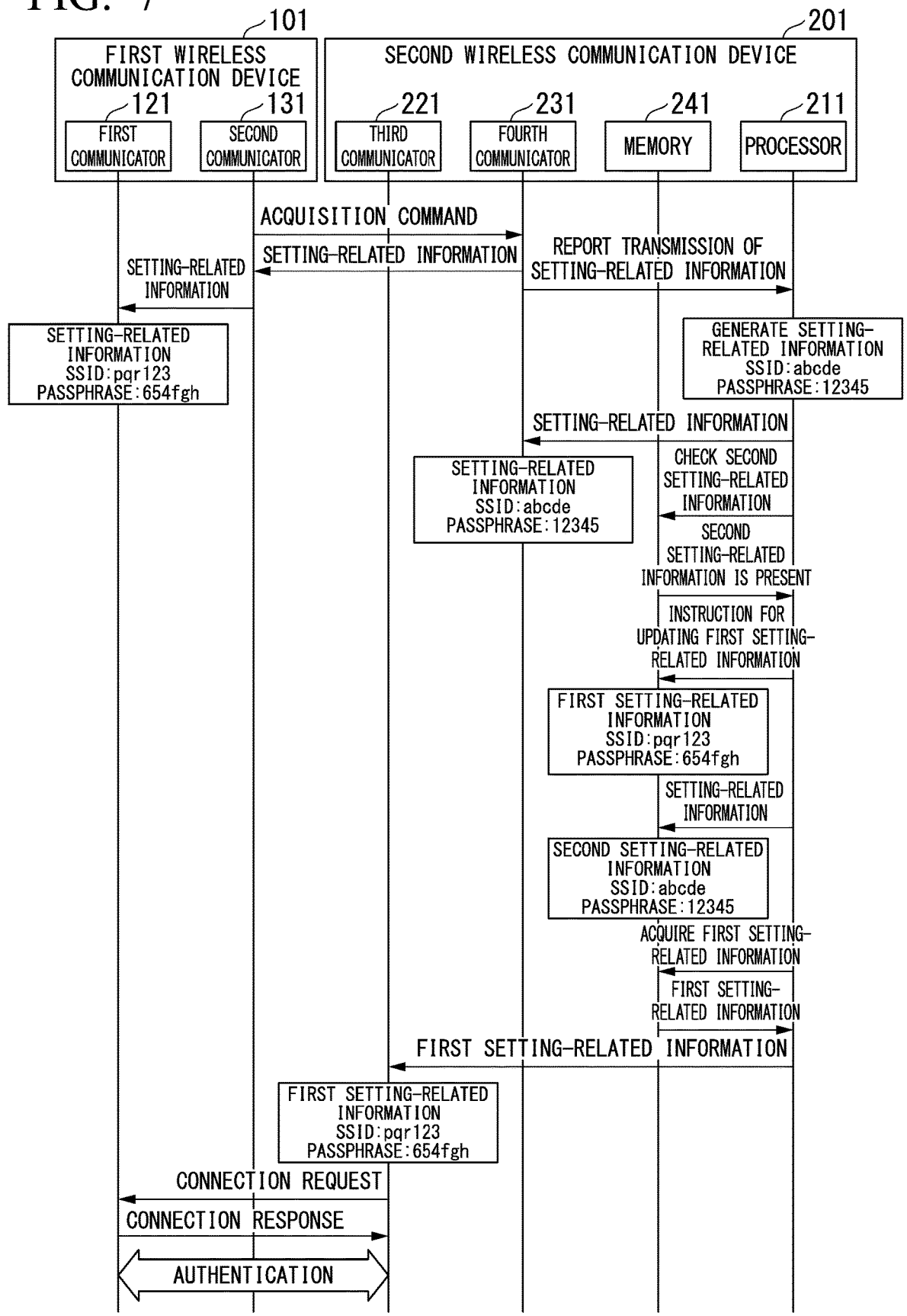
FIG. 7 is a sequence chart showing a procedure of communication in the first embodiment of the present invention.

FIG. 6 and FIG. 7 show a procedure of communication between the first wireless communication device 101 and the second wireless communication device 201. An operation of each device will be described by referring to HG 6 and FIG. 7. After an operation shown in FIG. 6 is executed, an operation shown in FIG. 7 is executed.

In the following example, the setting-related information is the same as the connection-setting information. Even when the setting-related information is configured to be information used for generating the connection-setting information, the majority of the following example is not changed.

When the operation shown in FIG. 6 is started, the first communicator 121 of the first wireless communication device 101 does not hold the setting-related information, that is, the connection-setting information. In the second wireless communication device 201, the processor 211 generates the setting-related information corresponding to the connection-setting information (SSID="vwxyz", passphrase="09876") (Step S201). The processor 211 sets the generated setting-related information in the fourth communicator 231 as the transmission data (Step S202). The processor 211 causes the memory 241 to store the generated setting-related information as the first setting-related information (Step S203).

In the first wireless communication device 101, the second communicator 131 determines that the second communicator 131 can communicate with the fourth communicator 231 (Step S101). The second communicator 131 transmits an acquisition command to the fourth communicator 231. After the acquisition command is transmitted, the second communicator 131 receives the setting-related information from the fourth communicator 231 and reports the received setting-related information to the first communicator 121 (Step S102).

In the second wireless communication device 201, the fourth communicator 231 receives the acquisition command (Step S204). The fourth communicator 231 transmits the setting-related information set as the transmission data to the second communicator 131 and reports transmission of the setting-related information to the processor 211 (Step S205).

In the first wireless communication device 101, the first communicator 121 updates the connection-setting information set in the first communicator 121 on the basis of the setting-related information reported from the second communicator 131 (Step S103). At this time, the SSID of the connection-setting information becomes "vwxyz", and the passphrase of the connection-setting information becomes "09876". The first communicator 121 is not operating as the AP (Step S104). The first communicator 121 starts the operation of the AP on the basis of the connection-setting information (Step S105).

After transmission of the setting-related information is reported to the processor 211 in the second wireless communication device 201, the processor 211 generates the setting-related information corresponding to the connection-setting information (SSID="pqr123", passphrase="654fgh") (Step S206). The processor 211 sets the generated setting-related information in the fourth communicator 231 as the transmission data (Step S207).

The processor 211 checks whether or not the second setting-related information is stored on the memory 241 and determines that the second setting-related information is not stored on the memory 241 (Step S208). Therefore, the processor 211 stores the generated setting-related information on the memory 241 as the second setting-related information (Step S210).

The processor 211 acquires the first setting-related information from the memory 241 and outputs the first setting-related information to the third communicator 221. Since the first setting-related information is the connection-setting information, the third communicator 221 connects to the first communicator 121 as the STA by using the connection-setting information and performs the authentication with the first communicator 121 by using the connection-setting information (Step S211). At this time, the SSID of the connection-setting information is "vwxyz", and the passphrase of the connection-setting information is "09876". Since the connection-setting information used by the third communicator 221 is the same as that set in the first communicator 121, the connection and the authentication are successfully performed.

In the first wireless communication device 101, the first communicator 121 receives a connection request (Step S106). The first communicator 121 performs the connection and the authentication (Step S107). At this time, since the connection-setting information set in the first communicator 121 is the same as that used by the third communicator 221, the connection and the authentication are successfully performed.

In the first wireless communication device 101, the second communicator 131 determines again that the second communicator 131 can communicate with the fourth communicator 231 (Step S101). The second communicator 131 transmits an acquisition command to the fourth communicator 231. After the acquisition command is transmitted, the second communicator 131 receives the setting-related information from the fourth communicator 231 and reports the received setting-related information to the first communicator 121 (Step S102).

In the second wireless communication device 201, the fourth communicator 231 receives the acquisition command (Step S204). The fourth communicator 231 transmits the setting-related information set as the transmission data to the second communicator 131 and reports transmission of the setting-related information to the processor 211 (Step S205).

In the first wireless communication device 101, the first communicator 121 updates the connection-setting information set in the first communicator 121 on the basis of the setting-related information reported from the second communicator 131 (Step S103). At this time, the SSID of the connection-setting information becomes "pqr123", and the passphrase of the connection-setting information becomes "654fgh". The first communicator 121 is operating as the AP (Step S104).

After transmission of the setting-related information is reported to the processor 211 in the second wireless communication device 201, the processor 211 generates the setting-related information corresponding to the connection-setting information (SSID="abcde", passphrase="12345") (Step S206). The processor 211 sets the generated setting-related information in the fourth communicator 231 as the transmission data (Step S207).

The processor 211 checks whether or not the second setting-related information is stored on the memory 241 and determines that the second setting-related information is stored on the memory 241 (Step S208). The processor 211 outputs, to the memory 241, an instruction for causing the memory 241 to store the second setting-related information stored on the memory 241 as the first setting-related information. The memory 241 stores the second setting-related information stored on the memory 241 as the first setting-related information (Step S209). The memory 241 stores the generated setting-related information as the second setting-related information (Step S210).

The processor 211 acquires the first setting-related information from the memory 241 and outputs the first setting-related information to the third communicator 221. Since the first setting-related information is the connection-setting information, the third communicator 221 connects to the first communicator 121 as the STA by using the connection-setting information and performs the authentication with the first communicator 121 by using the connection-setting information (Step S211). At this time, the SSID of the connection-setting information is "pqr123", and the passphrase of the connection-setting information is "654fgh". Since the connection-setting information used by the third communicator 221 is the same as that set in the first communicator 121, the connection and the authentication are successfully performed.

Before this connection is performed, the connection-setting information of the first communicator 121 has already been changed. Therefore, it is highly probable that the connection between the first communicator 121 and the third communicator 221 has been cut off. If disconnection has not been performed, the disconnection is performed before the connection is performed.

In the first wireless communication device 101, the first communicator 121 receives a connection request (Step S106). The first communicator 121 performs the connection and the authentication (Step S107). At this time, since the connection-setting information set in the first communicator 121 is the same as that used by the third communicator 221, the connection and the authentication are successfully performed.

A wireless communication method according to each aspect of the present invention includes a first step, a second step, a third step, a fourth step, a fifth step, a sixth step, a seventh step, and an eighth step. The fourth communicator 231 holds the first setting-related information in the first step (Step S202) and transmits the first setting-related information to the second communicator 131 in the second step (Step S205). The second communicator 131 receives the first setting-related information in the third step (Step S102). Each time the first setting-related information is transmitted, the processor 211 generates the setting-related information different from the transmitted first setting-related information in the fourth step (Step S206). The fourth communicator 231 holds the setting-related information generated by the processor 211 as the first setting-related information as a replacement for the transmitted first setting-related information in the fifth step (Step S207). The memory 241 stores the setting-related information generated by the processor 211 as the second setting-related information in the sixth step (Step S210).

After the first setting-related information is transmitted, the first communicator 121 and the third communicator 221 connect to each other in accordance with the connection-setting information related to the transmitted first setting-related information in the seventh step (Step S107 and Step S211). The memory 241 stores the already stored second setting-related information as the first setting-related information and stores the setting-related information generated by the processor 211 as the second setting-related information in the eighth step (Step S209 and Step S210) each time the processor 211 generates the setting-related information after the first communicator 121 and the third communicator 221 connect to each other.

The first communicator 121 connects to the third communicator 221 in accordance with the connection-setting information related to the first setting-related information received by the second communicator 131. The third communicator 221 connects to the first communicator 121 in accordance with the connection-setting information related to the first setting-related information stored on the memory 241.

A wireless communication method according to each aspect of the present invention has only to include processing corresponding to the above-described first to eighth steps.

Each time the fourth communicator 231 of the second wireless communication device 201 transmits the setting-related information, new setting-related information is set in the fourth communicator 231. The second communicator 131 of the first wireless communication device 101 receives different setting-related information from that previously received. In other words, each time the second communicator 131 of the first wireless communication device 101 receives the setting-related information, necessary connection-setting information for the operation of the AP by the first communicator 121 changes. Therefore, the third communicator 221 (STA) of the second wireless communication device 201 can perform one-to-one connection with the first communicator 121 (AP) of the first wireless communication device 101 every time. The wireless communication system 11 can cause one AP and one STA to connect to each other and can avoid connection between the AP and another STA.

The distance in which communication using the first communication protocol is available is longer than that in which communication using the second communication protocol is available. The possibility that a communication device of a third party in a range in which communication using the first communication protocol is available taps and uses the setting-related information used in the second communication protocol is reduced. Therefore, it is possible to reduce the possibility that a plurality of STAs including the communication device of the third party connect to one AP.

Second Embodiment

Figure 8:
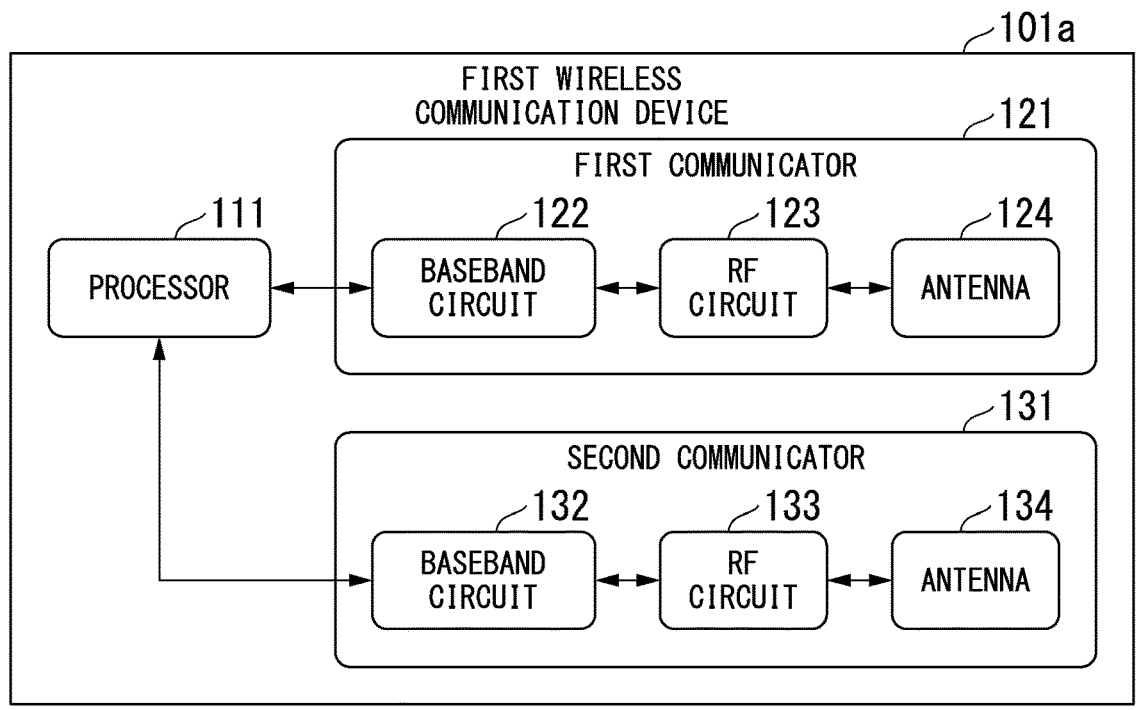
FIG. 8 is a block diagram showing a configuration of a first wireless communication device according to a second embodiment of the present invention.
Figure 9:
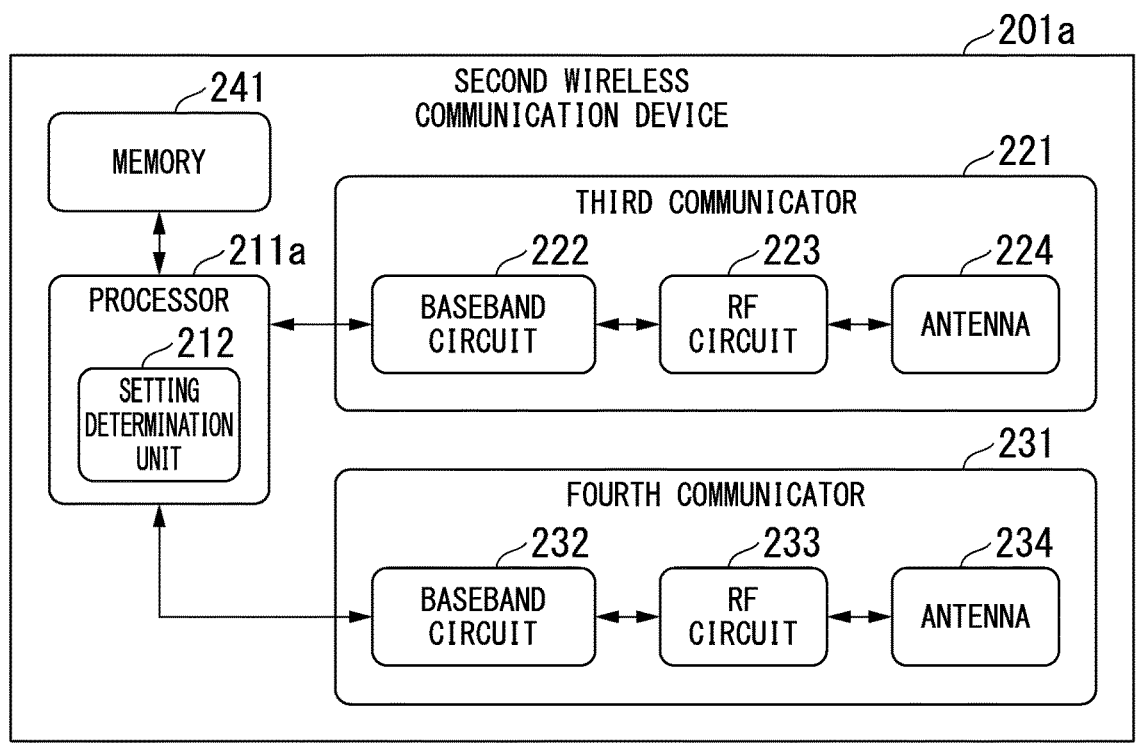
FIG. 9 is a block diagram showing a configuration of a second wireless communication device according to the second embodiment of the present invention.

FIG. 8 shows a configuration of a first wireless communication device 101a according to a second embodiment of the present invention. The same parts as those shown in FIG. 1 will not be described. FIG. 9 shows a configuration of a second wireless communication device 201a according to the second embodiment. The same parts as those shown in FIG. 2 will not be described.

The first wireless communication device 101a includes a processor 111 (second processor) in addition to the configuration shown in FIG. 1. For example, the processor 111 is at least one of a CPU, a DSP, and a GPU. The first wireless communication device 101a may include one or a plurality of processors. The processor 111 may be at least one of a dedicated IC, an ASIC, and an FPGA.

The processor 111 may read a program and may execute the read program. The program includes commands defining the operations of the processor 111. In other words, the functions of the processor 111 may be realized by software. The program is realized similarly to that realizing the functions of the processor 211.

The processor 211 shown in FIG. 2 is changed to a processor 211a. The processor 211a has a similar function to that of the processor 211. In addition, the processor 211a has a function of a setting determination unit 212 that determines whether or not the first setting-related information is to be set in the fourth communicator 231. The memory 241 is different from the rewritable recording medium built in the fourth communicator 231.

When the processor 211a determines that the first setting-related information is to be set in the fourth communicator 231, the fourth communicator 231 holds the first setting-related information. When the processor 211a determines that the first setting-related information is not to be set in the fourth communicator 231, the fourth communicator 231 does not hold the first setting-related information and does not transmit the first setting-related information to the second communicator 131. In a case in which the second communicator 131 does not receive the first setting-related information, the processor 111 generates the first setting-related information. The first communicator 121 acquires the first setting-related information generated by the processor 111 from the processor 111. The second communicator 131 transmits the first setting-related information generated by the processor 111 to the fourth communicator 231.

The fourth communicator 231 receives the first setting-related information. The first communicator 121 connects to the third communicator 221 in accordance with the connection-setting information related to the first setting-related information acquired from the processor 111. The third communicator 221 connects to the first communicator 121 in accordance with the connection-setting information related to the first setting-related information received by the fourth communicator 231.

The processor 111 is disposed outside the first communicator 121 and the second communicator 131 and controls the entire operations of the first wireless communication device 101a. The processor 111 controls the baseband circuit 122 and the baseband circuit 132. In a case in which the first wireless communication device 101a includes a display unit, an operation unit, or the like not shown in FIG. 8, the processor 111 controls the display unit, the operation unit, or the like.

The processor 111 controls part of the processing in the MAC layer among processing performed on a digital signal by the baseband circuit 122 and the baseband circuit 132. A processor disposed inside the first communicator 121 may control the baseband circuit 122 in place of the processor 111. In such a case, the processor 111 controls the processor inside the first communicator 121. A processor disposed inside the second communicator 131 may control the baseband circuit 132 in place of the processor 111. In such a case, the processor 111 controls the processor inside the second communicator 131.

The processor 111 transmits data or information to the second wireless communication device 201a by using the first communicator 121 or the second communicator 131. Specifically, the processor 111 controls the first communicator 121 or the second communicator 131 such that data or information is transmitted to the second wireless communication device 201a. In other words, the processor 111 causes the first communicator 121 or the second communicator 131 to transmit data or information for the second wireless communication device 201a. In this way, the first communicator 121 or the second communicator 131 transmit data or information to the second wireless communication device 201a. The processor 111 receives data or information from the second wireless communication device 201a by using the first communicator 121 or the second communicator 131. Specifically, the processor 111 controls the first communicator 121 or the second communicator 131 such that data or information is received from the second wireless communication device 201a. In other words, the processor 111 causes the first communicator 121 or the second communicator 131 to receive data or information from the second wireless communication device 201a. In this way, the first communicator 121 or the second communicator 131 receive data or information from the second wireless communication device 201a.

Figure 10:
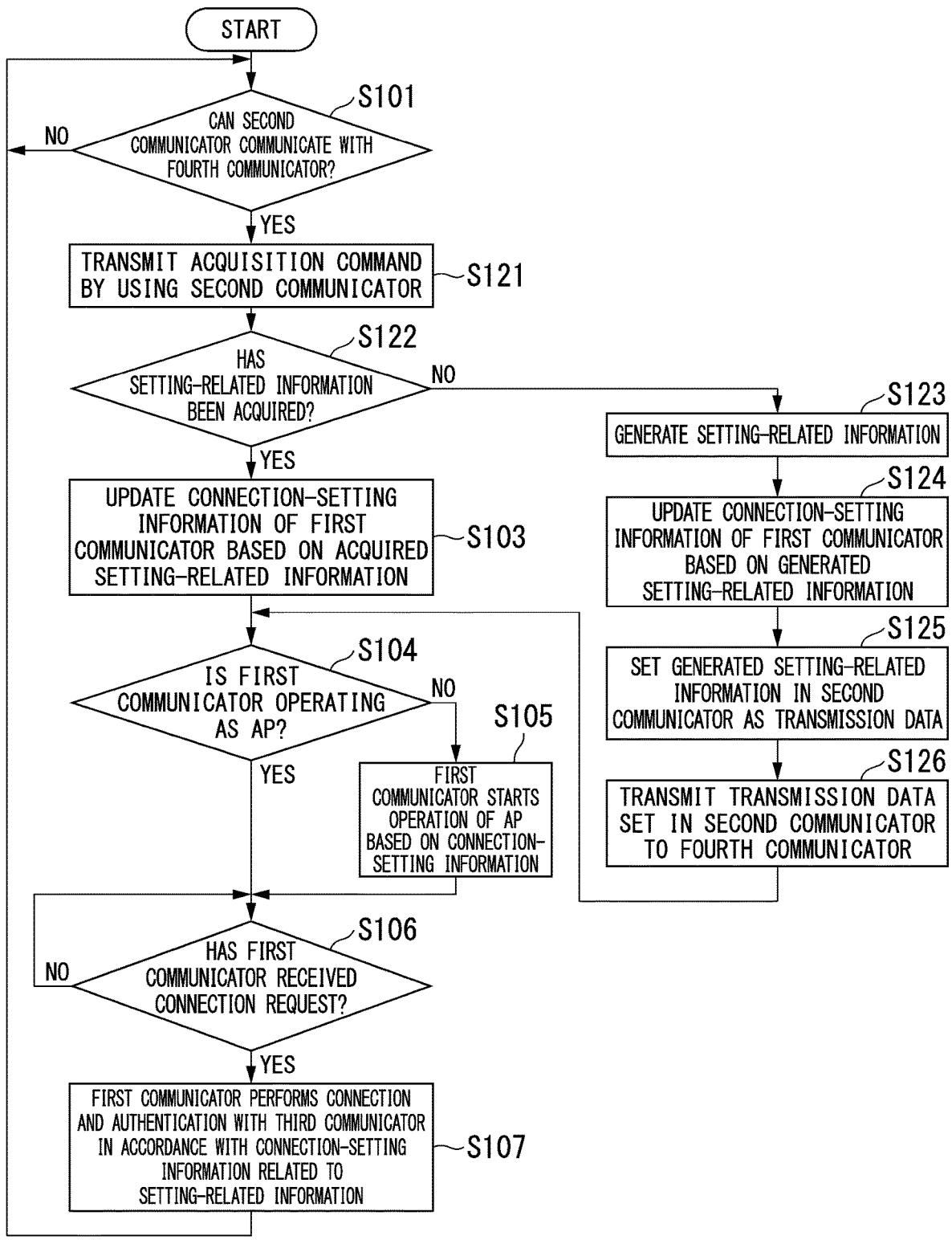
FIG. 10 is a flow chart showing a procedure of an operation of the first wireless communication device according to the second embodiment of the present invention.

An operation of the first wireless communication device 101a will be described. FIG. 10 shows a procedure of the operation of the first wireless communication device 101a. The same processing as that shown in FIG. 4 will not be described.

(Step S121)

When the second communicator 131 determines that the second communicator 131 can communicate with the fourth communicator 231 in Step S101, the second communicator 131 transmits an acquisition command to the fourth communicator 231. After the acquisition command is transmitted, the second communicator 131 waits for reception of the connection-setting information.

(Step S122)

After Step S121, the second communicator 131 reports the content of communication with the fourth communicator 231 to the processor 111. The processor 111 determines whether or not the setting-related information has been acquired on the basis of the content reported by the second communicator 131. For example, when the fourth communicator 231 receives data and the data do not include the setting-related information, the processor 111 determines that the setting-related information has not been acquired. When the second communicator 131 receives an error response from the fourth communicator 231, the processor 111 determines that the setting-related information has not been acquired. In a case in which the second communicator 131 does not receive a response from the fourth communicator 231 even after a predetermined period elapses from a timing at which the acquisition command is transmitted, the processor 111 determines that the setting-related information has not been acquired. When the second communicator 131 receives the setting-related information from the fourth communicator 231, the processor 111 determines that the setting-related information has been acquired. When the processor 111 determines that the setting-related information has been acquired, Step S103 is executed. When the processor 111 determines that the setting-related information has not been acquired, Step S123 is executed.

(Step S123)

The processor 111 generates the setting-related information. In a case in which the setting-related information is the connection-setting information, the processor 111 may directly generate the connection-setting information. Alternatively, the processor 111 may generate information used for generating the connection-setting information and may generate the connection-setting information on the basis of the generated information. In a case in which the setting-related information is configured to be information used for generating the connection-setting information, the processor 111 may directly generate the information.

In a case in which the setting-related information is configured to be information used for generating the connection-setting information, the processor 111 may generate the connection-setting information and may generate the setting-related information on the basis of the connection-setting information. For example, the processor 111 generates the setting-related information by performing predetermined calculation on the connection-setting information. In a case in which the processor 111 generates the connection-setting information on the basis of the setting-related information, the processor 111 generates the connection-setting information by performing reverse calculation to that described above.

(Step S124)

After Step S123, the processor 111 outputs the setting-related information generated in Step S123 to the first communicator 121. The first communicator 121 updates the connection-setting information set in the first communicator 121 on the basis of the setting-related information reported from the processor 111. In this way, the first communicator 121 holds the connection-setting information related to the setting-related information. In a case in which the setting-related information is configured to be information used for generating the connection-setting information, the first communicator 121 holds the connection-setting information generated by the information generation unit.

In a case in which the first communicator 121 has already started the operation of the AP in Step S124, the first communicator 121 may update the connection-setting information while the first communicator 121 continues the operation of the AP and may immediately apply the setting. In this case, before updating the connection-setting information, the first communicator 121 may cut off connection to a communication device with which the connection and the authentication have been performed. The first communicator 121 may update the connection-setting information after completing the operation of the AP. In this case, before completing the operation of the AP, the first communicator 121 may cut off connection to a communication device with which the connection and the authentication have been performed.

(Step S125)

After Step S124, the processor 111 sets the setting-related information generated in Step S124 in the second communicator 131 as transmission data. The second communicator 131 holds the setting-related information.

(Step S126)

After Step S125, the second communicator 131 transmits the setting-related information set as the transmission data to the fourth communicator 231 and reports transmission of the setting-related information to the processor 111. After Step S126, Step S104 is executed. The processor 111 may cause the second communicator 131 to transmit the transmission data.

In a case in which the processor 111 determines that the setting-related information has not been acquired in Step S122, a timing at which processing is executed may be changed as follows. Step S104 and Step S105 may be executed at an arbitrary timing between the timing at which Step S124 is executed and the timing at which Step S106 is executed.

Figure 11:
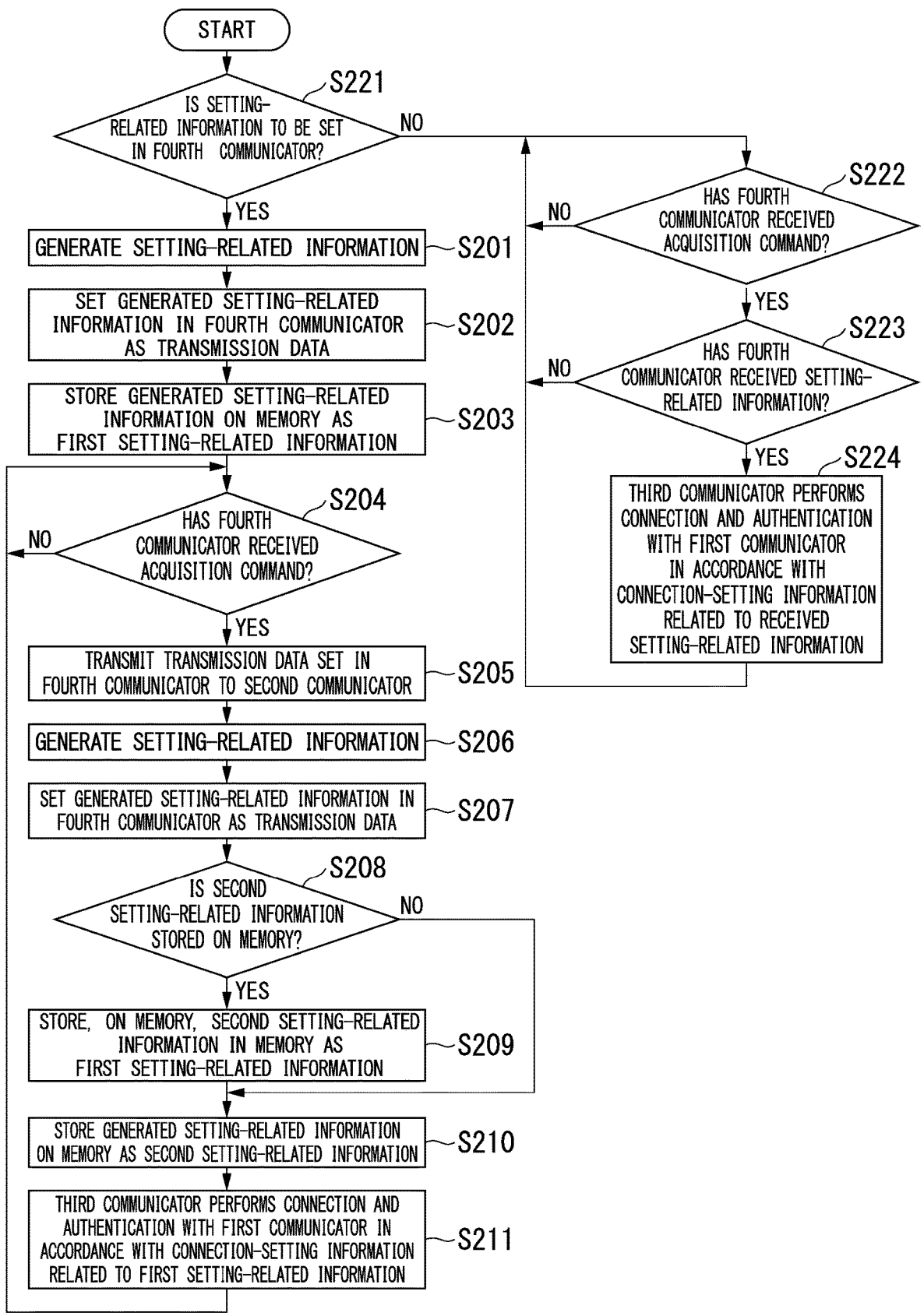
FIG. 11 is a flow chart showing a procedure of an operation of the second wireless communication device according to the second embodiment of the present invention.

An operation of the second wireless communication device 201*a* will be described. FIG. 11 shows a procedure of the operation of the second wireless communication device 201*a*. The same processing as that shown in FIG. 5 will not be described.

(Step S221)

The processor 211*a* executes the function of the setting determination unit 212. The processor 211*a* determines whether or not the setting-related information is to be set in the fourth communicator 231. For example, the processor 211*a* determines whether or not the setting-related information is to be set in the fourth communicator 231 on the basis of the information stored on the memory 241. Information for the determination may be input into the second wireless communication device 201*a* through an operation performed by a user of an operation unit not shown in the drawing. The second wireless communication device 201*a* may receive the information for the determination from the first wireless communication device 101*a* or another communication device by using the third communicator 221 or the fourth communicator 231.

The second wireless communication device 201*a* may receive the information for the determination from the first wireless communication device 101*a* or another communication device by performing communication using a communicator not shown in the drawing. A recording medium on which the information for the determination is recorded may be connected to the second wireless communication device 201*a*, and the second wireless communication device 201*a* may read the information for the determination from the recording medium. When the processor 211*a* determines that the setting-related information is to be set in the fourth communicator 231, Step S201 is executed. When the processor 211*a* determines that the setting-related information is not to be set in the fourth communicator 231, Step S222 is executed.

(Step S222)

When the acquisition command is transmitted from the second communicator 131, the fourth communicator 231 receives the acquisition command. The processor 211*a* monitors the fourth communicator 231 and determines whether or not the acquisition command has been received. When the processor 211*a* determines that the acquisition command has not been received, Step S222 is executed. In other words, the processor 211*a* repeats the determination until the acquisition command is received. When the processor 211*a* determines that the acquisition command has been received, Step S223 is executed.

When the fourth communicator 231 receives the acquisition command, the fourth communicator 231 may transmit a response not including the setting-related information to the second communicator 131. The fourth communicator 231 may transmit an error response to the second communicator 131. The fourth communicator 231 does not need to transmit a response to the second communicator 131.

(Step S223)

When the setting-related information is transmitted from the second communicator 131, the fourth communicator 231 receives the setting-related information. The processor 211a monitors the fourth communicator 231 and determines whether or not the setting-related information has been received. When the processor 211a determines that the setting-related information has not been received, Step S222 is executed. When the processor 211a determines that the setting-related information has been received, Step S224 is executed.

(Step S224)

The fourth communicator 231 reports the received setting-related information to the processor 211a. The processor 211a outputs the setting-related information to the third communicator 221. The third communicator 221 holds the connection-setting information related to the setting-related information. The third communicator 221 connects to the first communicator 121 on the basis of the connection-setting information. Specifically, the third communicator 221 transmits a connection request to the first communicator 121 and receives an association response as a connection response from the first communicator 121. In this way, connection for data communication is completed, and the first communicator 121 and the third communicator 221 are connected to each other. The third communicator 221 executes the authentication processing with the first communicator 121 on the basis of, for example, the WPA2-PSK by using the passphrase or the PSK set in the third communicator 221. After authentication is completed, the first communicator 121 and the third communicator 221 may perform the data communication. After Step S224, Step S222 is executed.

In a case in which the setting-related information is the connection-setting information, the third communicator 221 performs the connection and the authentication by using the connection-setting information. In a case in which the setting-related information is configured to be information used for generating the connection-setting information, the third communicator 221 performs the connection and the authentication by using the connection-setting information generated on the basis of the setting-related information by the information generation unit.

In a case in which Step S224 is executed in a state in which the third communicator 221 has already connected to the first communicator 121, the third communicator 221 cuts off connection to the first communicator 121. After the connection to the first communicator 121 is cut off, the third communicator 221 connects to the first communicator 121. The third communicator 221 does not simultaneously maintain multiple connections with the first communicator 121.

In a case in which the authentication is unnecessary, the third communicator 221 does not need to execute the authentication processing in Step S224.

Figure 12:
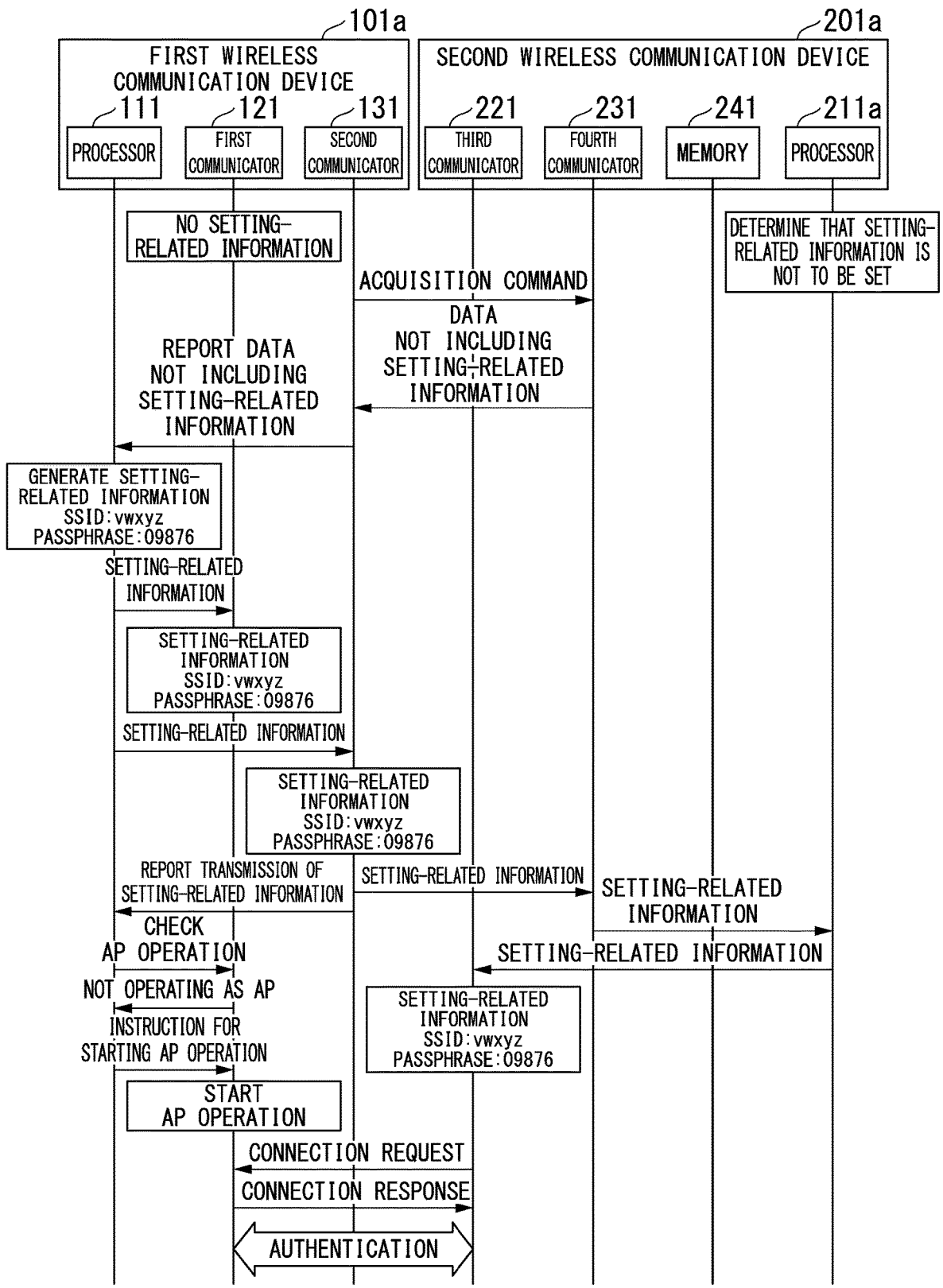
FIG. 12 is a sequence chart showing a procedure of communication in the second embodiment of the present invention.

FIG. 12 shows a procedure of communication between the first wireless communication device 101a and the second wireless communication device 201a. An operation of each device will be described by referring to FIG. 12.

In the following example, the setting-related information is the same as the connection-setting information. Even when the setting-related information is configured to be information used for generating the connection-setting information, the majority of the following example is not changed.

In the second wireless communication device 201a, the processor 211a determines that the setting-related information is not to be set in the fourth communicator 231 (Step S221). In the first wireless communication device 101a, the second communicator 131 determines that the second communicator 131 can communicate with the fourth communicator 231 (Step S101). The second communicator 131 transmits an acquisition command to the fourth communicator 231 (Step S121).

In the second wireless communication device 201a, the fourth communicator 231 receives the acquisition command. Since the transmission data are not set in the fourth communicator 231, the fourth communicator 231 transmits empty data not including the setting-related information to the second communicator 131 (Step S222).

In the first wireless communication device 101a, the second communicator 131 receives the data not including the setting-related information. The second communicator 131 reports the received data to the processor 111. The processor 111 determines that the setting-related information has not been received (Step S122).

The processor 111 generates the setting-related information corresponding to the connection-setting information (SSID="vwxyz", passphrase="09876") (Step S123). The processor 111 outputs the generated setting-related information to the first communicator 121. The first communicator 121 updates the connection-setting information set in the first communicator 121 on the basis of the setting-related information output from the processor 111 (Step S124). At this time, the SSID of the connection-setting information becomes "vwxyz", and the passphrase of the connection-setting information becomes "09876".

The processor 111 sets the generated setting-related information in the second communicator 131 as the transmission data (Step S125). The second communicator 131 transmits the setting-related information set as the transmission data to the fourth communicator 231 and reports transmission of the setting-related information to the processor 111 (Step S126).

The processor 111 checks the state of the AP operation of the first communicator 121. The first communicator 121 answers to the processor 111 that the first communicator 121 is not operating as the AP. The processor 111 determines that the first communicator 121 is not operating as the AP (Step S104). The processor 111 outputs an instruction for starting the operation of the AP to the first communicator 121. The first communicator 121 starts the operation of the AP on the basis of the connection-setting information (Step S105).

In the second wireless communication device 201a, the fourth communicator 231 receives the setting-related information and reports the received setting-related information to the processor 211a. The processor 211a outputs the setting-related information to the third communicator 221 (Step S223).

Since the setting-related information is the connection-setting information, the third communicator 221 connects to the first communicator 121 as the STA by using the connection-setting information and performs the authentication with the first communicator 121 by using the connection-setting information (Step S224). At this time, the SSID of the connection-setting information is "vwxyz", and the passphrase of the connection-setting information is "09876". Since the connection-setting information used by the third communicator 221 is the same as that set in the first communicator 121, the connection and the authentication are successfully performed.

In the first wireless communication device 101a, the first communicator 121 receives a connection request (Step S106). The first communicator 121 performs the connection and the authentication (Step S107). At this time, since the connection-setting information set in the first communicator 121 is the same as that used by the third communicator 221, the connection and the authentication are successfully performed.

In a case in which the second wireless communication device 201a has not generated the setting-related information, the second communicator 131 of the first wireless communication device 101a transmits the setting-related information newly generated by the processor 111 to the fourth communicator 231 of the second wireless communication device 201a. The third communicator 221 of the second wireless communication device 201a acquires the setting-related information received by the fourth communicator 231. Therefore, the third communicator 221 (STA) of the second wireless communication device 201a can perform one-to-one connection with the first communicator 121 (AP) of the first wireless communication device 101a every time.

Third Embodiment

Figure 13:
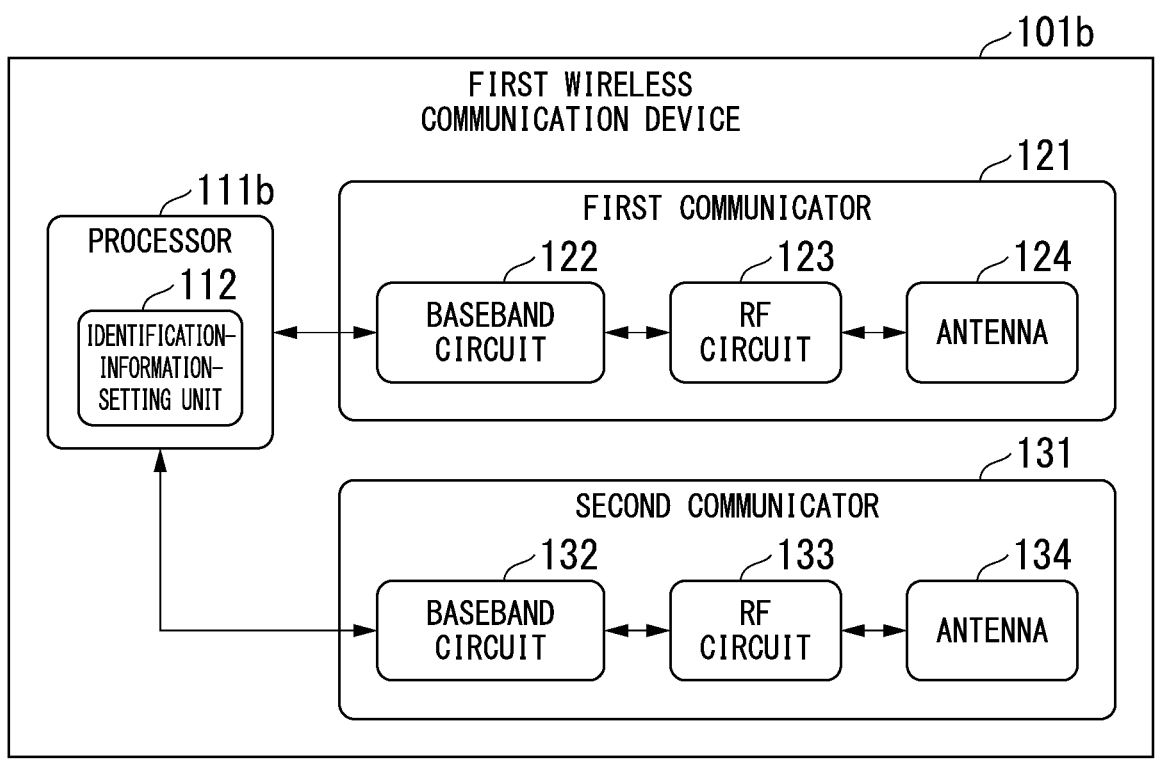
FIG. 13 is a block diagram showing a configuration of a first wireless communication device according to a third embodiment of the present invention.

FIG. 13 shows a configuration of a first wireless communication device 101b according to a third embodiment of the present invention. The same parts as those shown in FIG. 8 will not be described.

Before the third communicator 221 connects to the first communicator 121, the fourth communicator 231 transmits identification information of the second wireless communication device 201 to the second communicator 131. For example, the first setting-related information transmitted by the fourth communicator 231 includes the identification information of the second wireless communication device 201. For example, the identification information is a MAC address. The second communicator 131 receives the identification information. The third communicator 221 transmits the identification information to the first communicator 121 when the third communicator 221 connects to the first communicator 121. The first communicator 121 receives the identification information.

The processor 111 shown in FIG. 8 is changed to a processor 111b (second processor). The processor 111b has a function of an identification-information-setting unit 112 that sets the identification information received by the second communicator 131 in the first communicator 121 as identification information of a device of which connection is accepted by the first communicator 121. When the identification information received by the first communicator 121 is the same as that set in the first communicator 121, the first communicator 121 accepts connection to the third communicator 221.

Figure 14:
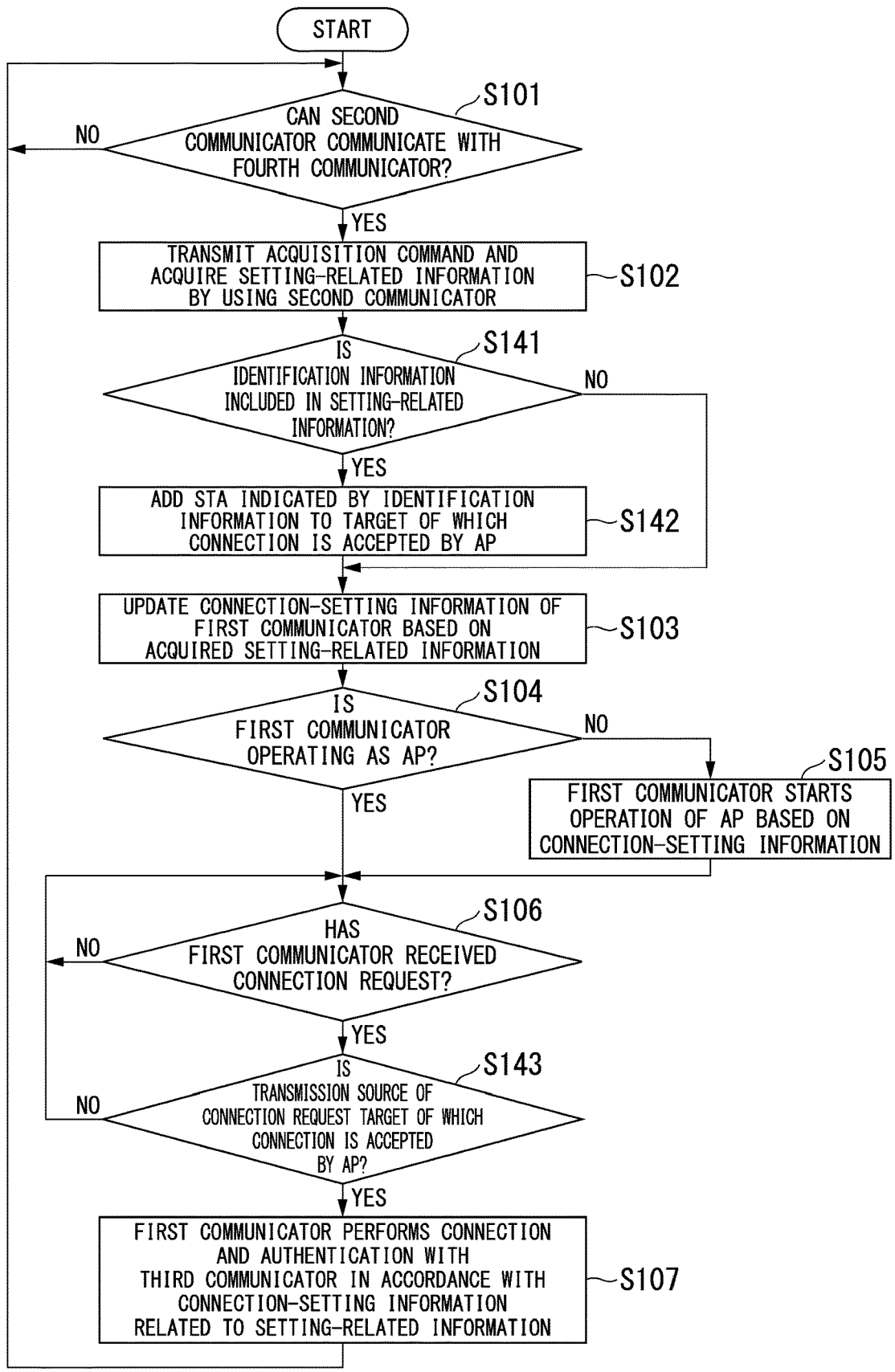
FIG. 14 is a flow chart showing a procedure of an operation of the first wireless communication device according to the third embodiment of the present invention.

An operation of the first wireless communication device 101b will be described. FIG. 14 shows a procedure of the operation of the first wireless communication device 101b. The same processing as that shown in FIG. 4 will not be described.

(Step S141)

After Step S102, the second communicator 131 reports the content of communication with the fourth communicator 231 to the processor 111b. The processor 111b determines whether or not the identification information is included in the setting-related information received by the second communicator 131 on the basis of the content reported by the second communicator 131. When the processor 111b determines that the identification information is included in the setting-related information, Step S142 is executed. When the processor 111b determines that the identification information is not included in the setting-related information, Step S103 is executed.

(Step S142)

The processor 111b outputs the identification information included in the setting-related information to the first communicator 121. The first communicator 121 holds the identification information, thus adding the STA indicated by the identification information to a target of which connection is accepted by the AP. After Step S142, Step S103 is executed.

(Step S143)

When the connection request is received in Step S106, the first communicator 121 checks whether or not the transmission source of the connection request is the target of which connection is accepted by the AP. For example, the first communicator 121 checks whether or not the MAC address of the transmission source of the connection request matches the identification information set in Step S142. In a case in which IEEE802.11 is used, the MAC address of the transmission source is included in an association request that is the connection request.

When the MAC address of the transmission source of the connection request does not match the identification information set in Step S142, the first communicator 121 determines that the transmission source of the connection request is not the target of which connection is accepted by the AP. In this case, Step S106 is executed. When the MAC address of the transmission source of the connection request matches the identification information set in Step S142, the first communicator 121 determines that the transmission source of the connection request is the target of which connection is accepted by the AP. In this case, Step S107 is executed.

The identification information does not need to be included in the setting-related information. The fourth communicator 231 may transmit the identification information to the second communicator 131 independently of the setting-related information, and the second communicator 131 may receive the identification information. Step S142 may be included in Step S103. In other words, Step S142 may be executed as part of the processing of Step S103.

Figure 15:
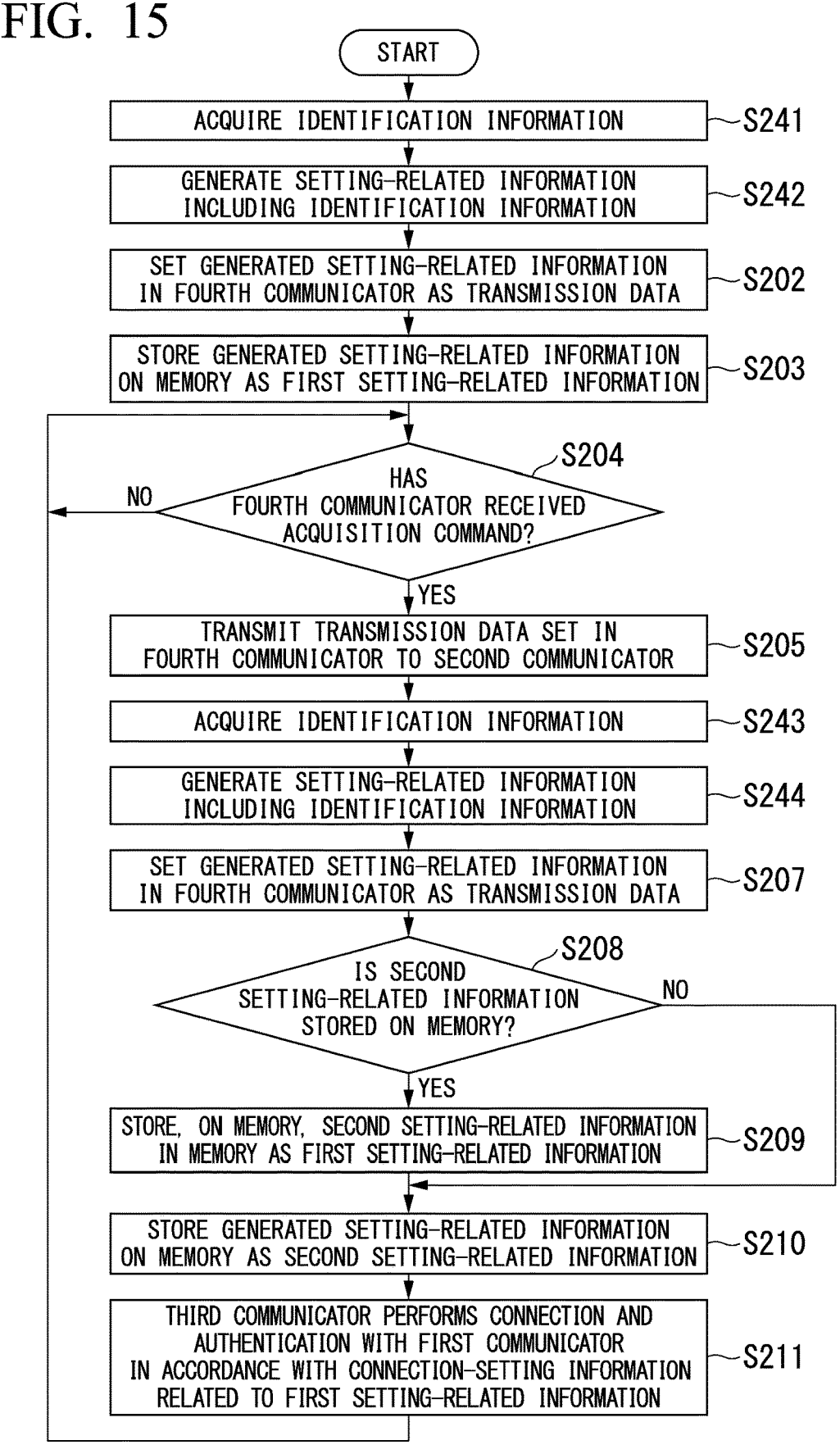
FIG. 15 is a flow chart showing a procedure of an operation of a second wireless communication device according to the third embodiment of the present invention.

An operation of the second wireless communication device 201 will be described. FIG. 15 shows a procedure of the operation of the second wireless communication device 201. The same processing as that shown in FIG. 5 will not be described.

(Step S241)

The processor 211 acquires the identification information from the third communicator 221. The processor 211 may request acquisition of the identification information to the third communicator 221, and the third communicator 221 may output the identification information to the processor 211. The third communicator 221 may output the identification information to the processor 211 at a predetermined timing. For example, the predetermined timing is a timing at which the third communicator 221 becomes operable. The processor 211 may store the acquired identification information on the memory 241.

(Step S242)

After Step S241, the processor 211 generates the setting-related information including the identification information acquired in Step S241. For example, the processor 211 generates similar information to the setting-related information generated in Step S201 shown in FIG. 5. The processor 211 adds the identification information to the generated information, thus generating the setting-related information. After Step S242, Step S202 is executed.

(Step S243)

After Step S205, the processor 211 acquires the identification information from the third communicator 221. The processor 211 may request acquisition of the identification information to the third communicator 221, and the third communicator 221 may output the identification information to the processor 211. When the identification information acquired in Step S241 is stored on the memory 241, the processor 211 may acquire the identification information from the memory 241.

(Step S244)

After Step S243, the processor 211 generates the setting-related information including the identification information acquired in Step S243. For example, the processor 211 generates similar information to the setting-related information generated in Step S206 shown in FIG. 5. The processor 211 adds the identification information to the generated information, thus generating the setting-related information. After Step S244, Step S207 is executed.

The setting-related information generated in Step S242 includes the identification information. The setting-related information is set in the fourth communicator 231 as the transmission data in Step S202. The fourth communicator 231 transmits the setting-related information including the identification information to the second communicator 131 in Step S205.

The setting-related information generated in Step S244 includes the identification information. The setting-related information is set in the fourth communicator 231 as the transmission data in Step S207. The fourth communicator 231 transmits the setting-related information including the identification information to the second communicator 131 in Step S205.

Figure 16:
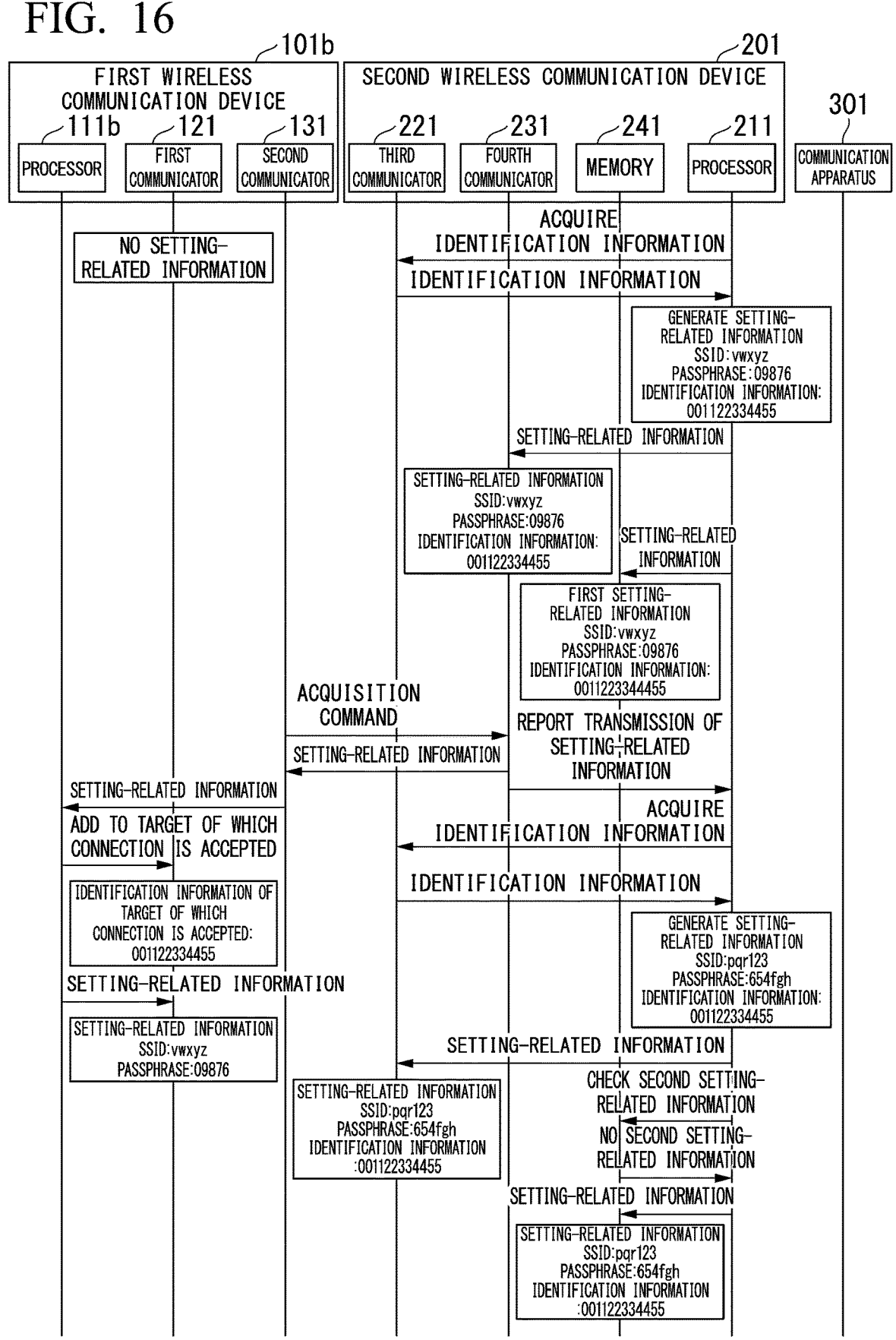
FIG. 16 is a sequence chart showing a procedure of communication in the third embodiment of the present invention.
Figure 17:
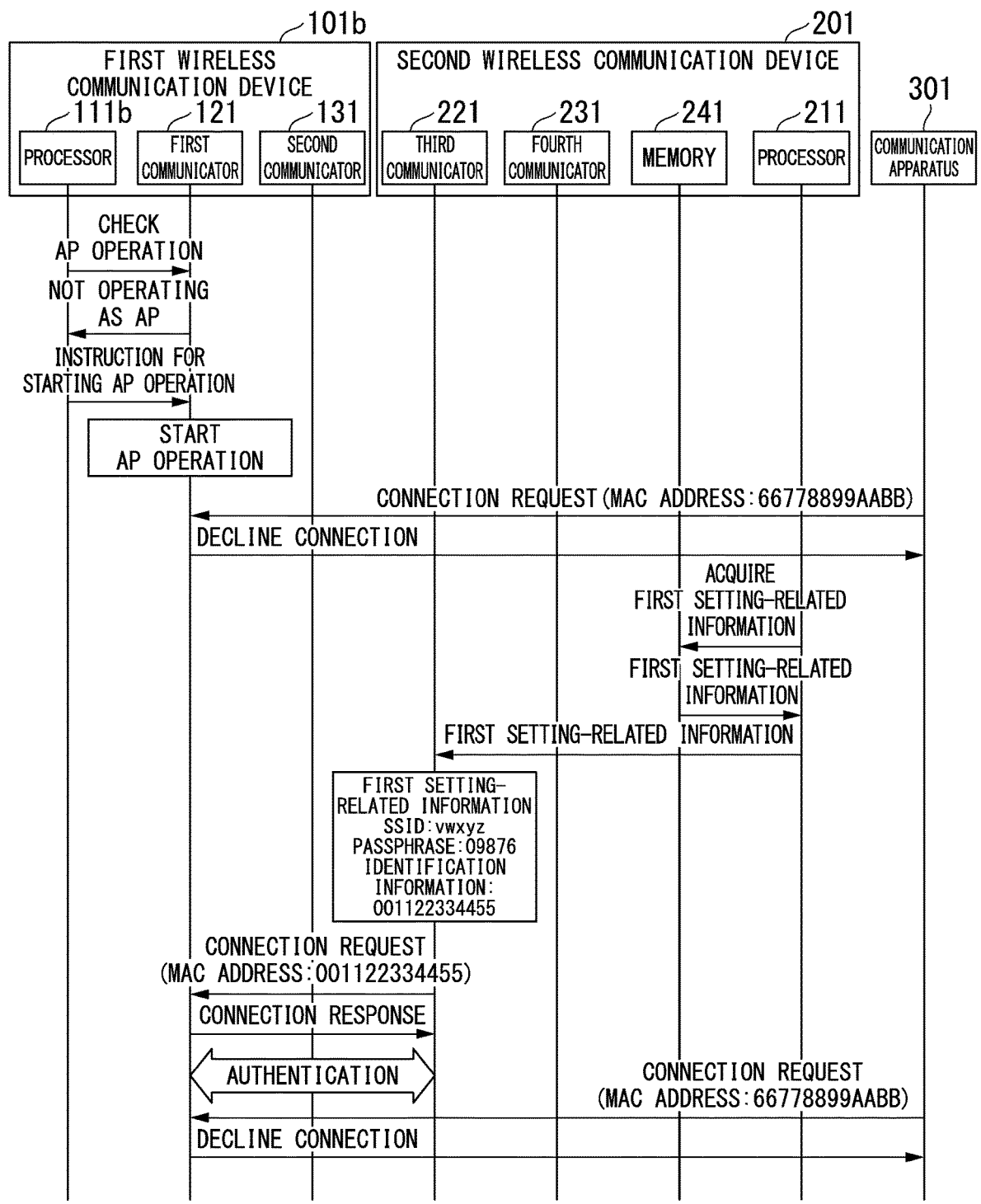
FIG. 17 is a sequence chart showing a procedure of communication in the third embodiment of the present invention.

FIG. 16 and FIG. 17 show a procedure of communication between the first wireless communication device 101b and the second wireless communication device 201. An operation of each device will be described by referring to FIG. 16 and FIG. 17. After an operation shown in FIG. 16 is executed, an operation shown in FIG. 17 is executed. The same parts as those shown in FIG. 6 and FIG. 7 will not be described.

In the following example, the setting-related information is the same as the connection-setting information. Even when the setting-related information is configured to be information used for generating the connection-setting information, the majority of the following example is not changed.

In the second wireless communication device 201, the processor 211 outputs an instruction for acquiring the identification information to the third communicator 221. The third communicator 221 outputs the MAC address (001122334455) of the third communicator 221 to the processor 211 as the identification information (Step S241). The processor 211 generates the setting-related information on the basis of the connection-setting information (SSID="vwxyz", passphrase="09876") and the identification information (Step S242).

After the second communicator 131 of the first wireless communication device 101b transmits an acquisition command to the fourth communicator 231, the second communicator 131 receives the setting-related information from the fourth communicator 231. The second communicator 131 reports the received setting-related information to the processor 111b. The processor 111b determines that the identification information is included in the setting-related information (Step S141).

The processor 111b outputs the identification information to the first communicator 121. The first communicator 121 adds the STA indicated by the MAC address (001122334455), which is the identification information, to a target of which connection is accepted by the AP (Step S142). The processor 111b outputs the setting-related information to the first communicator 121. The first communicator 121 updates the connection-setting information set in the first communicator 121 on the basis of the setting-related information reported from the second communicator 131 (Step S103). At this time, the SSID of the connection-setting information becomes "vwxyz", and the passphrase of the connection-setting information becomes "09876".

The processor 111b checks the state of the AP operation of the first communicator 121. The first communicator 121 answers to the processor 111b that the first communicator 121 is not operating as the AP. The processor 111b determines that the first communicator 121 is not operating as the AP (Step S104). The processor 111b outputs an instruction for starting the operation of the AP to the first communicator 121. The first communicator 121 starts the operation of the AP on the basis of the connection-setting information (Step S105).

In the second wireless communication device 201, the fourth communicator 231 transmits the setting-related information set as the transmission data to the second communicator 131 and reports transmission of the setting-related information to the processor 211 (Step S205). After transmission of the setting-related information is reported to the processor 211, the processor 211 outputs an instruction for acquiring the identification information to the third communicator 221. The third communicator 221 outputs the MAC address (001122334455) of the third communicator 221 to the processor 211 as the identification information (Step S243). The processor 211 generates the setting-related information on the basis of the connection-setting information (SSID="pqr123", passphrase="654fgh") and the identification information (Step S244).

Another communication apparatus 301 transmits a connection request to the first communicator 121. In the first wireless communication device 101b, the first communicator 121 receives the connection request transmitted from the communication apparatus 301 (Step S106). The MAC address of the transmission source of the connection request is "66778899AABB". This MAC address does not match "001122334455" that is the target of which connection is accepted by the first communicator 121 (Step S143). Therefore, the first communicator 121 does not accept the connection to the communication apparatus 301 and declines the connection.

In the second wireless communication device 201, the third communicator 221 connects to the first communicator 121 as the STA by using the connection-setting information and performs the authentication with the first communicator 121 by using the connection-setting information (Step S211). At this time, the SSID of the connection-setting information is "vwxyz", and the passphrase of the connection-setting information is "09876". The connection-setting information used by the third communicator 221 is the same as that set in the first communicator 121. Furthermore, the MAC address of the third communicator 221, which is the transmission source of the connection request, is "001122334455". This MAC address is the same as "001122334455" that is the target of which connection is accepted by the first communicator 121. Therefore, the connection and the authentication are successfully performed.

In the first wireless communication device 101b, the first communicator 121 receives the connection request (Step S106). The MAC address of the third communicator 221, which is the transmission source of the connection request, is "001122334455". This MAC address is the same as "001122334455" that is the target of which connection is accepted by the first communicator 121 (Step S143). Therefore, the first communicator 121 performs the connection and the authentication (Step S107). At this time, since the connection-setting information set in the first communicator 121 is the same as that used by the third communicator 221, the connection and the authentication are successfully performed.

The first communicator 121 of the first wireless communication device 101b operates as the AP. The first communicator 121 accepts connection from only an STA having identification information matching the identification information acquired via the second communicator 131. There is a case in which another STA accidentally holding the same setting-related information as that generated by the second wireless communication device 201 requests connection to the first communicator 121 (AP) of the first wireless communication device 101b. It is possible to avoid connection to the first communicator 121 by another STA before the third communicator 221 (STA) of the second wireless communication device 201 connects to the first communicator 121 (AP). There is a case in which disconnection occurs for some reason while the first communicator 121 (AP) of the first wireless communication device 101b and the third communicator 221 (STA) of the second wireless communication device 201 connect to each other. Even in such a case, it is possible to avoid connection to the first communicator 121 by another STA.

Therefore, the third communicator 221 (STA) of the second wireless communication device 201 can perform one-to-one connection with the first communicator 121 (AP) of the first wireless communication device 101b every time. The wireless communication system 11 can cause one AP and one STA to connect to each other and can avoid connection between the AP and another STA.

Fourth Embodiment

Figure 18:
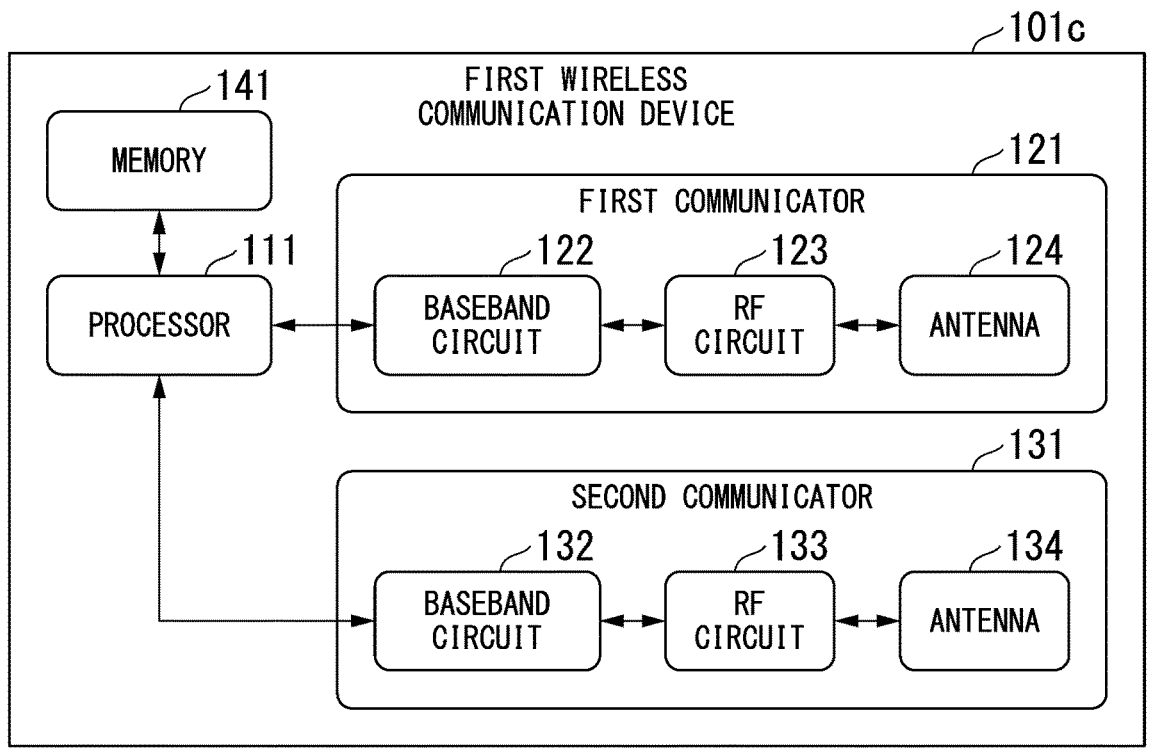
FIG. 18 is a block diagram showing a configuration of a first wireless communication device according to a fourth embodiment of the present invention.
Figure 19:
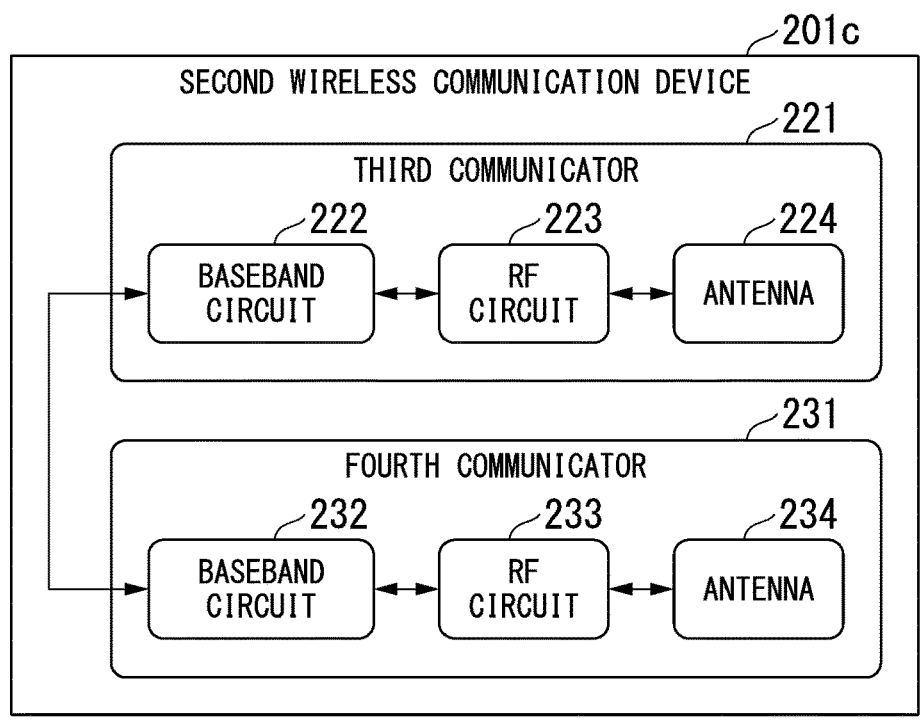
FIG. 19 is a block diagram showing a configuration of a second wireless communication device according to the fourth embodiment of the present invention.

FIG. 18 shows a configuration of a first wireless communication device 101c according to a fourth embodiment of the present invention. The same parts as those shown in FIG. 8 will not be described. FIG. 19 shows a configuration of a second wireless communication device 201c according to the fourth embodiment. The same parts as those shown in FIG. 2 will not be described.

The first wireless communication device 101c includes a memory 141 in addition to the configuration shown in FIG. 8. The memory 141 is a similar memory to the memory 241 shown in FIG. 2. The memory 141 stores the first setting-related information that is the setting-related information.

The second wireless communication device 201c does not include the processor 211 shown in FIG. 2. The second wireless communication device 201c may include the processor 211 shown in FIG. 2. The second communicator 131 holds the first setting-related information and transmits the first setting-related information to the fourth communicator 231. The fourth communicator 231 receives the first setting-related information. Each time the first setting-related information is transmitted, the processor 111 generates the setting-related information different from the transmitted first setting-related information and the second communicator 131 holds the setting-related information generated by the processor 111 as the first setting-related information as a replacement for the transmitted first setting-related information. Each time the first setting-related information is transmitted, the memory 141 stores the setting-related information generated by the processor 111 as the second setting-related information.

The third communicator 221 connects to the first communicator 121 in accordance with the connection-setting information related to the first setting-related information received by the fourth communicator 231. After the first setting-related information is transmitted, the first communicator 121 connects to the third communicator 221 in accordance with connection-setting information related to the first setting-related information stored on the memory 141. The memory 141 stores the already stored second setting-related information as the first setting-related information and stores the setting-related information generated by the processor 111 as the second setting-related information each time the processor 111 generates the setting-related information after the first communicator 121 connects to the third communicator 221.

Figure 20:
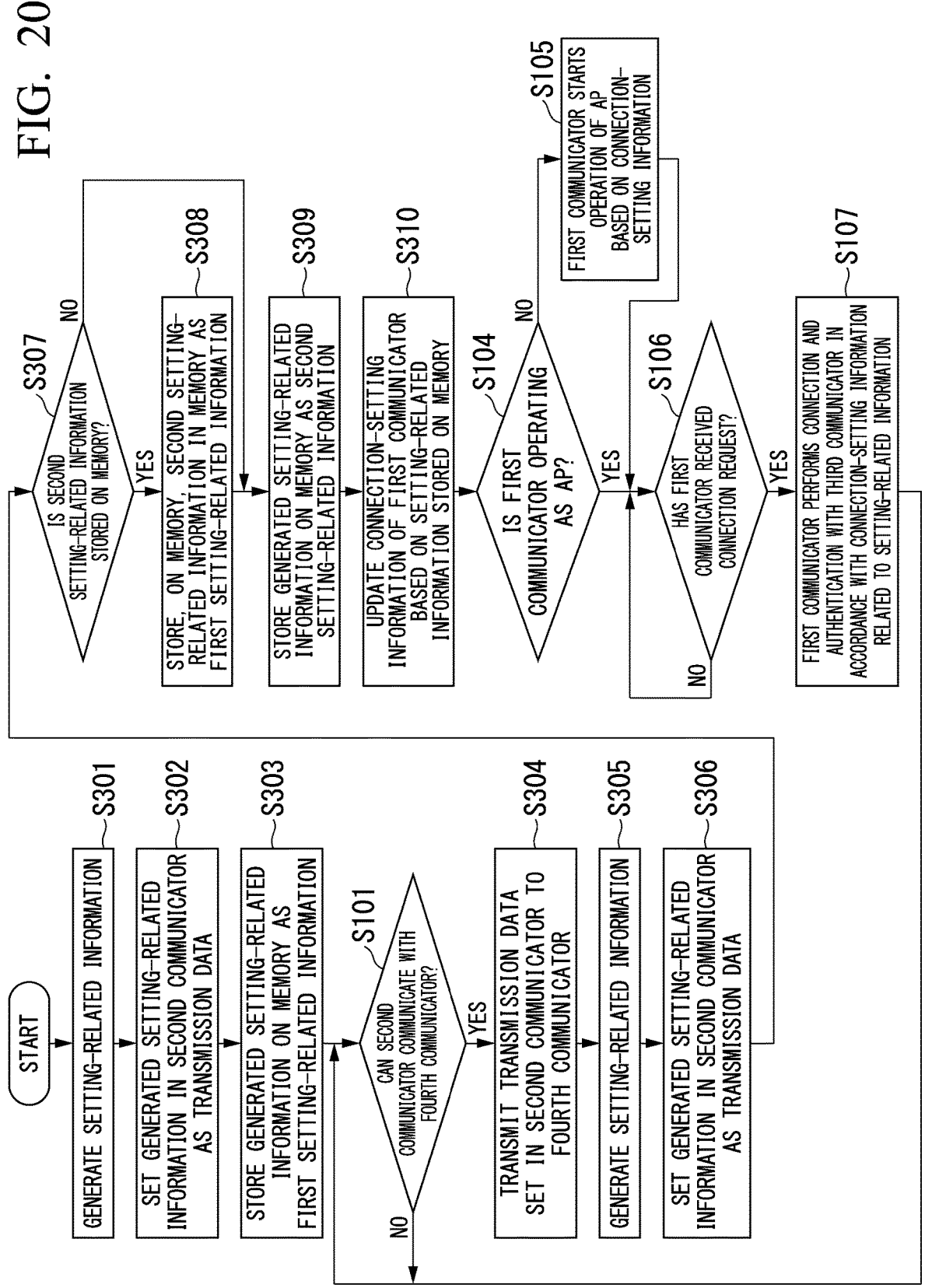
FIG. 20 is a flow chart showing a procedure of an operation of the first wireless communication device according to the fourth embodiment of the present invention.

An operation of the first wireless communication device 101c will be described. FIG. 20 shows a procedure of the operation of the first wireless communication device 101c. The same processing as that shown in HG. 4 will not be described.

(Step S301)

The processor 111 generates the setting-related information. The setting-related information may be input into the first wireless communication device 101c through an operation performed by a user of an operation unit not shown in the drawing. The first wireless communication device 101c may receive the setting-related information from a communication device other than the second wireless communication device 201c by using the first communicator 121 or the second communicator 131. The first wireless communication device 101c may receive the setting-related information from a communication device other than the second wireless communication device 201c by performing communication using a communicator not shown in the drawing. A recording medium on which the setting-related information is recorded may be connected to the first wireless communication device 101c, and the first wireless communication device 101c may read the setting-related information from the recording medium.

In a case in which the setting-related information is the connection-setting information, the processor 111 may directly generate the connection-setting information. Alternatively, the processor 111 may generate information used for generating the connection-setting information and may generate the connection-setting information on the basis of the generated information. In a case in which the setting-related information is configured to be information used for generating the connection-setting information, the processor 111 may directly generate the information.

In a case in which the setting-related information is configured to be information used for generating the connection-setting information, the processor 111 may generate the connection-setting information and may generate the setting-related information on the basis of the connection-setting information. For example, the processor 111 generates the setting-related information by performing predetermined calculation on the connection-setting information. In a case in which the processor 111 generates the connection-setting information on the basis of the setting-related information, the processor 111 generates the connection-setting information by performing reverse calculation to that described above.

(Step S302)

After Step S301, the processor 111 sets the setting-related information generated in Step S301 in the second communicator 131 as transmission data. The second communicator 131 holds the setting-related information.

(Step S303)

After Step S302, the processor 111 stores the setting-related information generated in Step S301 on the memory 141 as the first setting-related information. After Step S303 is executed, Step S101 is executed.

The order in which Step S302 and Step S303 are executed may be different from that shown in FIG. 20. After Step S301 is executed, Step S303 may be executed and then Step S302 may be executed.

(Step S304)

When the second communicator 131 determines that the second communicator 131 can communicate with the fourth communicator 231 in Step S101, the second communicator 131 transmits the setting-related information set as the transmission data to the fourth communicator 231 and reports transmission of the setting-related information to the processor 111. The processor 111 may cause the second communicator 131 to transmit the transmission data.

(Step S305)

After Step S304, the processor 111 generates different setting-related information from that generated in Step S301. The generated setting-related information is different from any of the first setting-related information stored on the memory 141 and the setting-related information set in the second communicator 131.

(Step S306)

After Step S305, the processor 111 sets the setting-related information generated in Step S305 in the second communicator 131 as the transmission data. The second communicator 131 holds the setting-related information. For example, the setting-related information set in the second communicator 131 before Step S306 is executed is deleted.

(Step S307)

After Step S306, the processor 111 determines whether or not the second setting-related information is stored on the memory 141. When the processor 111 determines that the second setting-related information is stored on the memory 141, Step S308 is executed. When the processor 111 determines that the second setting-related information is not stored on the memory 141, Step S309 is executed.

(Step S308)

The processor 111 outputs, to the memory 141, an instruction for causing the memory 141 to store the second setting-related information stored on the memory 141 as the first setting-related information. The memory 141 stores the second setting-related information stored on the memory 141 as the first setting-related information.

Old first setting-related information is stored on the memory 141 before the second setting-related information is stored on the memory 141 as new first setting-related information in Step S308. The old first setting-related information may be deleted from the memory 141. Alternatively, the old first setting-related information does not need to be deleted, and only the latest first setting-related information may be used as the first setting-related information.

(Step S309)

After Step S308, the processor 111 stores the setting-related information generated in Step S305 on the memory 141 as the second setting-related information.

There is a case in which old second setting-related information is stored on the memory 141 before another piece of the second setting-related information is stored on the memory 141 in Step S309. The old second setting-related information may be deleted from the memory 141. Alternatively, the old second setting-related information does not need to be deleted, and only the latest second setting-related information may be used as the second setting-related information.

(Step S310)

After Step S309, the processor 111 acquires the first setting-related information from the memory 141 and outputs the first setting-related information to the first communicator 121. The first communicator 121 updates the connection-setting information set in the first communicator 121 on the basis of the first setting-related information output from the processor 111. In this way, the first communicator 121 holds the connection-setting information related to the first setting-related information. After Step S310, Step S104 is executed.

After Step S107, Step S101 is executed. When the second communicator 131 can communicate with the fourth communicator 231, the processing from Step S304 is executed again. After the processor 111 generates the setting-related information in Step S305, the memory 141 stores the already stored second setting-related information as the first setting-related information. After the processor 111 generates the setting-related information in Step S305, the memory 141 stores the generated setting-related information as the second setting-related information.

In a case in which the first communicator 121 has already started the operation of the AP in Step S310, the first communicator 121 may update the connection-setting information while the first communicator 121 continues the operation of the AP and may immediately apply the setting. In this case, before updating the connection-setting information, the first communicator 121 may cut off connection to a communication device with which the connection and the authentication have been performed. The first communicator 121 may update the connection-setting information after completing the operation of the AP. In this case, before completing the operation of the AP, the first communicator 121 may cut off connection to a communication device with which the connection and the authentication have been performed.

The following processing may be executed regarding Step S302, Step S306, and Step S304. The transmission data do not need to be set in the second communicator 131, and the processor 111 may store the transmission data on the memory 141 in Step S302 and Step S306. When the second communicator 131 determines that the second communicator 131 can communicate with the fourth communicator 231 in Step S101, the second communicator 131 may report to the processor 111 in Step S304 that the second communicator 131 can communicate with the fourth communicator 231 and the processor 111 may acquire the transmission data stored on the memory 141 and may transmit the transmission data to the fourth communicator 231 by using the second communicator 131.

The timings at which Step S302 and Step S306 are executed are not limited to those shown in FIG. 20. As long as Step S302 is executed before Step S304 is executed, Step S302 may be executed at an arbitrary timing. As long as Step S306 is executed after Step S304 is executed and before Step S304 is next executed, Step S306 may be executed at an arbitrary timing.

In a case in which the first communicator 121 has already performed the connection and the authentication with the third communicator 221, the first communicator 121 may perform disconnection. Specifically, the first communicator 121 may perform the disconnection at an arbitrary timing between the timing at which Step S101 is executed and the timing at which Step S106 is executed.

In a case in which the first setting-related information is configured to be information used for generating the connection-setting information, the information generation unit generates the connection-setting information on the basis of the first setting-related information and the first communicator 121 performs the connection and the authentication by using the connection-setting information in Step S107. Instead of this, the following processing may be executed. The information generation unit may generate the connection-setting information on the basis of the setting-related information generated in Step S301. The processor 111 may set the connection-setting information in the second communicator 131 in Step S302 and may store the connection-setting information on the memory 141 in Step S303. The information generation unit may generate the connection-setting information on the basis of the setting-related information generated in Step S305, and the processor 111 may store the connection-setting information on the memory 141 in Step S309.

In a case in which the second setting-related information stored on the memory 141 is configured to be information used for generating the connection-setting information, the information generation unit may generate the connection-setting information on the basis of the second setting-related information and the memory 141 may store the connection-setting information as the first setting-related information.

Figure 21:
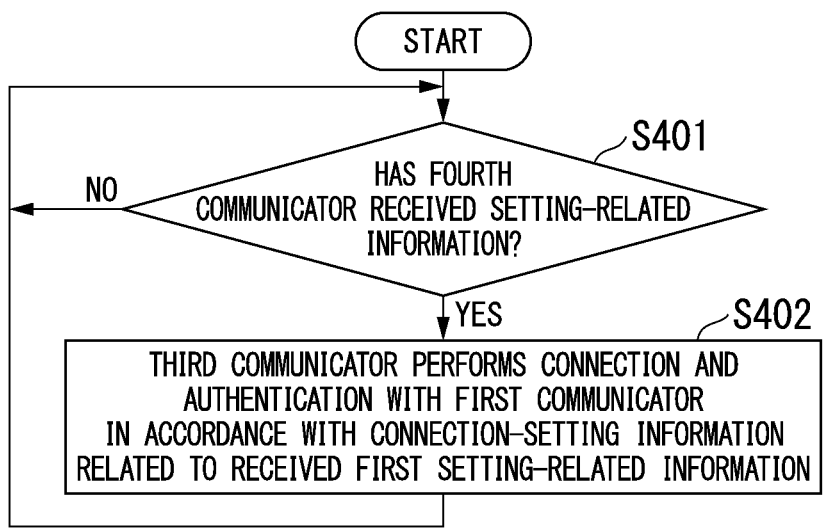
FIG. 21 is a flow chart showing a procedure of an operation of the second wireless communication device according to the fourth embodiment of the present invention.

An operation of the second wireless communication device 201c will be described. FIG. 21 shows a procedure of the operation of the second wireless communication device 201c.

(Step S401)

When the setting-related information is transmitted from the second communicator 131, the fourth communicator 231 receives the setting-related information. The fourth communicator 231 determines whether or not the setting-related information has been received. When the fourth communicator 231 determines that the setting-related information has not been received, Step S401 is executed. In other words, the fourth communicator 231 repeats the determination until the setting-related information is received. When the fourth communicator 231 determines that the setting-related information has been received, Step S402 is executed.

(Step S402)

The fourth communicator 231 reports the received setting-related information to the third communicator 221. The third communicator 221 holds the connection-setting information related to the setting-related information. The third communicator 221 connects to the first communicator 121 on the basis of the connection-setting information. Specifically, the third communicator 221 transmits a connection request to the first communicator 121 and receives an association response as a connection response from the first communicator 121. In this way, connection for data communication is completed, and the first communicator 121 and the third communicator 221 are connected to each other. The third communicator 221 executes the authentication processing with the first communicator 121 on the basis of, for example, the WPA2-PSK by using the passphrase or the PSK set in the third communicator 221. After authentication is completed, the first communicator 121 and the third communicator 221 may perform the data communication. After Step S402, Step S401 is executed.

In a case in which the setting-related information is the connection-setting information, the third communicator 221 performs the connection and the authentication by using the connection-setting information. In a case in which the setting-related information is configured to be information used for generating the connection-setting information, the third communicator 221 performs the connection and the authentication by using the connection-setting information generated on the basis of the setting-related information by the information generation unit.

In a case in which Step S402 is executed in a state in which the third communicator 221 has already connected to the first communicator 121, the third communicator 221 cuts off connection to the first communicator 121. After the connection to the first communicator 121 is cut off, the third communicator 221 connects to the first communicator 121. The third communicator 221 does not simultaneously maintain multiple connections with the first communicator 121.

In a case in which the second wireless communication device 201c includes a memory not shown in HG. 19, the memory may store the setting-related information received by the fourth communicator 231. When the third communicator 221 connects to the first communicator 121, the third communicator 221 may acquire the setting-related information from the memory.

In a case in which the authentication is unnecessary, the third communicator 221 does not need to execute the authentication processing in Step S402.

Figure 22:
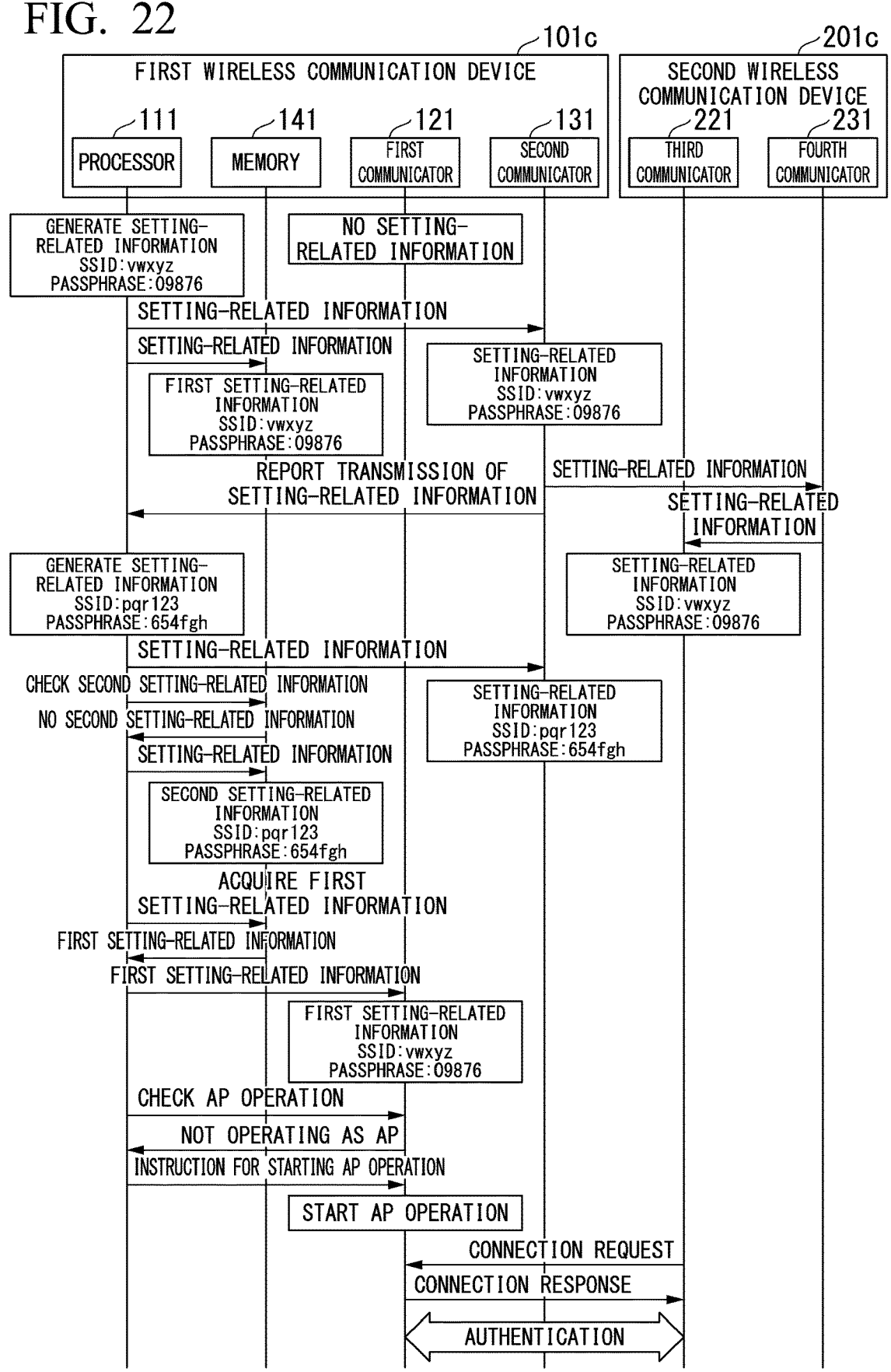
FIG. 22 is a sequence chart showing a procedure of communication in the fourth embodiment of the present invention.
Figure 23:
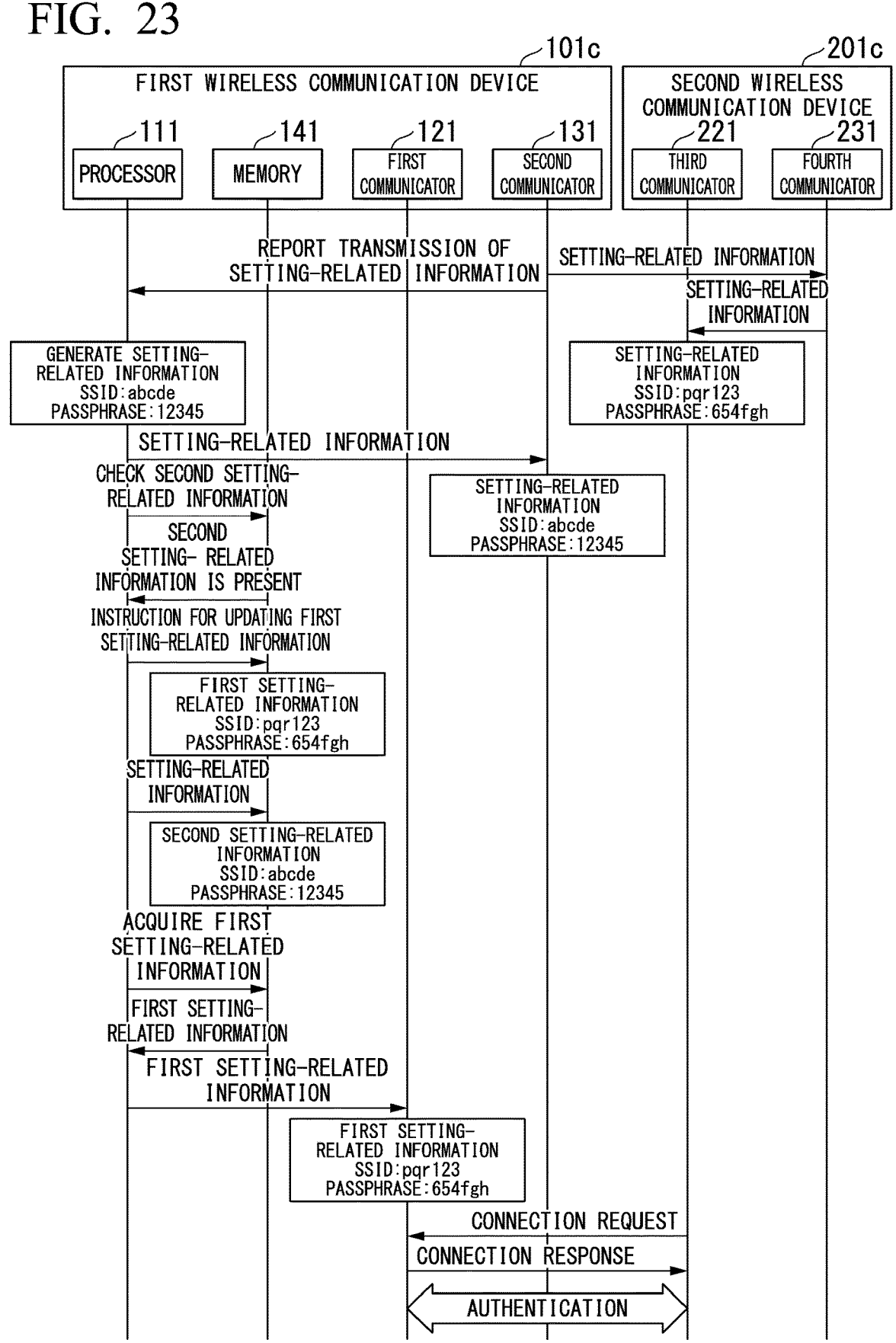
FIG. 23 is a sequence chart showing a procedure of communication in the fourth embodiment of the present invention.

FIG. 22 and FIG. 23 show a procedure of communication between the first wireless communication device 101c and the second wireless communication device 201c. An operation of each device will be described by referring to FIG. 22 and FIG. 23. After an operation shown in FIG. 22 is executed, an operation shown in FIG. 23 is executed.

In the following example, the setting-related information is the same as the connection-setting information. Even when the setting-related information is configured to be information used for generating the connection-setting information, the majority of the following example is not changed.

When the operation shown in FIG. 22 and FIG. 23 is started, the first communicator 121 of the first wireless communication device 101c does not hold the setting-related information, that is, the connection-setting information. In the first wireless communication device 101c, the processor 111 generates the setting-related information corresponding to the connection-setting information (SSID="vwxyz", passphrase="09876") (Step S301). The processor 111 sets the generated setting-related information in the second communicator 131 as the transmission data (Step S302). The processor 111 causes the memory 141 to store the generated setting-related information as the first setting-related information (Step S303).

The second communicator 131 determines that the second communicator 131 can communicate with the fourth communicator 231 (Step S101). The second communicator 131 transmits the setting-related information set as the transmission data to the fourth communicator 231 and reports transmission of the setting-related information to the processor 111 (Step S304).

In the second wireless communication device 201c, the fourth communicator 231 receives the setting-related information from the second communicator 131 (Step S401). The fourth communicator 231 reports the received setting-related information to the third communicator 221. The third communicator 221 holds the setting-related information in order to use the setting-related information for the connection and the authentication with the first communicator 121. At this time, the third communicator 221 may perform the connection and the authentication with the first communicator 121. The connection and the authentication at this timing are not shown in FIG. 22. Since the first communicator 121 has not started the operation as the AP yet, the connection is not successfully performed. Therefore, the third communicator 221 may repeatedly try the connection at an arbitrary timing (Step S402).

After transmission of the setting-related information is reported to the processor 111 in the first wireless communication device 101c, the processor 111 generates the setting-related information corresponding to the connection-setting information (SSID="pqr123", passphrase="654fgh") (Step S305). The processor 111 sets the generated setting-related information in the second communicator 131 as the transmission data (Step S306).

The processor 111 checks whether or not the second setting-related information is stored on the memory 141 and determines that the second setting-related information is not stored on the memory 141 (Step S307). Therefore, the processor 111 stores the generated setting-related information on the memory 141 as the second setting-related information (Step S309).

The processor 111 acquires the first setting-related information from the memory 141 and outputs the first setting-related information to the first communicator 121. The first communicator 121 updates the connection-setting information set in the first communicator 121 on the basis of the first setting-related information output from the processor 111 (Step S310). At this time, the SSID of the connection-setting information becomes "vwxyz", and the passphrase of the connection-setting information becomes "09876".

The processor 111 checks the state of the AP operation of the first communicator 121. The first communicator 121 answers to the processor 111 that the first communicator 121 is not operating as the AP. The processor 111 determines that the first communicator 121 is not operating as the AP (Step S104). The processor 111 outputs an instruction for starting the operation of the AP to the first communicator 121. The first communicator 121 starts the operation of the AP on the basis of the connection-setting information (Step S105).

In the second wireless communication device 201c, the third communicator 221 connects to the first communicator 121 as the STA by using the connection-setting information and performs the authentication with the first communicator 121 by using the connection-setting information (Step S402). At this time, the SSID of the connection-setting information is "vwxyz", and the passphrase of the connection-setting information is "09876". Since the connection-setting information used by the third communicator 221 is the same as that set in the first communicator 121, the connection and the authentication are successfully performed.

In the first wireless communication device 101c, the first communicator 121 receives a connection request (Step S106). The first communicator 121 performs the connection and the authentication (Step S107). At this time, since the connection-setting information set in the first communicator 121 is the same as that used by the third communicator 221, the connection and the authentication are successfully performed.

In the first wireless communication device 101c, the second communicator 131 determines again that the second communicator 131 can communicate with the fourth communicator 231 (Step S101). The second communicator 131 transmits the setting-related information set as the transmission data to the fourth communicator 231 and reports transmission of the setting-related information to the processor 111 (Step S304).

In the second wireless communication device 201c, the fourth communicator 231 receives the setting-related information from the second communicator 131 (Step S401). The fourth communicator 231 reports the received setting-related information to the third communicator 221. The third communicator 221 holds the setting-related information in order to use the setting-related information for the connection and the authentication with the first communicator 121. At this time, the third communicator 221 may perform the connection and the authentication with the first communicator 121. The connection and the authentication at this timing are not shown in FIG. 23. Since the setting-related information of the first communicator 121 has not been updated yet, the connection is not successfully performed. Therefore, the third communicator 221 may repeatedly try the connection at an arbitrary timing (Step S402).

After transmission of the setting-related information is reported to the processor 111 in the first wireless communication device 101c, the processor 111 generates the setting-related information corresponding to the connection-setting information (SSID="abcde", passphrase="12345") (Step S305). The processor 111 sets the generated setting-related information in the second communicator 131 as the transmission data (Step S306).

The processor 111 checks whether or not the second setting-related information is stored on the memory 141 and determines that the second setting-related information is stored on the memory 141 (Step S307). The processor 111 outputs, to the memory 141, an instruction for causing the memory 141 to store the second setting-related information stored on the memory 141 as the first setting-related information. The memory 141 stores the second setting-related information stored on the memory 141 as the first setting-related information (Step S308). The memory 141 stores the generated setting-related information as the second setting-related information (Step S309).

The processor 111 acquires the first setting-related information from the memory 141 and outputs the first setting-related information to the first communicator 121. The first communicator 121 updates the connection-setting information set in the first communicator 121 on the basis of the first setting-related information output from the processor 111 (Step S310). At this time, the SSID of the connection-setting information becomes "pqr123", and the passphrase of the connection-setting information becomes "654fgh". The first communicator 121 is operating as the AP (Step S104).

In the second wireless communication device 201c, the third communicator 221 connects to the first communicator 121 as the STA by using the connection-setting information and performs the authentication with the first communicator 121 by using the connection-setting information (Step S402). At this time, the SSID of the connection-setting information is "pqr123", and the passphrase of the connection-setting information is "654fgh". Since the connection-setting information used by the third communicator 221 is the same as that set in the first communicator 121, the connection and the authentication are successfully performed.

Before this connection is performed, the connection-setting information of the first communicator 121 has already been changed. Therefore, it is highly probable that the connection between the first communicator 121 and the third communicator 221 has been cut off. If disconnection has not been performed, the disconnection is performed before the connection is performed.

In the first wireless communication device 101c, the first communicator 121 receives a connection request (Step S106). The first communicator 121 performs the connection and the authentication (Step S107). At this time, since the connection-setting information set in the first communicator 121 is the same as that used by the third communicator 221, the connection and the authentication are successfully performed.

Each time the second communicator 131 of the first wireless communication device 101c transmits the setting-related information, new setting-related information is set in the second communicator 131. The fourth communicator 231 of the second wireless communication device 201c receives different setting-related information from that previously received. In other words, each time the second communicator 131 of the first wireless communication device 101c transmits the setting-related information, necessary connection-setting information for the operation of the AP by the first communicator 121 changes. Therefore, the third communicator 221 (STA) of the second wireless communication device 201c can perform one-to-one connection with the first communicator 121 (AP) of the first wireless communication device 101c every time. The wireless communication system 11 can cause one AP and one STA to connect to each other and can avoid connection between the AP and another STA.

Fifth Embodiment

Figure 24:
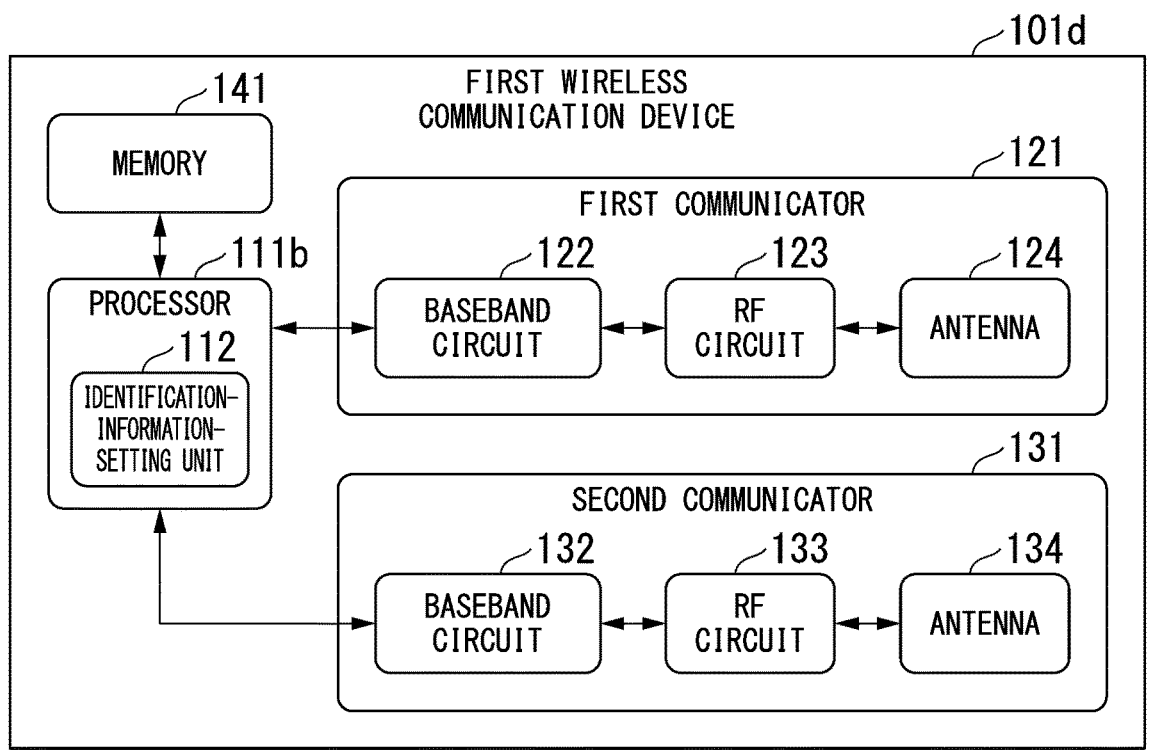
FIG. 24 is a block diagram showing a configuration of a first wireless communication device according to a fifth embodiment of the present invention.
Figure 25:
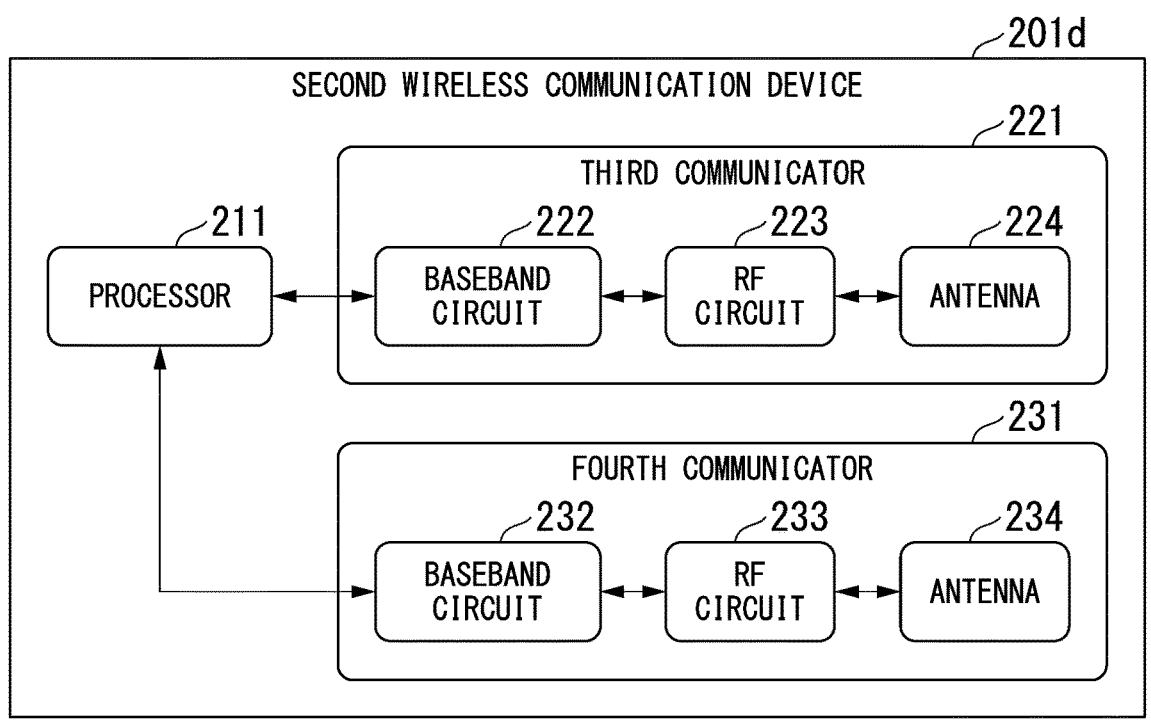
FIG. 25 is a block diagram showing a configuration of a second wireless communication device according to the fifth embodiment of the present invention.

FIG. 24 shows a configuration of a first wireless communication device 101d according to a fifth embodiment of the present invention. The same parts as those shown in FIG. 13 and FIG. 18 will not be described. FIG. 25 shows a configuration of a second wireless communication device 201d according to the fifth embodiment. The same parts as those shown in FIG. 2 will not be described.

The first wireless communication device 101d includes the processor 111b shown in FIG. 13 and the memory 141 shown in FIG. 18. The second wireless communication device 201d does not include the memory 241 shown in FIG. 2.

Before the third communicator 221 connects to the first communicator 121, the fourth communicator 231 transmits identification information of the second wireless communication device 201d to the second communicator 131. For example, the first setting-related information transmitted by the fourth communicator 231 includes the identification information of the second wireless communication device 201d. For example, the identification information is a MAC address. The second communicator 131 receives the identification information. The third communicator 221 transmits the identification information to the first communicator 121 when the third communicator 221 connects to the first communicator 121. The first communicator 121 receives the identification information.

The processor 111b has a function of an identification-information-setting unit 112 that sets the identification information received by the second communicator 131 in the first communicator 121 as identification information of a device of which connection is accepted by the first communicator 121. When the identification information received by the first communicator 121 is the same as that set in the first communicator 121, the first communicator 121 accepts connection to the third communicator 221.

Figure 26:
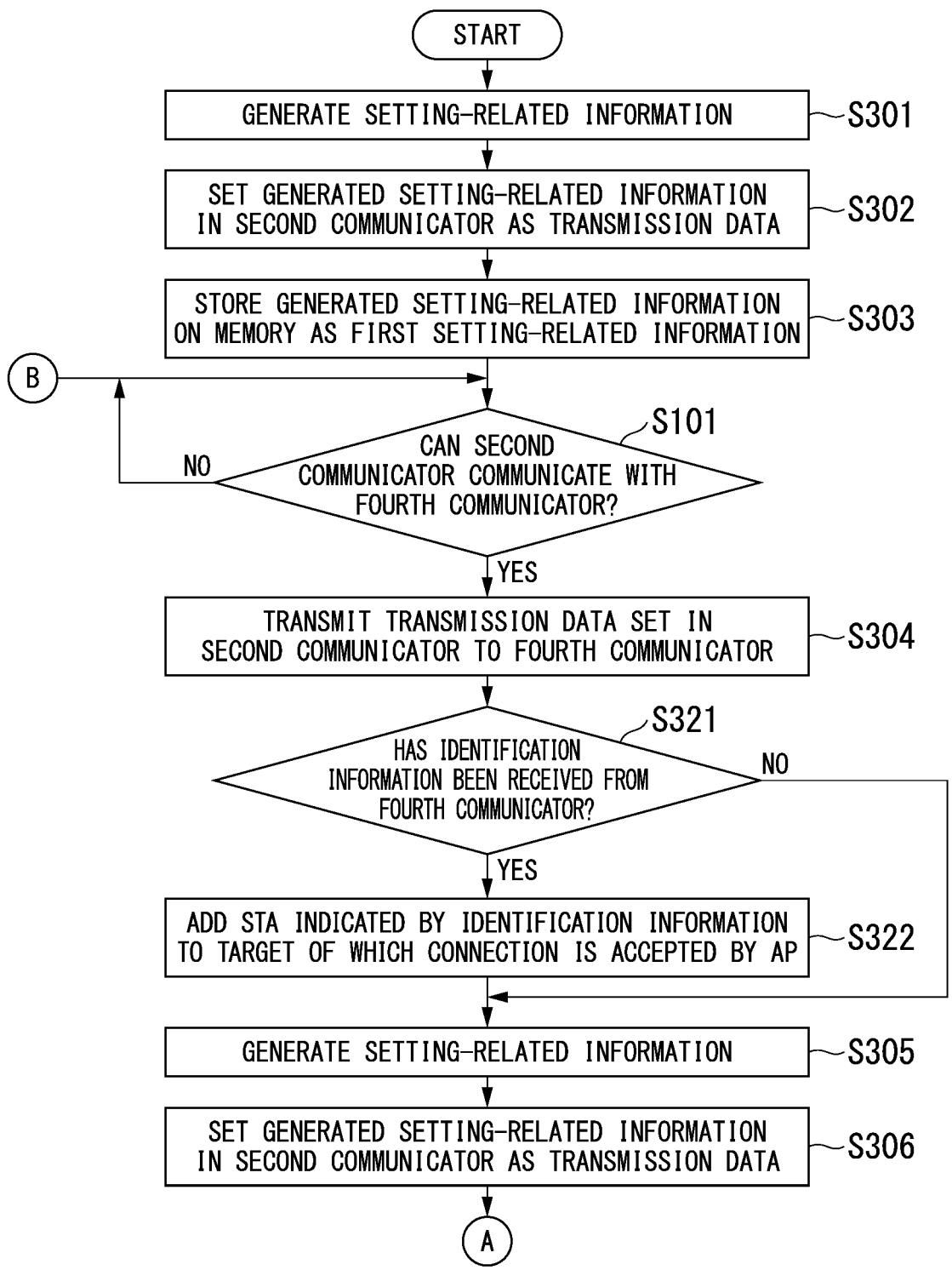
FIG. 26 is a flow chart showing a procedure of an operation of the first wireless communication device according to the fifth embodiment of the present invention.
Figure 27:
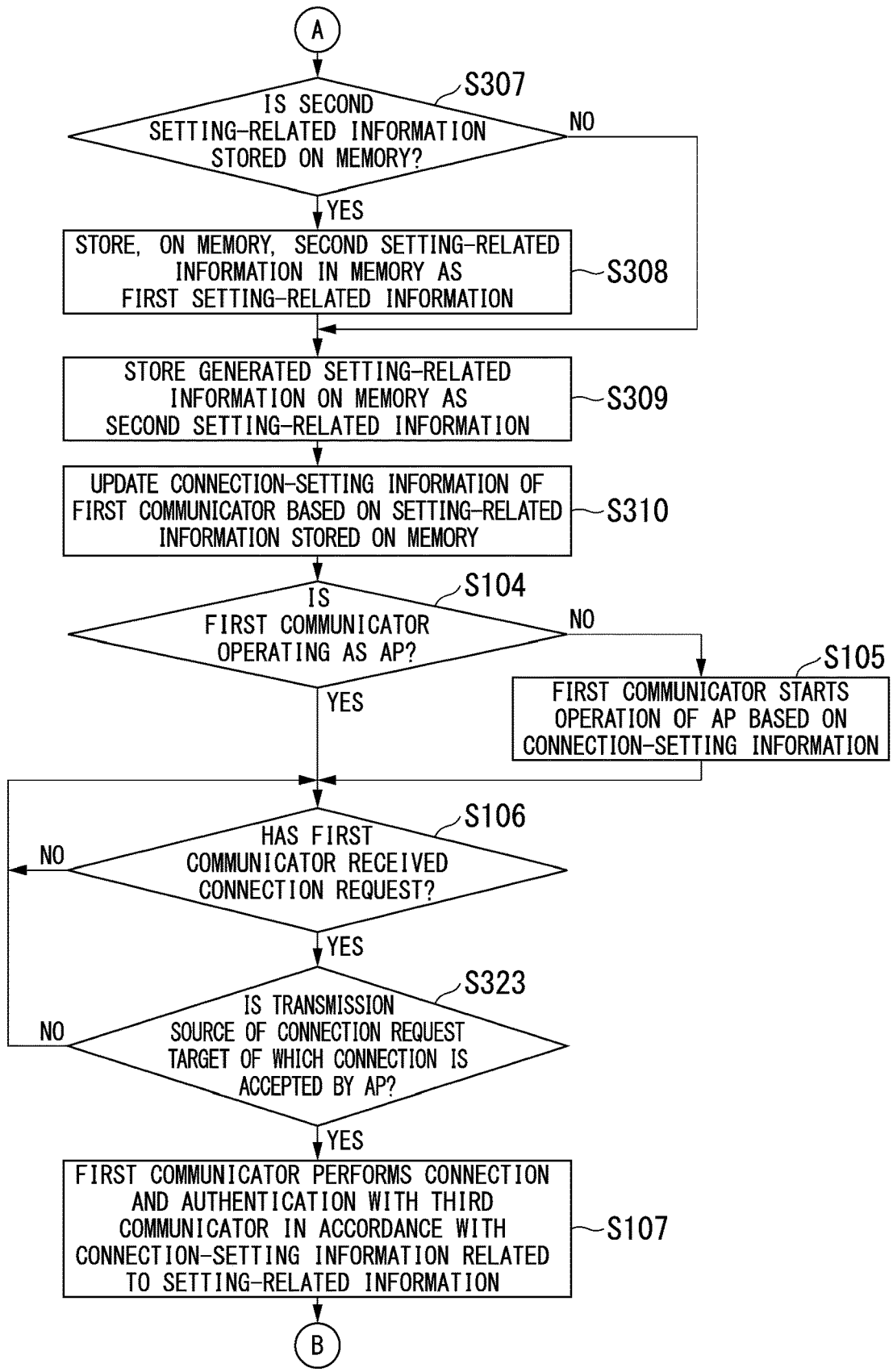
FIG. 27 is a flow chart showing a procedure of an operation of the first wireless communication device according to the fifth embodiment of the present invention.

An operation of the first wireless communication device 101d will be described. FIG. 26 and FIG. 27 show a procedure of the operation of the first wireless communication device 101d. The same processing as that shown in FIG. 20 will not be described.

(Step S321)

When the identification information is transmitted from the fourth communicator 231, the second communicator 131 receives the identification information. After Step S304, the processor 111b executes the functions of the identification-information-setting unit 112. The processor 111b monitors the second communicator 131 and determines whether or not the identification information has been received. When the processor 111b determines that the identification information has not been received, Step S305 is executed. When the processor 111b determines that the identification information has been received, Step S322 is executed.

(Step S322)

The processor 111b outputs the identification information included in the setting-related information to the first communicator 121. The first communicator 121 holds the identification information, thus adding the STA indicated by the identification information to a target of which connection is accepted by the AP. After Step S322, Step S305 is executed.

(Step S323)

When the connection request is received in Step S106, the first communicator 121 checks whether or not the transmission source of the connection request is the target of which connection is accepted by the AP. For example, the first communicator 121 checks whether or not the MAC address of the transmission source of the connection request matches the identification information set in Step S322. In a case in which IEEE802.11 is used, the MAC address of the transmission source is included in an association request that is the connection request.

When the MAC address of the transmission source of the connection request does not match the identification information set in Step S322, the first communicator 121 determines that the transmission source of the connection request is not the target of which connection is accepted by the AP. In this case, Step S106 is executed. When the MAC address of the transmission source of the connection request matches the identification information set in Step S322, the first communicator 121 determines that the transmission source of the connection request is the target of which connection is accepted by the AP. In this case, Step S107 is executed.

Step S322 may be included in Step S310. In other words, Step S322 may be executed as part of the processing of Step S310.

Figure 28:
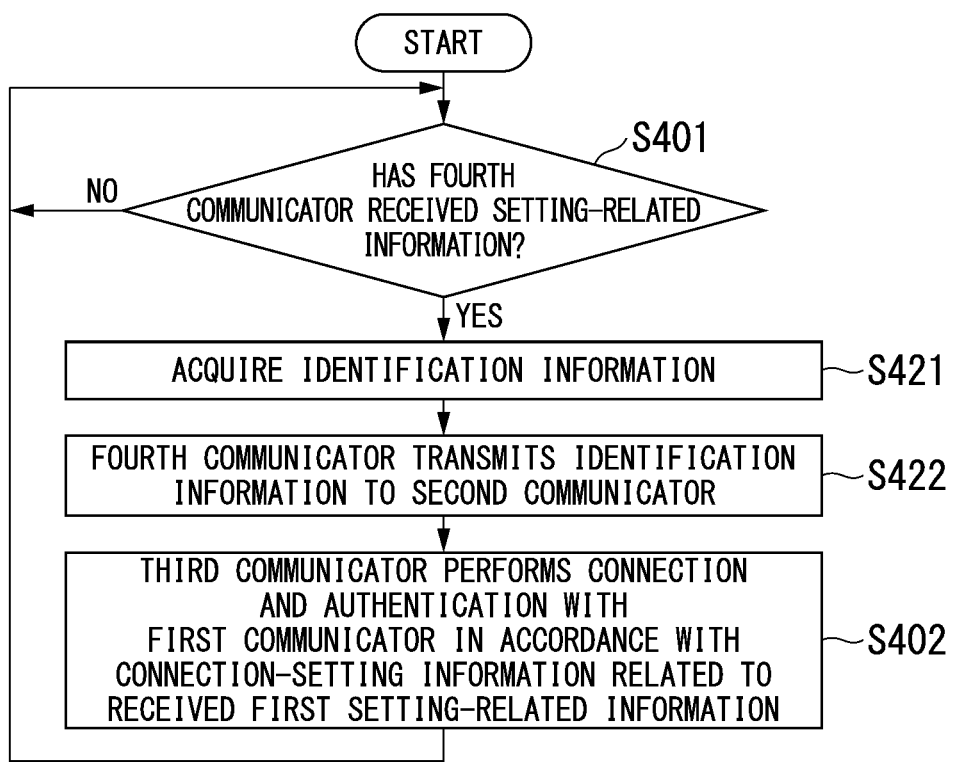
FIG. 28 is a flow chart showing a procedure of an operation of the second wireless communication device according to the fifth embodiment of the present invention.

An operation of the second wireless communication device 201d will be described. FIG. 28 shows a procedure of the operation of the second wireless communication device 201d. The same processing as that shown in FIG. 21 will not be described.

(Step S421)

When the fourth communicator 231 receives the setting-related information from the second communicator 131 in Step S401, the fourth communicator 231 outputs the received setting-related information to the processor 211. The processor 211 outputs the setting-related information to the third communicator 221. The third communicator 221 holds the connection-setting information related to the setting-related information. The processor 211 acquires the identification information from the third communicator 221. The processor 211 may request acquisition of the identification information to the third communicator 221, and the third communicator 221 may output the identification information to the processor 211. The third communicator 221 may output the identification information to the processor 211 at a predetermined timing. For example, the predetermined timing is a timing at which the third communicator 221 becomes operable. The processor 211 may store the acquired identification information on a memory not shown in FIG. 25.

(Step S422)

After Step S421, the processor 211 outputs the identification information to the fourth communicator 231. The fourth communicator 231 transmits the identification information to the second communicator 131. After Step S422, Step S402 is executed.

Figure 29:
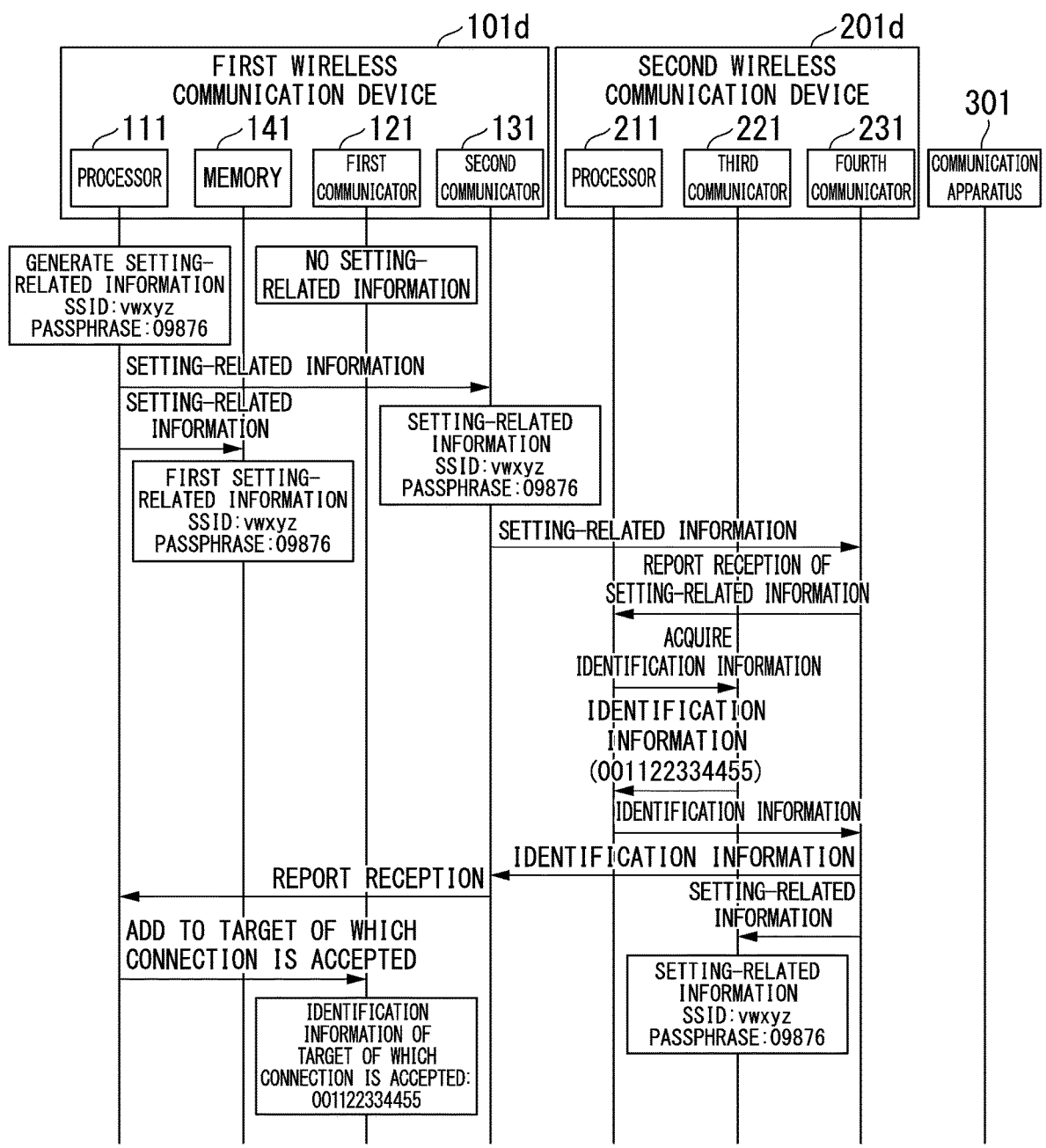
FIG. 29 is a sequence chart showing a procedure of communication in the fifth embodiment of the present invention.
Figure 30:
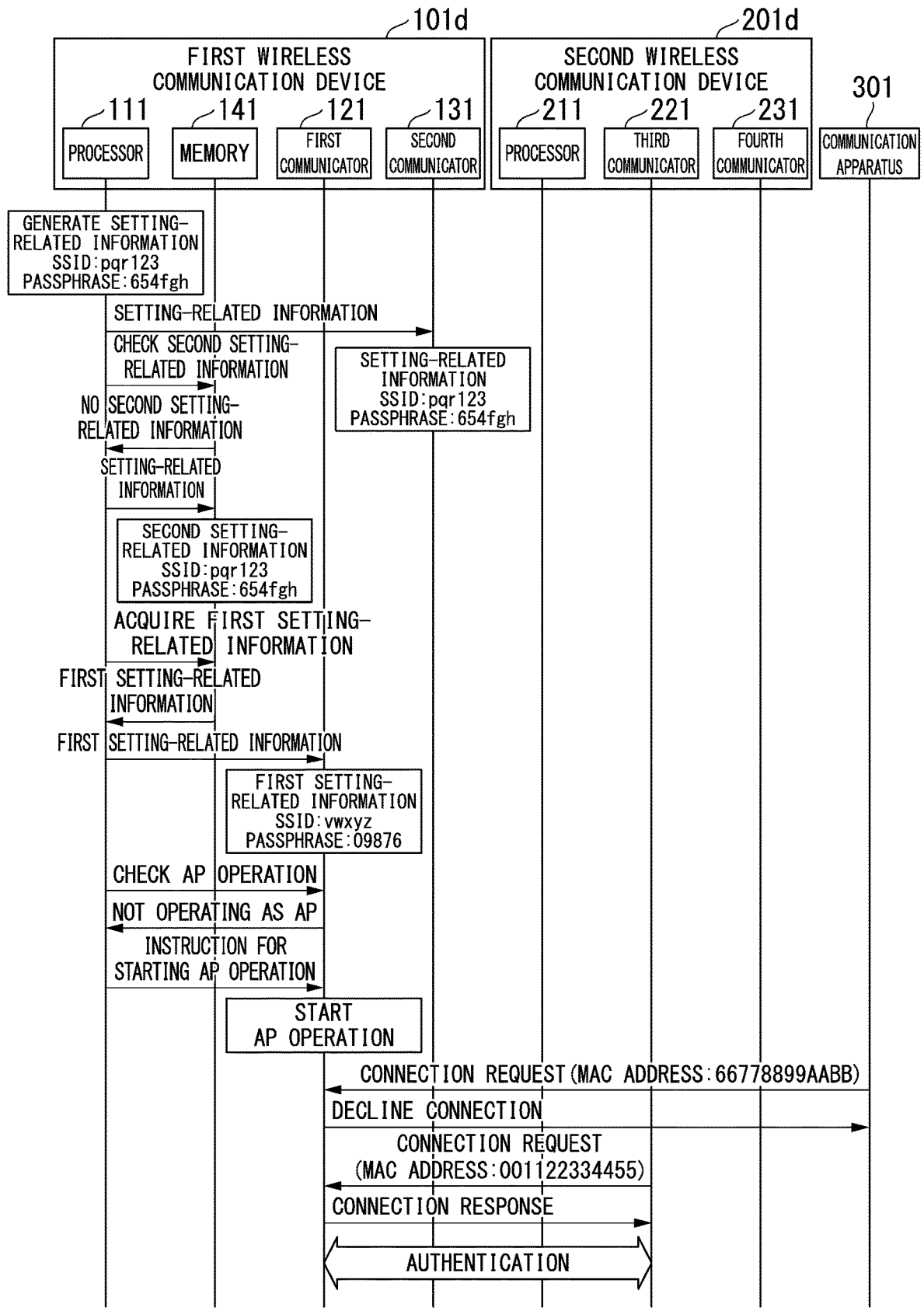
FIG. 30 is a sequence chart showing a procedure of communication in the fifth embodiment of the present invention.

FIG. 29 and FIG. 30 show a procedure of communication between the first wireless communication device 101d and the second wireless communication device 201d. An operation of each device will be described by referring to FIG. 29 and FIG. 30. After an operation shown in FIG. 29 is executed, an operation shown in FIG. 30 is executed. The same processing as that shown in FIG. 22 and FIG. 23 will not be described.

In the following example, the setting-related information is the same as the connection-setting information. Even when the setting-related information is configured to be information used for generating the connection-setting information, the majority of the following example is not changed.

In the second wireless communication device 201d, the fourth communicator 231 receives the setting-related information (Step S401). The fourth communicator 231 reports reception of the setting-related information to the processor 211, and the processor 211 outputs an instruction for acquiring the identification information to the third communicator 221. The third communicator 221 outputs the MAC address (001122334455) of the third communicator 221 to the processor 211 as the identification information (Step S421). The processor 211 outputs the identification information to the fourth communicator 231. The fourth communicator 231 transmits the identification information to the second communicator 131 (Step S422).

In the first wireless communication device 101d, the second communicator 131 receives the identification information from the fourth communicator 231. The second communicator 131 reports the received identification information to the processor 111b. The processor 111b determines that the identification information has been received (Step S321). The processor 111b outputs the identification information to the first communicator 121. The first communicator 121 adds the STA indicated by the MAC address (001122334455), which is the identification information, to a target of which connection is accepted by the AP (Step S322).

Another communication apparatus 301 transmits a connection request to the first communicator 121. In the first wireless communication device 101d, the first communicator 121 receives the connection request transmitted from the communication apparatus 301 (Step S106). The MAC address of the transmission source of the connection request is "66778899AABB". This MAC address does not match "001122334455" that is the target of which connection is accepted by the first communicator 121 (Step S323). Therefore, the first communicator 121 does not accept the connection to the communication apparatus 301 and declines the connection.

In the second wireless communication device 201d, the third communicator 221 connects to the first communicator 121 as the STA by using the connection-setting information and performs the authentication with the first communicator 121 by using the connection-setting information (Step S402). At this time, the SSID of the connection-setting information is "vwxyz", and the passphrase of the connection-setting information is "09876". The connection-setting information used by the third communicator 221 is the same as that set in the first communicator 121. Furthermore, the MAC address of the third communicator 221, which is the transmission source of the connection request, is "001122334455". This MAC address is the same as "001122334455" that is the target of which connection is accepted by the first communicator 121. Therefore, the connection and the authentication are successfully performed.

In the first wireless communication device 101d, the first communicator 121 receives the connection request (Step S106). The MAC address of the third communicator 221, which is the transmission source of the connection request, is "001122334455". This MAC address is the same as "001122334455" that is the target of which connection is accepted by the first communicator 121 (Step S323). Therefore, the first communicator 121 performs the connection and the authentication (Step S107). At this time, since the connection-setting information set in the first communicator 121 is the same as that used by the third communicator 221, the connection and the authentication are successfully performed.

The first communicator 121 of the first wireless communication device 101d operates as the AP. The first communicator 121 accepts connection from only an STA having identification information matching the identification information acquired via the second communicator 131. There is a case in which another STA accidentally holding the same setting-related information as that generated by the first wireless communication device 101d requests connection to the first communicator 121 (AP) of the first wireless communication device 101d. It is possible to avoid connection to the first communicator 121 by another STA before the third communicator 221 (STA) of the second wireless communication device 201d connects to the first communicator 121 (AP). There is a case in which disconnection occurs for some reason while the first communicator 121 (AP) of the first wireless communication device 101d and the third communicator 221 (STA) of the second wireless communication device 201d connect to each other. Even in such a case, it is possible to avoid connection to the first communicator 121 by another STA.

Therefore, the third communicator 221 (STA) of the second wireless communication device 201d can perform one-to-one connection with the first communicator 121 (AP) of the first wireless communication device 101d every time. The wireless communication system 11 can cause one AP and one STA to connect to each other and can avoid connection between the AP and another STA.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication system, comprising:
a first wireless communication device; and
a second wireless communication device,
wherein the first wireless communication device comprises:
a first communicator configured to perform wireless communication with a third communicator of the second wireless communication device in accordance with a first communication protocol of a wireless communication protocol and operate as an access point in accordance with connection-setting information; and
a second communicator configured to perform communication with a fourth communicator of the second wireless communication device in accordance with a second communication protocol different from the first communication protocol,
wherein the second wireless communication device comprises:
the third communicator configured to perform wireless communication with the first communicator in accordance with the first communication protocol and connect to the access point in accordance with the connection-setting information as a station; and
the fourth communicator configured to perform communication with the second communicator in accordance with the second communication protocol,
wherein one of the first wireless communication device and the second wireless communication device comprises:
a memory configured to store setting-related information that is one of the connection-setting information and information used for generating the connection-setting information; and
a first processor,
wherein the memory is configured to store the setting-related information as first setting-related information,
wherein, in a case in which the second wireless communication device comprises the memory and the first processor, the fourth communicator is configured to hold the first setting-related information and transmit the first setting-related information to the second communicator and the second communicator is configured to receive the first setting-related information,
wherein, in a case in which the first wireless communication device comprises the memory and the first processor, the second communicator is configured to hold the first setting-related information and transmit the first setting-related information to the fourth communicator and the fourth communicator is configured to receive the first setting-related information,
wherein, each time the first setting-related information is transmitted, the first processor is configured to generate the setting-related information different from the transmitted first setting-related information, the fourth communicator or the second communicator is configured to hold the setting-related information generated by the first processor as the first setting-related information as a replacement for the transmitted first setting-related information, and the memory is configured to store the setting-related information generated by the first processor as second setting-related information,
wherein, after the first setting-related information is transmitted, the first communicator and the third communicator are configured to connect to each other in accordance with the connection-setting information related to the transmitted first setting-related information, and
wherein the memory is configured to store the second setting-related information as the first setting-related information and store the setting-related information generated by the first processor as the second setting-related information each time the first processor generates the setting-related information after the first communicator and the third communicator connect to each other.

2. The wireless communication system according to claim 1,
wherein the second wireless communication device comprises:
the memory; and
the first processor,
wherein, each time the first setting-related information is transmitted, the fourth communicator is configured to hold the setting-related information generated by the first processor as the first setting-related information as a replacement for the transmitted first setting-related information,
wherein the first communicator is configured to connect to the third communicator in accordance with the connection-setting information related to the first setting-related information received by the second communicator, and
wherein the third communicator is configured to connect to the first communicator in accordance with the connection-setting information related to the first setting-related information stored on the memory.

3. The wireless communication system according to claim 2,
wherein the first wireless communication device further comprises a second processor,
wherein the first processor is configured to determine whether or not the first setting-related information is to be set in the fourth communicator,
wherein the fourth communicator is configured to hold the first setting-related information when the first processor determines that the first setting-related information is to be set in the fourth communicator,
wherein the fourth communicator is configured not to hold the first setting-related information and is configured not to transmit the first setting-related information to the second communicator when the first processor determines that the first setting-related information is not to be set in the fourth communicator,
wherein the second processor is configured to generate the first setting-related information in a case in which the second communicator does not receive the first setting-related information,
wherein the first communicator is configured to acquire the first setting-related information generated by the second processor from the second processor,
wherein the second communicator is configured to transmit the first setting-related information generated by the second processor to the fourth communicator,
wherein the fourth communicator is configured to receive the first setting-related information,
wherein the first communicator is configured to connect to the third communicator in accordance with the connection-setting information related to the first setting-related information acquired from the second processor, and
wherein the third communicator is configured to connect to the first communicator in accordance with the connection-setting information related to the first setting-related information received by the fourth communicator.

4. The wireless communication system according to claim 2,
wherein the first wireless communication device further comprises a second processor,
wherein the fourth communicator is configured to transmit identification information of the second wireless communication device to the second communicator before the third communicator connects to the first communicator,
wherein the second communicator is configured to receive the identification information,
wherein the third communicator is configured to transmit the identification information to the first communicator when the third communicator connects to the first communicator,
wherein the first communicator is configured to receive the identification information,
wherein the second processor is configured to set the identification information received by the second communicator in the first communicator as identification information of a device of which connection is accepted by the first communicator, and
wherein the first communicator is configured to accept connection to the third communicator when the identification information received by the first communicator is the same as the identification information set in the first communicator.

5. The wireless communication system according to claim 1,
wherein the first wireless communication device comprises:
the memory; and
the first processor,
wherein each time the first setting-related information is transmitted, the second communicator is configured to hold the setting-related information generated by the first processor as the first setting-related information as a replacement for the transmitted first setting-related information,
wherein the third communicator is configured to connect to the first communicator in accordance with the connection-setting information related to the first setting-related information received by the fourth communicator, and
wherein the first communicator is configured to connect to the third communicator in accordance with the connection-setting information related to the first setting-related information stored on the memory.

6. The wireless communication system according to claim 5,
wherein the fourth communicator is configured to transmit identification information of the second wireless communication device to the second communicator before the third communicator connects to the first communicator,
wherein the second communicator is configured to receive the identification information,
wherein the third communicator is configured to transmit the identification information to the first communicator when the third communicator connects to the first communicator,
wherein the first communicator is configured to receive the identification information,
wherein the first processor is configured to set the identification information received by the second communicator in the first communicator as identification information of a device of which connection is accepted by the first communicator, and
wherein the first communicator is configured to accept connection to the third communicator when the identification information received by the first communicator is the same as the identification information set in the first communicator.

7. The wireless communication system according to claim 1,
wherein the second communication protocol is a wireless communication protocol,
wherein a first distance is longer than a second distance,
wherein the first distance is a maximum distance between the first communicator and the third communicator when the first communicator and the third communicator perform wireless communication with each other, and
wherein the second distance is a maximum distance between the second communicator and the fourth communicator when the second communicator and the fourth communicator perform wireless communication with each other.

8. A wireless communication device, comprising:
a third communicator configured to perform wireless communication with a first communicator that is an access point of an external wireless communication device in accordance with a first communication protocol of a wireless communication protocol and connect to the access point in accordance with connection-setting information as a station;
a fourth communicator configured to perform communication with a second communicator of the external wireless communication device in accordance with a second communication protocol different from the first communication protocol;
a memory configured to store setting-related information that is one of the connection-setting information and information used for generating the connection-setting information; and
a processor,
wherein the memory is configured to store the setting-related information as first setting-related information,
wherein the fourth communicator is configured to hold the first setting-related information and transmit the first setting-related information to the second communicator,
wherein, each time the first setting-related information is transmitted, the processor is configured to generate the setting-related information different from the transmitted first setting-related information, the fourth communicator is configured to hold the setting-related information generated by the processor as the first setting-related information as a replacement for the transmitted first setting-related information, and the memory is configured to store the setting-related information generated by the processor as second setting-related information,
wherein, after the first setting-related information is transmitted, the third communicator is configured to connect to the first communicator in accordance with the connection-setting information related to the first setting-related information stored on the memory, and
wherein the memory is configured to store the second setting-related information as the first setting-related information and store the setting-related information generated by the first processor as the second setting-related information each time the processor generates the setting-related information after the third communicator connects to the first communicator.

9. A wireless communication device, comprising:
a first communicator configured to perform wireless communication with a third communicator of an external wireless communication device in accordance with a first communication protocol of a wireless communication protocol and operate as an access point in accordance with connection-setting information;
a second communicator configured to perform communication with a fourth communicator of the external wireless communication device in accordance with a second communication protocol different from the first communication protocol;
a memory configured to store setting-related information that is one of the connection-setting information and information used for generating the connection-setting information; and
a processor,
wherein the memory is configured to store the setting-related information as first setting-related information,
wherein the second communicator is configured to hold the first setting-related information and transmit the first setting-related information to the fourth communicator,
wherein, each time the first setting-related information is transmitted, the processor is configured to generate the setting-related information different from the transmitted first setting-related information, the second communicator is configured to hold the setting-related information generated by the processor as the first setting-related information as a replacement for the transmitted first setting-related information, and the memory is configured to store the setting-related information generated by the processor as second setting-related information,
wherein, after the first setting-related information is transmitted, the first communicator is configured to connect to the third communicator in accordance with the connection-setting information related to the first setting-related information stored on the memory, and
wherein the memory is configured to store the second setting-related information as the first setting-related information and store the setting-related information generated by the processor as the second setting-related information each time the processor generates the setting-related information after the first communicator connects to the third communicator.

10. A wireless communication method executed by a first wireless communication device and a second wireless communication device, the wireless communication method comprising: a first step; a second step; a third step; a fourth step; a fifth step; a sixth step; a seventh step; and an eighth step,
wherein the first wireless communication device comprises:
a first communicator configured to perform wireless communication with a third communicator of the second wireless communication device in accordance with a first communication protocol of a wireless communication protocol and operate as an access point in accordance with connection-setting information; and
a second communicator configured to perform communication with a fourth communicator of the second wireless communication device in accordance with a second communication protocol different from the first communication protocol,
wherein the second wireless communication device comprises:
the third communicator configured to perform wireless communication with the first communicator in accordance with the first communication protocol and connect to the access point in accordance with the connection-setting information as a station; and
the fourth communicator configured to perform communication with the second communicator in accordance with the second communication protocol,
wherein one of the first wireless communication device and the second wireless communication device comprises:
a memory configured to store setting-related information that is one of the connection-setting information and information used for generating the connection-setting information; and
a first processor,
wherein the memory is configured to store the setting-related information as first setting-related information,
wherein, in a case in which the second wireless communication device comprises the memory and the first processor, the fourth communicator holds the first setting-related information in the first step and transmits the first setting-related information to the second communicator in the second step and the second communicator receives the first setting-related information in the third step,
wherein, in a case in which the first wireless communication device comprises the memory and the first processor, the second communicator holds the first setting-related information in the first step and transmits the first setting-related information to the fourth communicator in the second step and the fourth communicator receives the first setting-related information in the third step,
wherein, each time the first setting-related information is transmitted, the first processor generates the setting-related information different from the transmitted first setting-related information in the fourth step, the fourth communicator or the second communicator holds the setting-related information generated by the first processor as the first setting-related information as a replacement for the transmitted first setting-related information in the fifth step, and the memory stores the setting-related information generated by the first processor as second setting-related information in the sixth step,
wherein, after the first setting-related information is transmitted, the first communicator and the third communicator connect to each other in accordance with the connection-setting information related to the transmitted first setting-related information in the seventh step, and
wherein the memory stores the second setting-related information as the first setting-related information and stores the setting-related information generated by the first processor as the second setting-related information in the eighth step each time the first processor generates the setting-related information after the first communicator and the third communicator connect to each other.

\* \* \* \* \*